United States Patent
Sasaki et al.

(10) Patent No.: US 7,436,627 B2
(45) Date of Patent: Oct. 14, 2008

(54) MAGNETIC HEAD FOR PERPENDICULAR MAGNETIC RECORDING AND METHOD OF MANUFACTURING SAME

(75) Inventors: Yoshitaka Sasaki, Milpitas, CA (US); Hironori Araki, Milpitas, CA (US); Hiroyuki Itoh, Milpitas, CA (US); Kazuo Ishizaki, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 709 days.

(21) Appl. No.: 10/998,584

(22) Filed: Nov. 30, 2004

(65) Prior Publication Data

US 2006/0077590 A1   Apr. 13, 2006

Related U.S. Application Data

(63) Continuation-in-part of application No. 10/959,140, filed on Oct. 7, 2004, now Pat. No. 7,333,296.

(51) Int. Cl.
*G11B 5/187* (2006.01)
(52) U.S. Cl. .............................. 360/125.09; 29/603.13; 29/603.23
(58) Field of Classification Search ............ 360/125.01, 360/125.09, 125.13, 125.19, 125.46, 125.5, 360/125.51, 125.45, 125.58, 125.59, 125.64, 360/125, 126; 29/603.14, 603.01, 603.13, 29/603.07, 603.12, 603.23, 603.15
See application file for complete search history.

(56) References Cited

U.S. PATENT DOCUMENTS

| | | | |
|---|---|---|---|
| 4,656,546 A | 4/1987 | Mallory | 360/110 |
| 4,672,493 A | 6/1987 | Schewe | 360/125 |
| 5,629,242 A | 5/1997 | Nagashima | 438/692 |
| 5,802,700 A * | 9/1998 | Chen et al. | 29/603.14 |
| 6,504,675 B1 | 1/2003 | Shukh et al. | 360/125 |
| 6,587,316 B2 | 7/2003 | Hasegawa | 360/324.1 |
| 6,710,973 B2 | 3/2004 | Okada et al. | 360/125 |
| 7,120,988 B2 * | 10/2006 | Le et al. | 29/603.07 |
| 2003/0151850 A1 | 8/2003 | Nakamura et al. | 360/125 |
| 2006/0077589 A1 | 4/2006 | Sasaki | 360/126 |

FOREIGN PATENT DOCUMENTS

| | | |
|---|---|---|
| JP | A 61-289516 | 12/1986 |
| JP | A 62-204419 | 9/1987 |
| JP | A-7-245306 | 9/1995 |
| JP | A 10-105921 | 4/1998 |
| JP | A 2000-31147 | 1/2000 |
| JP | A 2001-14610 | 1/2001 |

(Continued)

*Primary Examiner*—Julie Anne Watko
(74) *Attorney, Agent, or Firm*—Oliff & Berridge, PLC

(57) ABSTRACT

A pole-layer-encasing layer made of a nonmagnetic material is disposed on an underlying layer made of a nonmagnetic conductive material. The encasing layer has a groove that penetrates. A pole layer is disposed in the groove. The pole layer is formed by plating through feeding a current to the underlying layer. A polishing stopper layer made of a non-magnetic conductive material is disposed on the top surface of the encasing layer. The polishing stopper layer indicates the level at which polishing for controlling the thickness of the pole layer is stopped. The polishing stopper layer has an opening that penetrates, and the edge of the opening is located directly above the edge of the groove located in the top surface of the encasing layer.

19 Claims, 29 Drawing Sheets

FOREIGN PATENT DOCUMENTS

| JP | A 2002-76472 | 3/2002 |
| JP | A 2002-92821 | 3/2002 |
| JP | A 2003-203311 | 7/2003 |
| JP | A 2003-242607 | 8/2003 |
| JP | A 2004-165434 | 6/2004 |

* cited by examiner

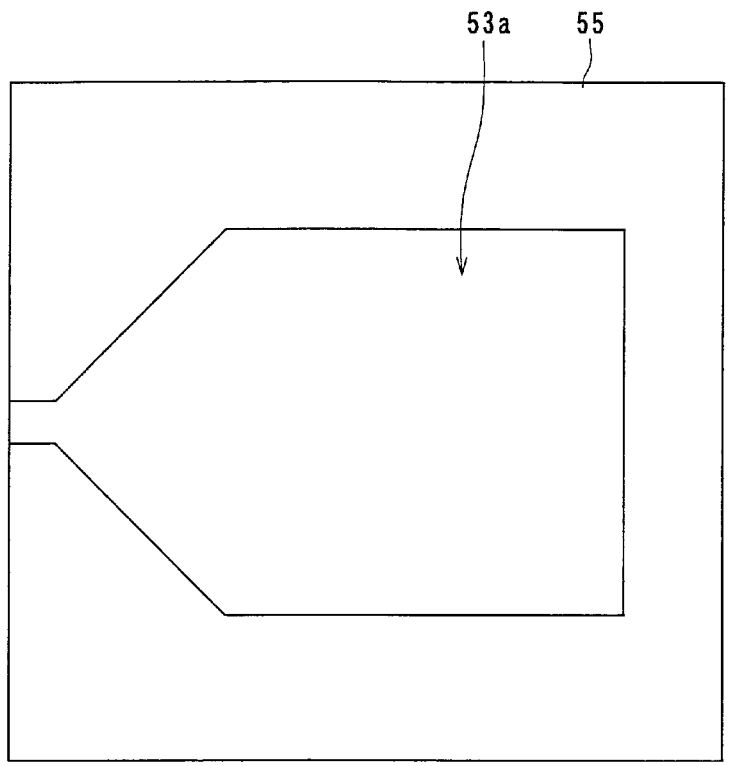
FIG. 5A
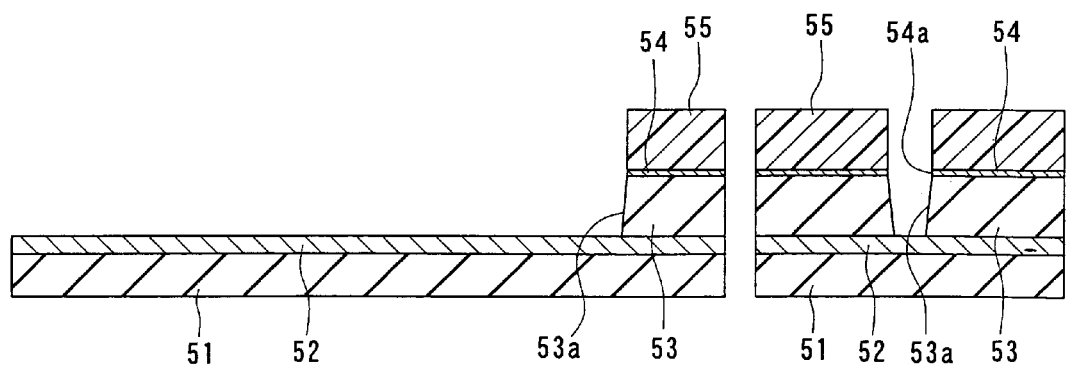
FIG. 5B
FIG. 5C

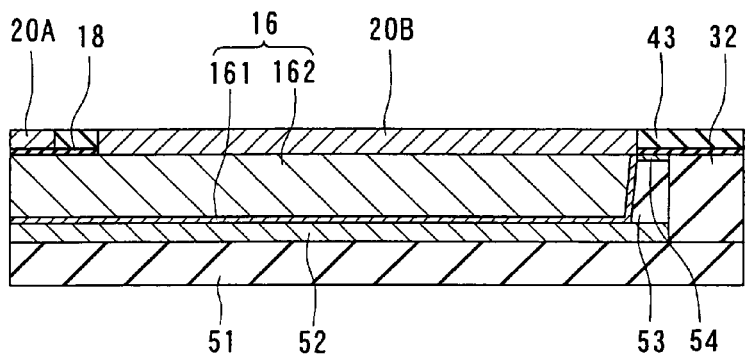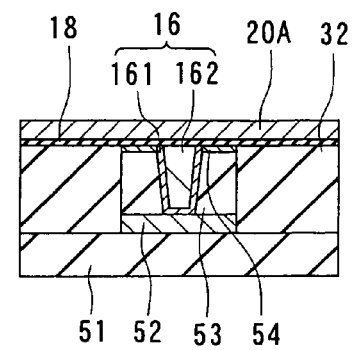
FIG. 9A                FIG. 9B
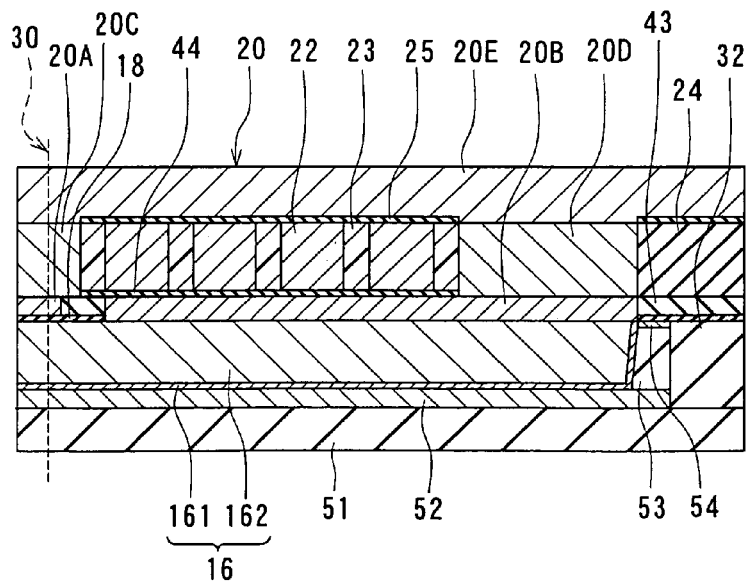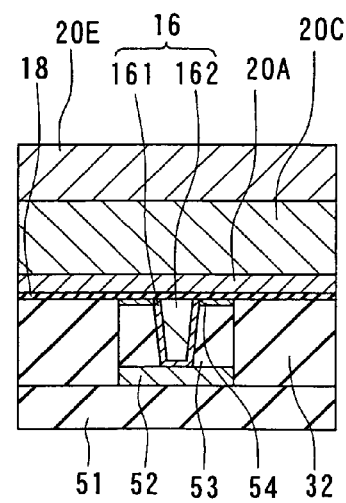
FIG. 10A                FIG. 10B

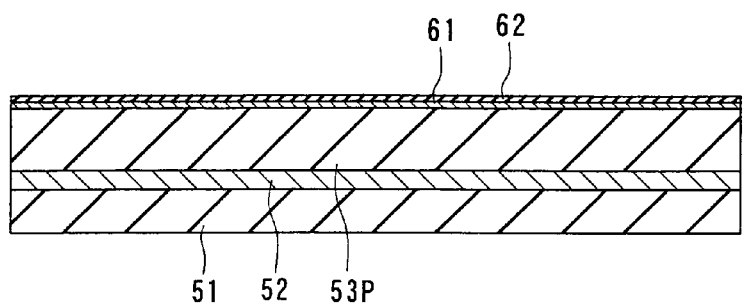 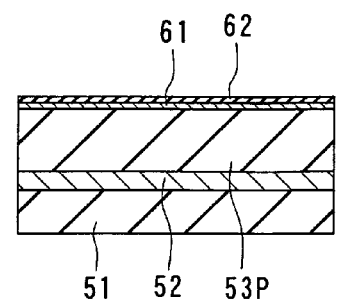
FIG. 16A  FIG. 16B
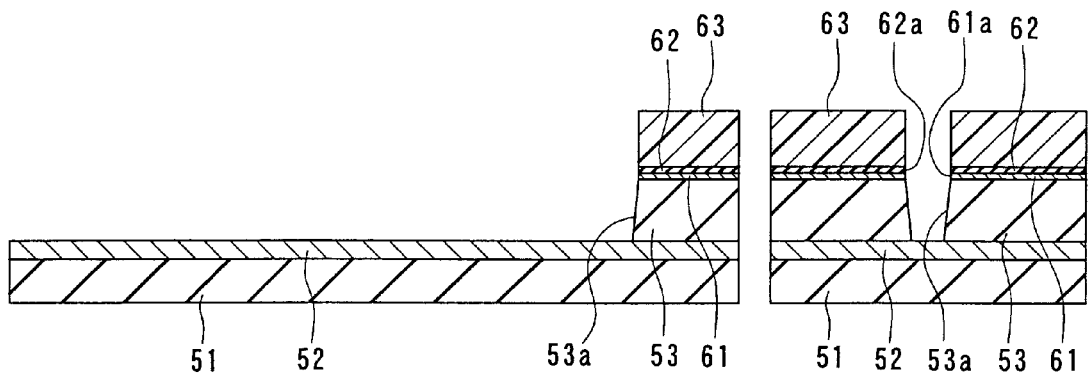 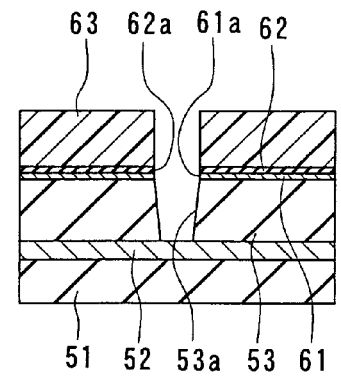
FIG. 17A  FIG. 17B

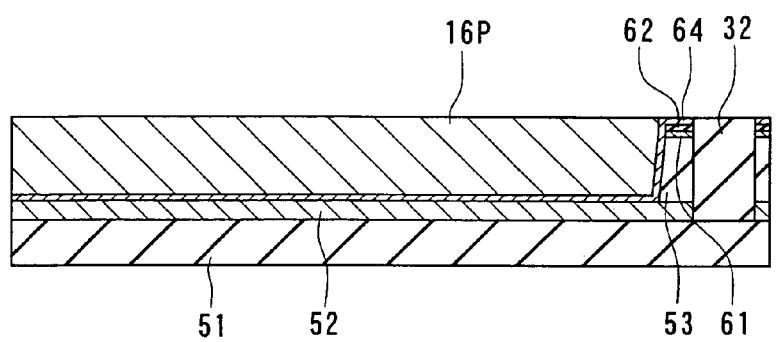 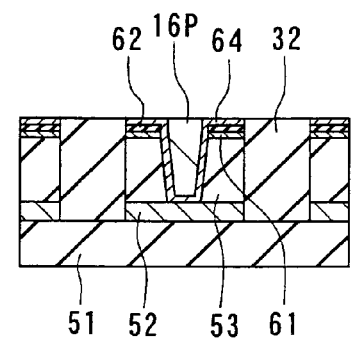
FIG. 22A  FIG. 22B
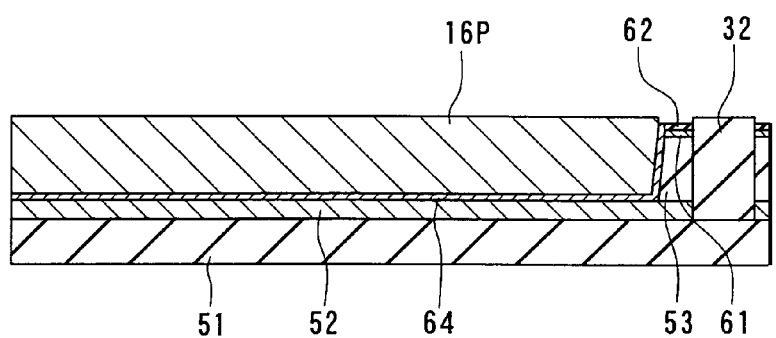 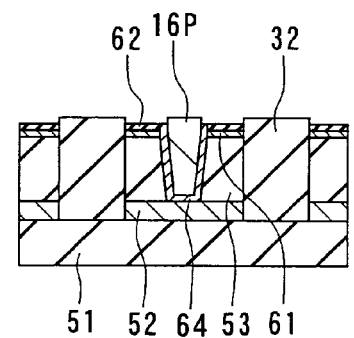
FIG. 23A  FIG. 23B

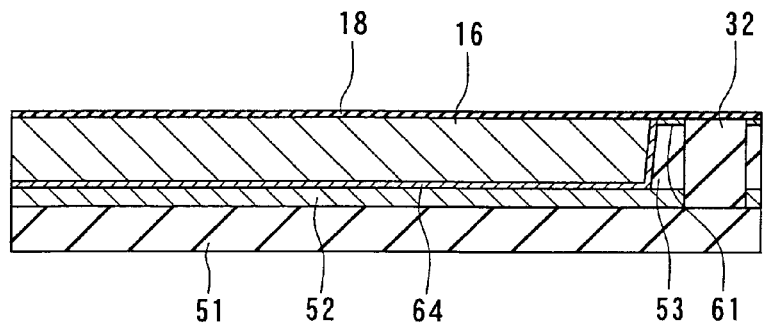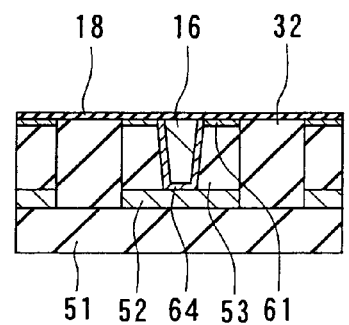
FIG. 24A    FIG. 24B
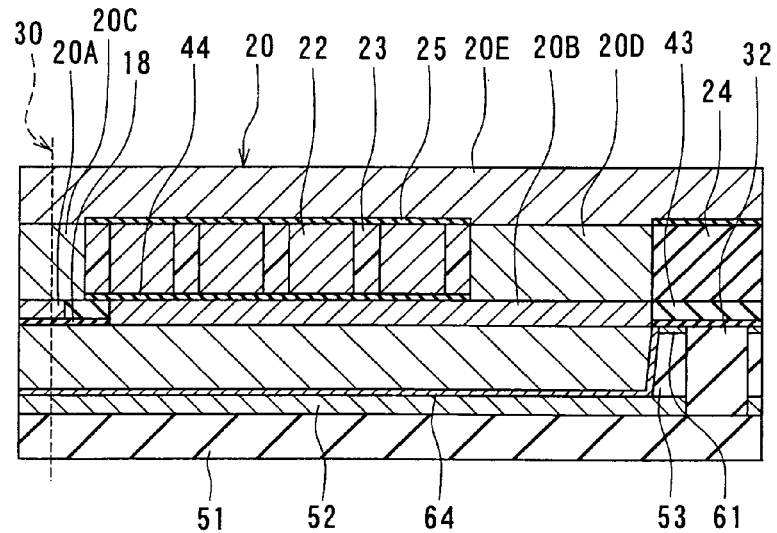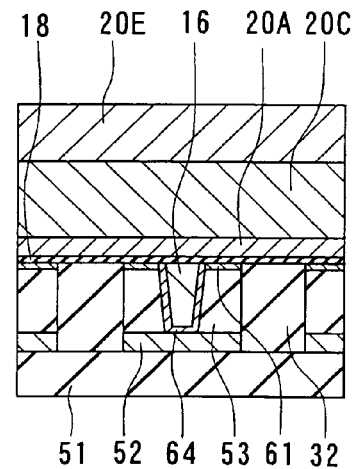
FIG. 25A    FIG. 25B

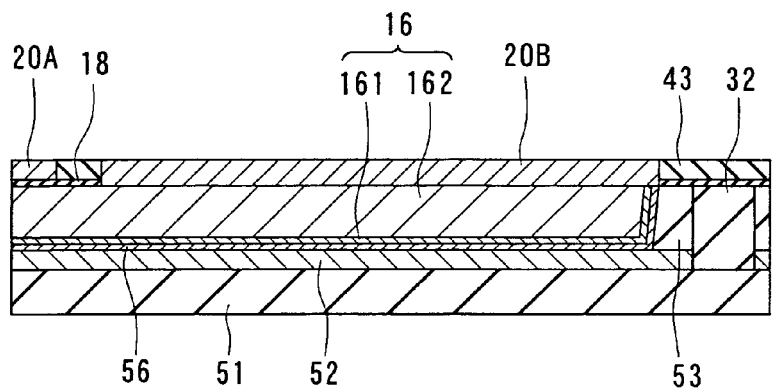
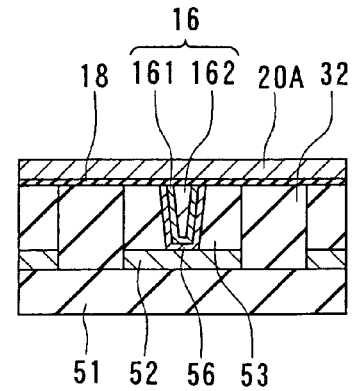
FIG. 32A  FIG. 32B
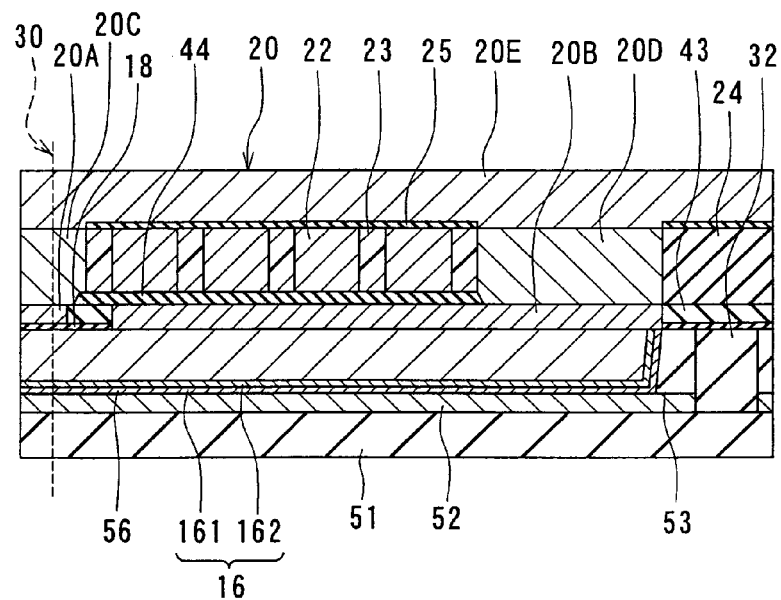
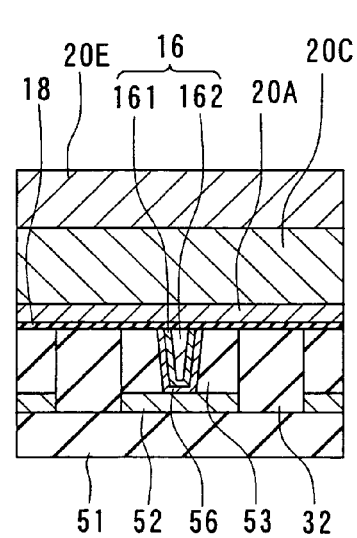
FIG. 33A  FIG. 33B

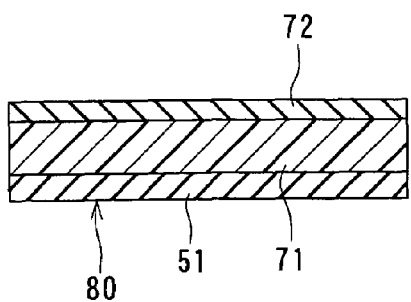
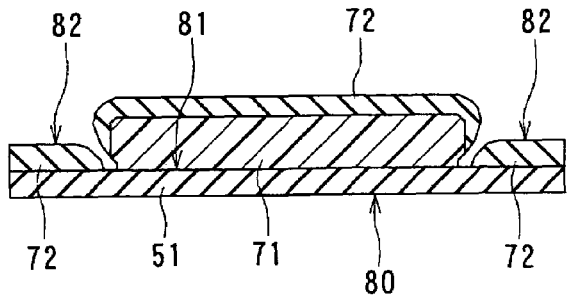
FIG. 34A                FIG. 34B
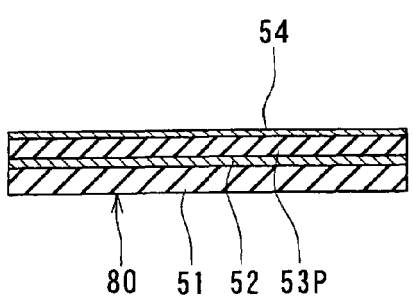
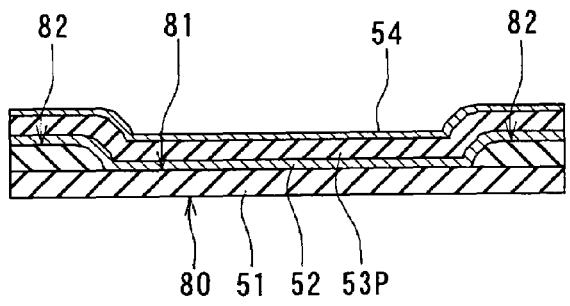
FIG. 35A                FIG. 35B
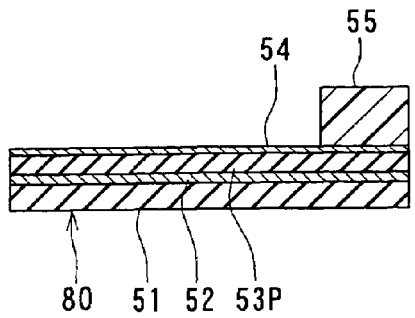
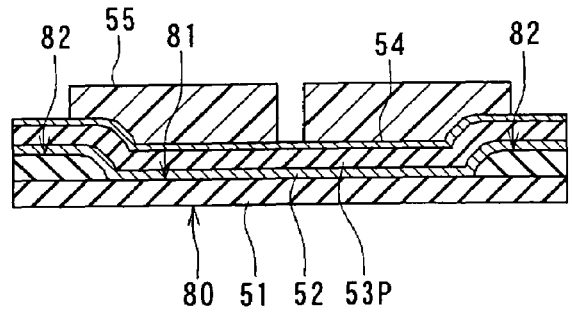
FIG. 36A                FIG. 36B

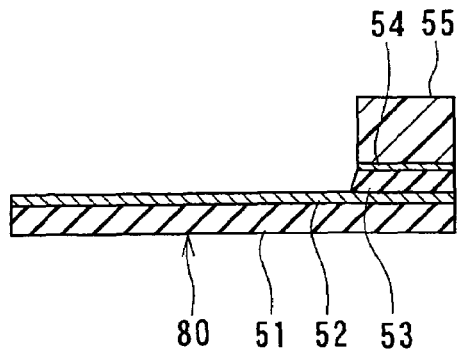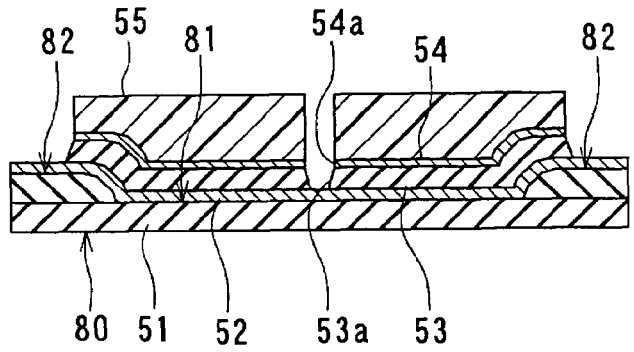
FIG. 37A   FIG. 37B
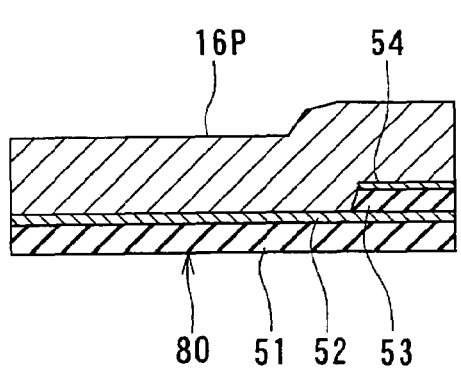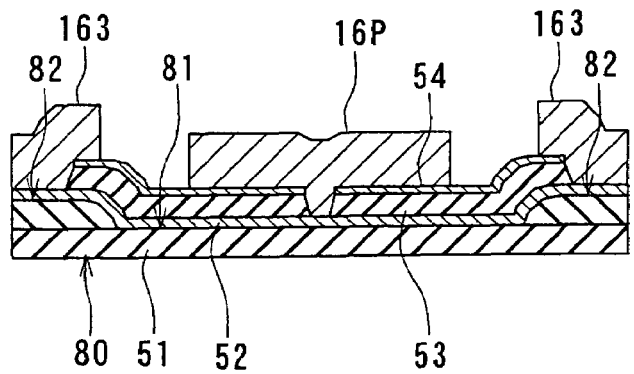
FIG. 38A   FIG. 38B
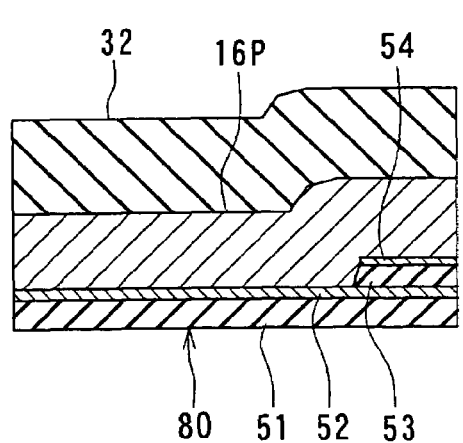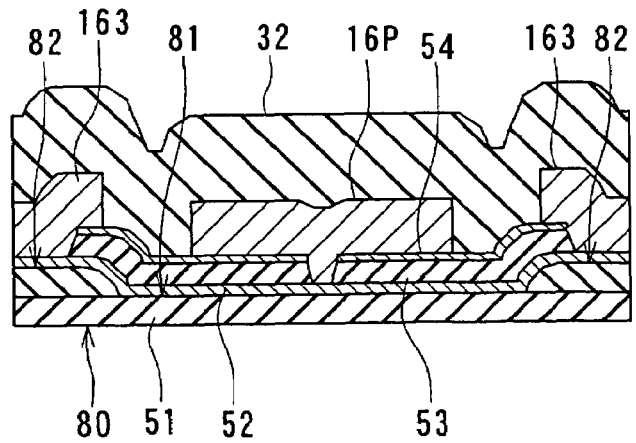
FIG. 39A   FIG. 39B

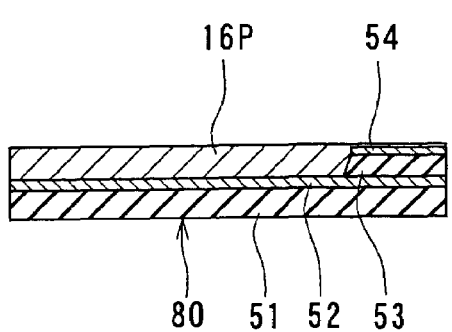
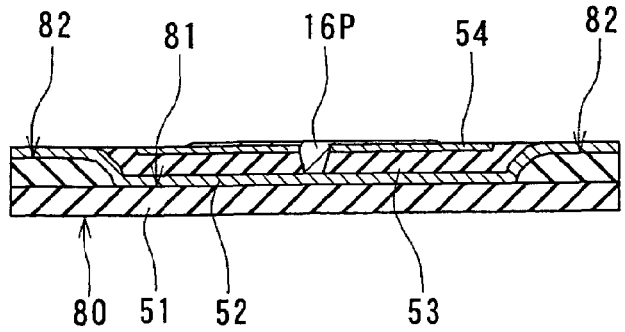
FIG. 40A　　　　　　　FIG. 40B
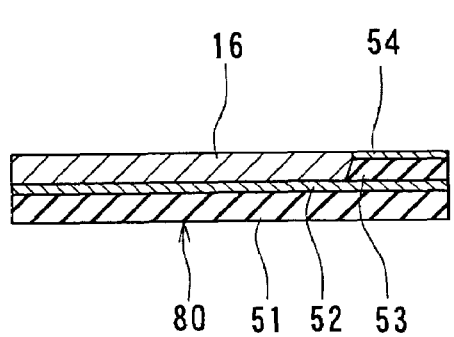
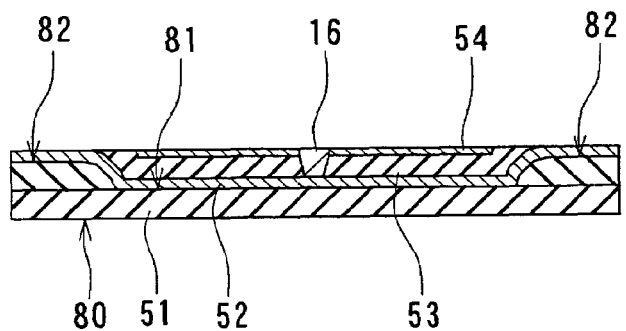
FIG. 41A　　　　　　　FIG. 41B
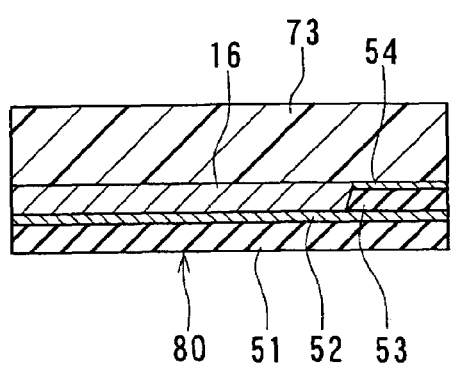
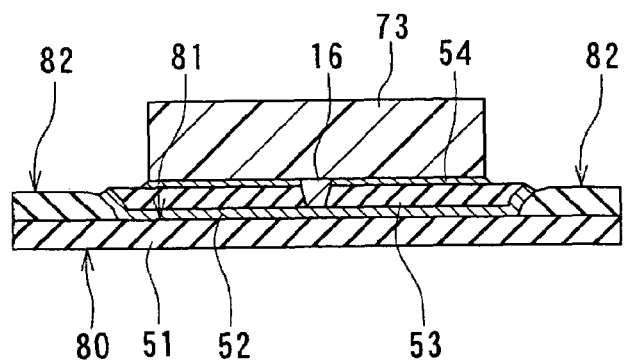
FIG. 42A　　　　　　　FIG. 42B

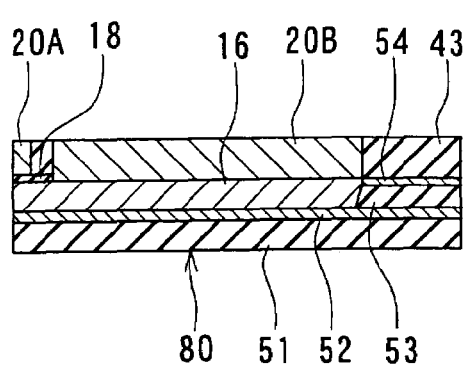
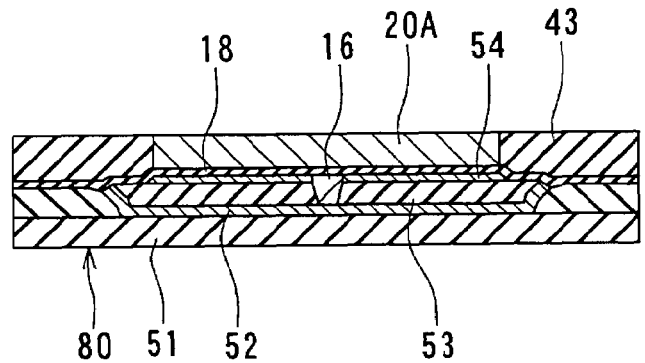
FIG. 43A   FIG. 43B
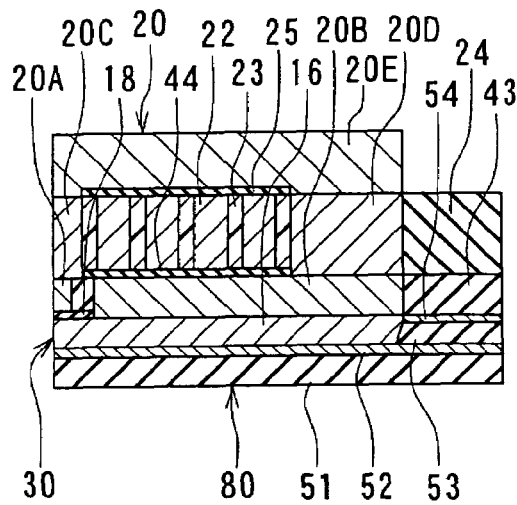
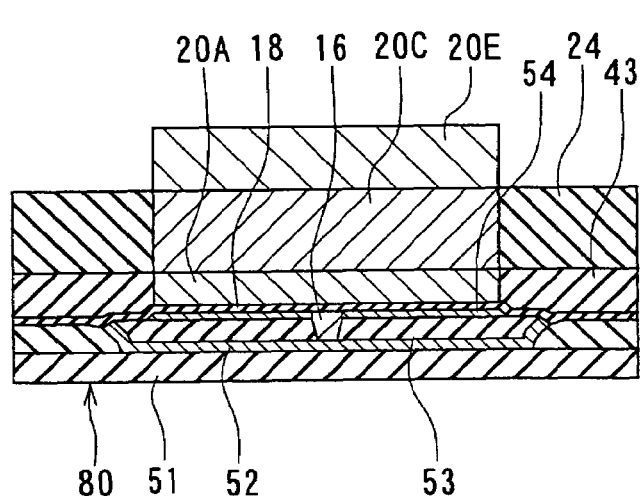
FIG. 44A   FIG. 44B

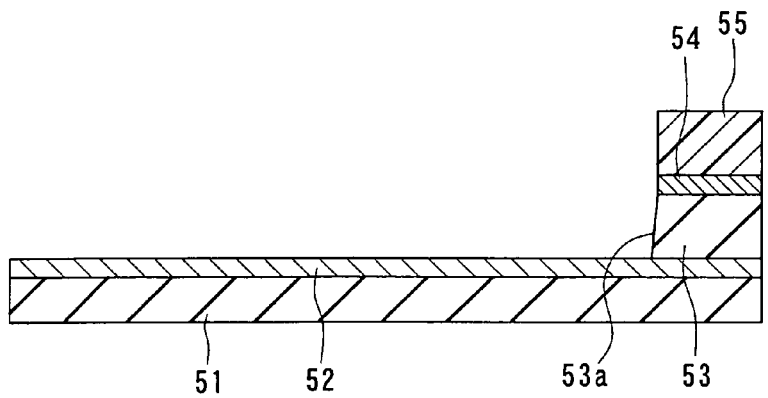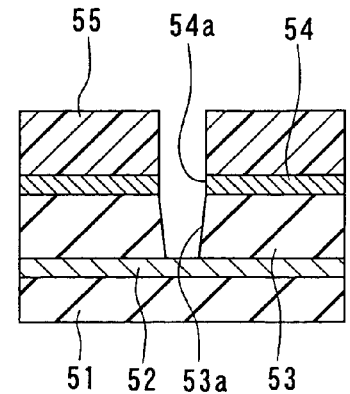
FIG. 45A  FIG. 45B
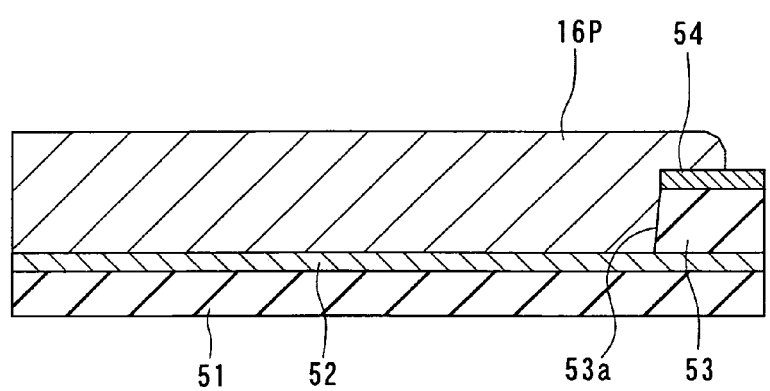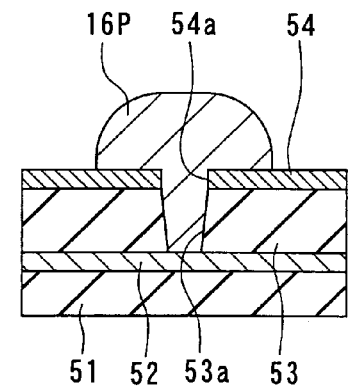
FIG. 46A  FIG. 46B

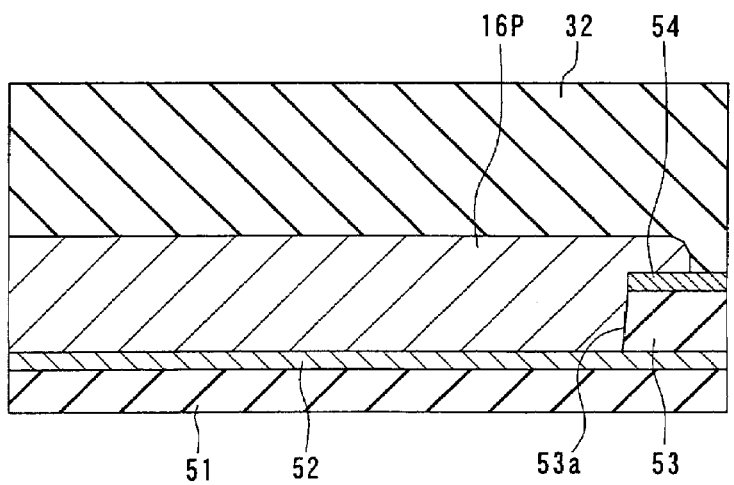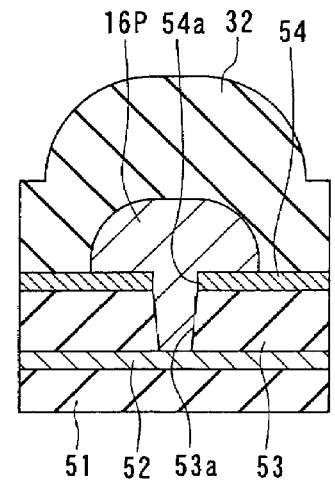
FIG. 47A        FIG. 47B
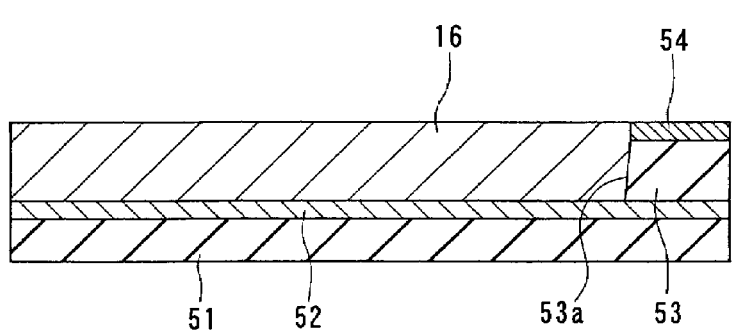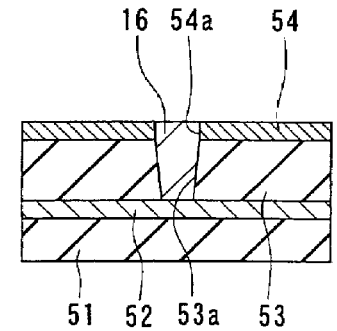
FIG. 48A        FIG. 48B

MAGNETIC HEAD FOR PERPENDICULAR MAGNETIC RECORDING AND METHOD OF MANUFACTURING SAME

BACKGROUND OF THE INVENTION

1. Field of the Invention

The present invention relates to a magnetic head for perpendicular magnetic recording that is used for writing data on a recording medium by using a perpendicular magnetic recording system and to a method of manufacturing such a magnetic head.

2. Description of the Related Art

The recording systems of magnetic read/write devices include a longitudinal magnetic recording system wherein signals are magnetized in the direction along the surface of the recording medium (the longitudinal direction) and a perpendicular magnetic recording system wherein signals are magnetized in the direction perpendicular to the surface of the recording medium. It is known that the perpendicular magnetic recording system is harder to be affected by thermal fluctuation of the recording medium and capable of implementing higher linear recording density, compared with the longitudinal magnetic recording system.

Like magnetic heads for longitudinal magnetic recording, magnetic heads for perpendicular magnetic recording typically used have a structure in which a reproducing (read) head having a magnetoresistive element (that may be hereinafter called an MR element) for reading and a recording (write) head having an induction-type electromagnetic transducer for writing are stacked on a substrate. The write head comprises a magnetic pole layer that produces a magnetic field in the direction perpendicular to the surface of the recording medium. The pole layer incorporates a track width defining portion and a wide portion, for example. The track width defining portion has an end located in a medium facing surface that faces toward the recording medium. The wide portion is coupled to the other end of the track width defining portion and has a width greater than the width of the track width defining portion. The track width defining portion has a nearly uniform width.

For the perpendicular magnetic recording system, it is an improvement in recording medium and an improvement in write head that mainly contributes to an improvement in recording density. It is a reduction in track width and an improvement in writing characteristics that is particularly required for the write head to achieve higher recording density. On the other hand, if the track width is reduced, the writing characteristics, such as an overwrite property that is a parameter indicating an overwriting capability, are reduced. It is therefore required to achieve better writing characteristics as the track width is reduced. Here, the length of the track width defining portion orthogonal to the medium facing surface is called a neck height. The smaller the neck height, the better is the overwrite property.

A magnetic head used for a magnetic disk drive such as a hard disk drive is typically provided in a slider. The slider has the above-mentioned medium facing surface. The medium facing surface has an air-inflow-side end and an air-outflow-side end. The slider slightly flies over the surface of the recording medium by means of the airflow that comes from the air-inflow-side end into the space between the medium facing surface and the recording medium. The magnetic head is typically disposed near the air-outflow-side end of the medium facing surface of the slider. In a magnetic disk drive the magnetic head is aligned through the use of a rotary actuator, for example. In this case, the magnetic head moves over the recording medium along a circular orbit centered on the center of rotation of the rotary actuator. In such a magnetic disk drive, a tilt called a skew of the magnetic head is created with respect to the tangent of the circular track, in accordance with the position of the magnetic head across the tracks.

In a magnetic disk drive of the perpendicular magnetic recording system that exhibits a better capability of writing on a recording medium than the longitudinal magnetic recording system, in particular, if the above-mentioned skew is created, problems arise, such as a phenomenon in which data stored on an adjacent track is erased when data is written on a specific track (that is hereinafter called adjacent track erasing) or unwanted writing is performed between adjacent two tracks. To achieve higher recording density, it is required to suppress adjacent track erasing. Unwanted writing between adjacent two tracks affects detection of servo signals for alignment of the magnetic head and the signal-to-noise ratio of a read signal.

A technique is known for preventing the problems resulting from the skew as described above, as disclosed in the Published U.S. Patent Application No. 2003/0151850A1, the Published Unexamined Japanese Patent Application 2003-203311, and the U.S. Pat. No. 6,504,675B1, for example. According to this technique, the end face of the track width defining portion located in the medium facing surface is made to have a shape in which the side located backward in the direction of travel of the recording medium (that is, the side located on the air-inflow-end side of the slider) is shorter than the opposite side. Typically, in the medium facing surface of a magnetic head, the end farther from the substrate is located forward in the direction of travel of the recording medium (that is, on the air-outflow-end side of the slider). Therefore, the above-mentioned shape of the end face of the track width defining portion located in the medium facing surface is such a shape that the side closer to the substrate is shorter than the side farther from the substrate.

As a magnetic head for perpendicular magnetic recording, a magnetic head comprising a pole layer and a shield is known, as disclosed in the U.S. Pat. No. 4,656,546, for example. In the medium facing surface of this magnetic head, an end face of the shield is located forward of an end face of the pole layer along the direction of travel of the recording medium with a specific small space. Such a magnetic head will be hereinafter called a shield-type head. In the shield-type head, the shield prevents a magnetic flux from reaching the recording medium, the flux being generated from the end face of the pole layer and extending in directions except the direction perpendicular to the surface of the recording medium. The shield-type head achieves a further improvement in linear recording density.

The U.S. Pat. No. 4,672,493 discloses a magnetic head having a structure in which magnetic layers are provided forward and backward, respectively, in the direction of travel of the recording medium with respect to a middle magnetic layer to be the pole layer, and coils are disposed between the middle magnetic layer and the forward magnetic layer, and between the middle magnetic layer and the backward magnetic layer, respectively. This magnetic head is capable of increasing components perpendicular to the surface of the recording medium among components of the magnetic field generated from the medium-facing-surface-side end of the middle magnetic layer.

Consideration will now be given to a method of forming a pole layer in which the shape of the end of the track width defining portion located in the medium facing surface is such that the side closer to the substrate is shorter than the side farther from the substrate, as mentioned above. In prior art, frame plating has been often employed as a method of forming such a pole layer. According to the method of forming the pole layer by frame plating, an electrode film is first formed on a layer serving as a base of the pole layer. Next, a photoresist layer is formed on the electrode film. The photoresist layer is then patterned to form a frame having a groove whose shape corresponds to the pole layer. Next, plating is performed by feeding a current to the electrode film to form the pole layer in the groove. The frame is then removed. Next, portions of the electrode film except the portion below the pole layer are removed. This method of forming the pole layer by frame plating has the following problems.

First, when frame plating is employed, it is difficult to form a groove having a small width in the photoresist layer by photolithography. Therefore, the problem is that it is difficult to reduce the track width when the pole layer is formed by frame plating.

To solve this problem, it is possible that, after forming the pole layer by frame plating, both side portions of the track width defining portion are etched by dry etching such as ion beam etching so as to reduce the track width. According to this method, however, the length of the side of the end of the track width defining portion closer to the substrate becomes closer to zero as the track width is reduced, and the track width defining portion may be thereby broken down. It is thus difficult to reduce the track width by this method, too.

To form the pole layer by frame plating, it is required to remove portions of the electrode film except the portion below the pole layer after the pole layer is formed. This removal of the electrode film is performed by dry etching such as ion beam etching. When this removal is performed, both side portions of the pole layer are etched, too. As a result, the neck height is made greater than a desired height, and the pole layer goes out of a desired shape. Furthermore, if the pole layer is formed by frame plating, and then both side portions of the track width defining portion are etched to reduce the track width as described above, the neck height is made greater than a desired height, and the pole layer goes out of a desired shape, too. The overwrite property is reduced if the neck height is made greater than a desired height and the pole layer goes out of a desired shape as thus described.

When frame plating is used to form the pole layer, after forming the pole layer, it is polished by chemical mechanical polishing (hereinafter referred to as CMP), for example, to flatten the top surface of the pole layer and to make the pole layer have a desired thickness. Here, both side portions of the track width defining portion are tilted with respect to the direction orthogonal to the substrate surface. Therefore, if the point at which polishing of the pole layer is stopped varies, the track width varies.

The U.S. Patent Application Publication No. 2003/0151850A1 discloses a method in which a groove having a shape corresponding to the pole layer is formed in an inorganic insulating film, and the pole layer is formed in the groove by plating or sputtering. In this method the width of the pole layer, that is, the track width, is defined by the width of the groove formed in the inorganic insulating film. Therefore, it is required to reduce the width of the groove to reduce the track width. However, in this method, if the width of the groove is reduced, the width of the bottom of the groove is made much smaller. Therefore, it is difficult to form the electrode film for plating without defects at the bottom of the groove when the pole layer is formed in the groove by plating. If the electrode film is not satisfactorily formed at the bottom of the groove, there may be a case in which the plating film is not fully grown near the bottom of the groove and defects such as keyholes result when the pole layer is formed by plating. In addition, if the width of the bottom of the groove is reduced, it is difficult to form the pole layer without defects near the bottom of the groove when the pole layer is formed in the groove by sputtering, too.

OBJECT AND SUMMARY OF THE INVENTION

It is an object of the invention to provide a magnetic head for perpendicular magnetic recording that has a shape capable of preventing problems resulting from the skew and allows a pole layer having a small width to be formed with accuracy, and to provide a method of manufacturing such a magnetic head.

A magnetic head for perpendicular magnetic recording of the invention comprises: a medium facing surface that faces toward a recording medium; a coil for generating a magnetic field corresponding to data to be written on the recording medium; a pole layer having an end face located in the medium facing surface, allowing a magnetic flux corresponding to the field generated by the coil to pass therethrough, and generating a write magnetic field for writing the data on the recording medium through the use of a perpendicular magnetic recording system; a pole-layer-encasing layer made of a nonmagnetic material and having a penetrating groove that accommodates the pole layer; and a substrate on which the encasing layer, the pole layer and the coil are stacked.

The end face of the pole layer located in the medium facing surface has: a first side close to the substrate; a second side located opposite to the first side; a third side connecting an end of the first side to an end of the second side; and a fourth side connecting the other end of the first side to the other end of the second side. The second side defines the track width. The end face of the pole layer located in the medium facing surface has a width that decreases as the distance from the first side decreases.

The magnetic head of the invention further comprises an underlying layer that is made of a nonmagnetic conductive material, touches one of surfaces of the encasing layer closer to the substrate, and has an area greater than an area of the groove. According to the invention, it is thereby possible to form the pole layer in the groove by plating through feeding a current to the underlying layer.

The magnetic head of the invention may further comprise a nonmagnetic conductive layer made of a nonmagnetic conductive material and disposed on the other of the surfaces of the encasing layer farther from the substrate. The nonmagnetic conductive layer has a penetrating opening, and an edge of the opening is located directly above an edge of the groove in the other of the surfaces of the encasing layer farther from the substrate.

The magnetic head of the invention may further comprise a nonmagnetic conductive film made of a nonmagnetic conductive material and disposed between the encasing layer and the pole layer in the groove. In this case, the nonmagnetic conductive film may touch the underlying layer and may be electrically connected to the underlying layer.

A magnetic head for perpendicular magnetic recording manufactured by a method of the invention comprises: a medium facing surface that faces toward a recording medium; a coil for generating a magnetic field corresponding to data to be written on the recording medium; a pole layer having an end face located in the medium facing surface, allowing a magnetic flux corresponding to the field generated by the coil to pass therethrough, and generating a write magnetic field for writing the data on the recording medium through the use of a perpendicular magnetic recording system; a pole-layer-encasing layer made of a nonmagnetic material and having a penetrating groove that accommodates the pole layer; and a substrate on which the encasing layer, the pole layer and the coil are stacked.

The end face of the pole layer located in the medium facing surface has: a first side close to the substrate; a second side located opposite to the first side; a third side connecting an end of the first side to an end of the second side; and a fourth side connecting the other end of the first side to the other end of the second side. The second side defines the track width. The end face of the pole layer located in the medium facing surface has a width that decreases as the distance from the first side decreases. The magnetic head further comprises an underlying layer that is made of a nonmagnetic conductive material, touches one of surfaces of the encasing layer closer to the substrate, and has an area greater than an area of the groove.

The method of manufacturing the magnetic head for perpendicular magnetic recording of the invention comprises the steps of: forming the underlying layer; forming the encasing layer on the underlying layer; forming the pole layer in the groove of the encasing layer by plating through feeding a current to the underlying layer; and forming the coil.

According to the method of the invention, the underlying layer used as an electrode for plating is disposed below the pole-layer-encasing layer having the penetrating groove. As a result, it is possible to form the pole layer having a small width in the groove with accuracy by plating through feeding a current to the underlying layer.

In the method of the invention, the step of forming the encasing layer may include the steps of: forming a nonmagnetic layer on the underlying layer, wherein the nonmagnetic layer will be formed into the encasing layer by forming the groove therein later; forming a polishing stopper layer on the top surface of the nonmagnetic layer, wherein the polishing stopper layer is made of a nonmagnetic conductive material, has a penetrating opening having a shape corresponding to the plane geometry of the pole layer, and indicates the level at which polishing to be performed later is stopped; and forming the groove in the nonmagnetic layer by selectively etching a portion of the nonmagnetic layer exposed from the opening of the polishing stopper layer, so that the nonmagnetic layer is formed into the encasing layer. In addition, the step of forming the pole layer may include the steps of: forming a magnetic layer to be the pole layer, such that the groove is filled and a top surface of the magnetic layer is located higher than a top surface of the polishing stopper layer; forming a coating layer to cover the magnetic layer and the polishing stopper layer; and polishing the coating layer and the magnetic layer until the polishing stopper layer is exposed, so that the magnetic layer is formed into the pole layer.

The method of the invention may further comprise the step of forming a nonmagnetic conductive film made of a nonmagnetic conductive material and disposed between the encasing layer and the pole layer in the groove, the step being performed after the step of forming the groove in the nonmagnetic layer and before the step of forming the magnetic layer. In this case, the nonmagnetic conductive film may touch the underlying layer and may be electrically connected to the underlying layer.

The method of the invention may further comprise the step of removing the polishing stopper layer after the step of polishing the coating layer and the magnetic layer. In this case, ion beam etching may be performed to remove the stopper layer and to etch a portion of the magnetic layer in the step of removing the polishing stopper layer.

The method of the invention may further comprise the step of forming an insulating layer to be disposed below the underlying layer before the step of forming the underlying layer. The top surface of this insulating layer includes a first region including a region in which the pole layer will be disposed later and a second region disposed outside the first region, and a difference in level is created between the first and second regions such that the second region is located farther from the substrate than the first region. In this case, the underlying layer is formed on the top surface of the insulating layer in the step of forming the underlying layer. In addition, the step of forming the encasing layer may include the steps of: forming a nonmagnetic layer on the underlying layer, wherein the nonmagnetic layer will be formed into the encasing layer by forming the groove therein later; forming a polishing stopper layer on a top surface of the nonmagnetic layer, wherein the polishing stopper layer is made of a nonmagnetic conductive material, has a penetrating opening having a shape corresponding to a plane geometry of the pole layer, and indicates a level at which polishing to be performed later is stopped; and forming the groove in the nonmagnetic layer by selectively etching a portion of the nonmagnetic layer exposed from the opening of the polishing stopper layer, so that the nonmagnetic layer is formed into the encasing layer. In addition, the step of forming the pole layer may include the steps of: forming a magnetic layer to be the pole layer, such that the groove is filled and a top surface of the magnetic layer is located higher than a top surface of the polishing stopper layer; forming a coating layer to cover the magnetic layer and the polishing stopper layer; and polishing the coating layer and the magnetic layer until a portion of the polishing stopper layer disposed above the first region of the top surface of the insulating layer and a portion of the underlying layer disposed on the second region of the top surface of the insulating layer are exposed, so that the magnetic layer is formed into the pole layer.

In the method of the invention, the step of forming the encasing layer may include: the step of forming a nonmagnetic layer on the underlying layer, wherein the nonmagnetic layer will be formed into the encasing layer by forming the groove therein later; the step of forming a lower polishing stopper layer made of a nonmagnetic conductive material on a top surface of the nonmagnetic layer, the lower polishing stopper layer indicating a level at which polishing of a second polishing step to be performed later is stopped; the step of forming a spacer layer having a specific thickness on the lower polishing stopper layer; the step of forming a penetrating opening in each of the spacer layer and the lower polishing stopper layer, the opening having a shape corresponding to a plane geometry of the pole layer; the step of forming the groove in the nonmagnetic layer by selectively etching a portion of the nonmagnetic layer exposed from the openings of the spacer layer and the lower polishing stopper layer, so that the nonmagnetic layer is formed into the encasing layer; and the step of forming an upper polishing stopper layer on the spacer layer, the upper polishing stopper layer indicating a level at which polishing of a first polishing step to be performed later is stopped. In addition, the step of forming the pole layer may include: the step of forming a magnetic layer to be the pole layer, such that the groove is filled and a top surface of the magnetic layer is located higher than a top surface of the upper polishing stopper layer; the step of forming a coating layer to cover the magnetic layer and the upper polishing stopper layer; the first polishing step of polishing the coating layer and the magnetic layer until the upper polishing stopper layer is exposed; the step of removing the upper polishing stopper layer after the first polishing step; and the second polishing step of polishing the spacer layer and the magnetic layer until the lower polishing stopper layer is exposed, so that the magnetic layer is formed into the pole layer.

The lower polishing stopper layer may be made of a nonmagnetic conductive material. The spacer layer may be made of an insulating material or a semiconductor material. The upper polishing stopper layer may be made of a nonmagnetic conductive material. In this case, the upper polishing stopper layer may be formed in the groove, too. Furthermore, the upper polishing stopper layer may touch the underlying layer and may be electrically connected to the underlying layer.

The method of the invention may further comprise the step of removing the lower polishing stopper layer after the second polishing step. In this case, ion beam etching may be performed to remove the lower polishing stopper layer and to etch a portion of the magnetic layer in the step of removing the lower polishing stopper layer.

In the magnetic head for perpendicular magnetic recording of the invention, the underlying layer made of a nonmagnetic conductive material touches the surface of the pole-layer-encasing layer closer to the substrate, and has an area greater than the area of the groove. According to the invention, it is thereby possible to form the pole layer in the groove by plating through feeding a current to the underlying layer. As a result, it is possible to form the pole layer with accuracy that has a small width and a shape capable of preventing problems resulting from the skew.

The magnetic head of the invention may further comprise the nonmagnetic conductive layer made of a nonmagnetic conductive material and disposed on the surface of the pole-layer-encasing layer farther from the substrate, wherein the nonmagnetic conductive layer has the penetrating opening, and the edge of the opening is located directly above the edge of the groove located in the surface of the pole-layer-encasing layer farther from the substrate. In this case, it is possible to control the thickness of the pole layer and the width of the top surface of the pole layer with accuracy and to form the pole layer having a desired shape with higher accuracy.

The magnetic head of the invention may further comprise the nonmagnetic conductive film made of a nonmagnetic conductive material and disposed between the encasing layer and the pole layer in the groove. In this case, the pole layer has a width smaller than the width of the groove. According to the invention, it is thereby possible to easily form the groove and to easily reduce the width of the pole layer.

According to the method of manufacturing the magnetic head for perpendicular magnetic recording of the invention, the underlying layer used as an electrode for plating is disposed below the pole-layer-encasing layer having the penetrating groove. As a result, it is possible to form the pole layer having a small width in the groove with accuracy by plating through feeding a current to the underlying layer. According to the invention, it is thereby possible to form the pole layer with accuracy that has a small width and a shape capable of preventing problems resulting from the skew.

In the method of the invention, the polishing stopper layer may be provided, the stopper layer having the penetrating opening with a shape corresponding to the plane geometry of the pole layer. In this case, it is possible to control the thickness of the pole layer and the width of the top surface of the pole layer with accuracy and to form the pole layer having a desired shape with higher accuracy.

In the method of the invention, the nonmagnetic conductive film may be provided to be disposed between the encasing layer and the pole layer in the groove. In this case, the pole layer has a width smaller than the width of the groove.

According to the invention, it is thereby possible to easily form the groove and to easily reduce the width of the pole layer.

Other and further objects, features and advantages of the invention will appear more fully from the following description.

BRIEF DESCRIPTION OF THE DRAWINGS

FIG. 5A to FIG. 5C are views for illustrating a step that follows the step shown in FIG. 4A and FIG. 4B.

FIG. 9A and FIG. 9B are views for illustrating a step that follows the step shown in FIG. 8A to FIG. 8C.

FIG. 10A and FIG. 10B are views for illustrating a step that follows the step shown in FIG. 9A and FIG. 9B.

FIG. 16A and FIG. 16B are views for illustrating a step of a method of manufacturing a magnetic head of a second embodiment of the invention.

FIG. 17A and FIG. 17B are views for illustrating a step that follows the step shown in FIG. 16A and FIG. 16B.

FIG. 22A and FIG. 22B are views for illustrating a step that follows the step shown in FIG. 21A and FIG. 21B.

FIG. 23A and FIG. 23B are views for illustrating a step that follows the step shown in FIG. 22A and FIG. 22B.

FIG. 24A and FIG. 24B are views for illustrating a step that follows the step shown in FIG. 23A and FIG. 23B.

FIG. 25A and FIG. 25B are views for illustrating a step that follows the step shown in FIG. 24A and FIG. 24B.

FIG. 32A and FIG. 32B are views for illustrating a step that follows the step shown in FIG. 31A and FIG. 31B.

FIG. 33A and FIG. 33B are views for illustrating a step that follows the step shown in FIG. 32A and FIG. 32B.

FIG. 34A and FIG. 34B are views for illustrating a step of a method of manufacturing a magnetic head of a fourth embodiment of the invention.

FIG. 35A and FIG. 35B are views for illustrating a step that follows the step shown in FIG. 34A and FIG. 34B.

FIG. 36A and FIG. 36B are views for illustrating a step that follows the step shown in FIG. 35A and FIG. 35B.

FIG. 37A and FIG. 37B are views for illustrating a step that follows the step shown in FIG. 36A and FIG. 36B.

FIG. 38A and FIG. 38B are views for illustrating a step that follows the step shown in FIG. 37A and FIG. 37B.

FIG. 39A and FIG. 39B are views for illustrating a step that follows the step shown in FIG. 38A and FIG. 38B.

FIG. 40A and FIG. 40B are views for illustrating a step that follows the step shown in FIG. 39A and FIG. 39B.

FIG. 41A and FIG. 41B are views for illustrating a step that follows the step shown in FIG. 40A and FIG. 40B.

FIG. 42A and FIG. 42B are views for illustrating a step that follows the step shown in FIG. 41A and FIG. 41B.

FIG. 43A and FIG. 43B are views for illustrating a step that follows the step shown in FIG. 42A and FIG. 42B.

FIG. 44A and FIG. 44B are views for illustrating a step that follows the step shown in FIG. 43A and FIG. 43B.

FIG. 45A and FIG. 45B are views for illustrating a step of a method of manufacturing a magnetic head of a fifth embodiment of the invention.

FIG. 46A and FIG. 46B are views for illustrating a step that follows the step shown in FIG. 45A and FIG. 45B.

FIG. 47A and FIG. 47B are views for illustrating a step that follows the step shown in FIG. 46A and FIG. 46B.

FIG. 48A and FIG. 48B are views for illustrating a step that follows the step shown in FIG. 47A and FIG. 47B.

DETAILED DESCRIPTION OF THE PREFERRED EMBODIMENTS

First Embodiment

Figure 1:
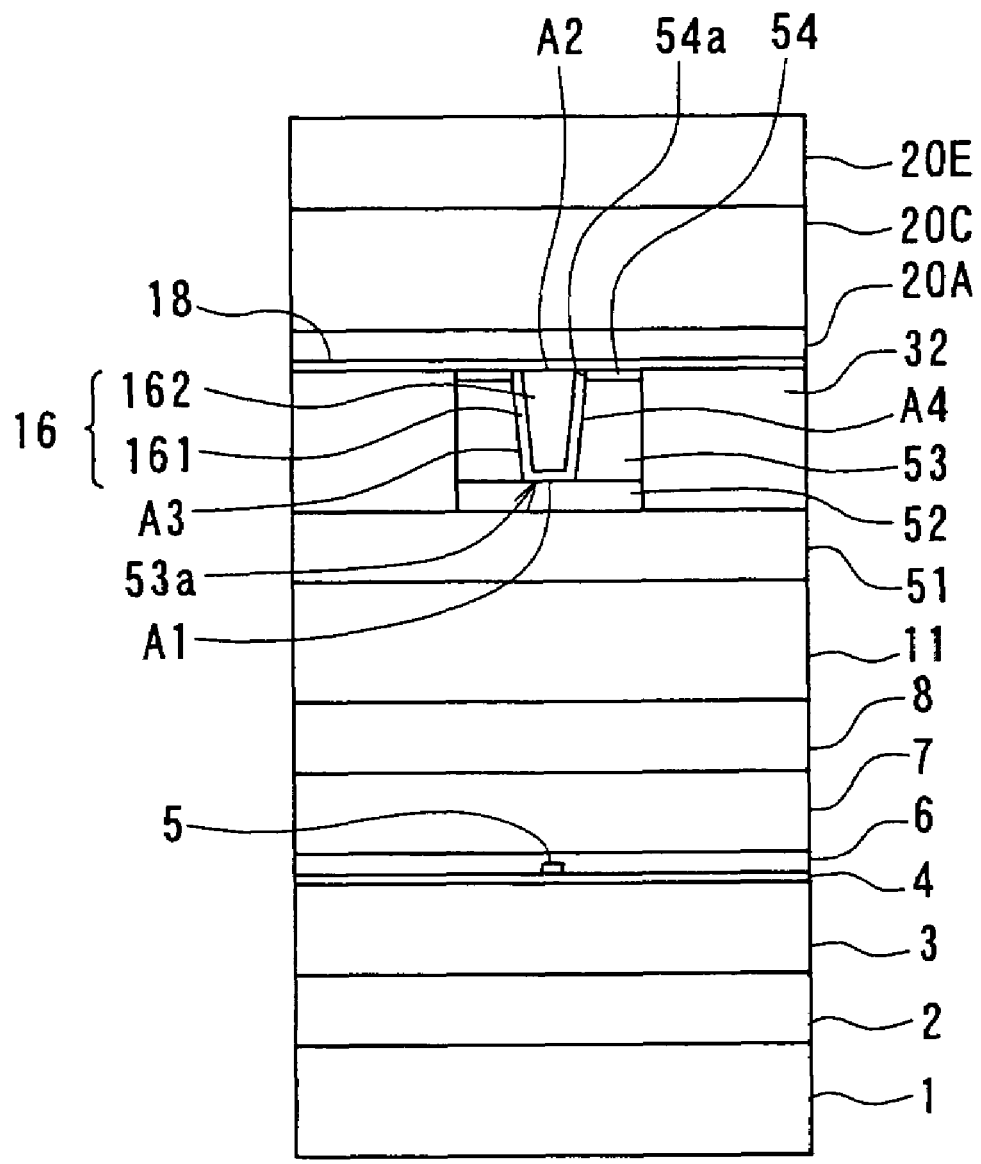
FIG. 1 is a front view of the medium facing surface of a magnetic head of a first embodiment of the invention.
Figure 2:
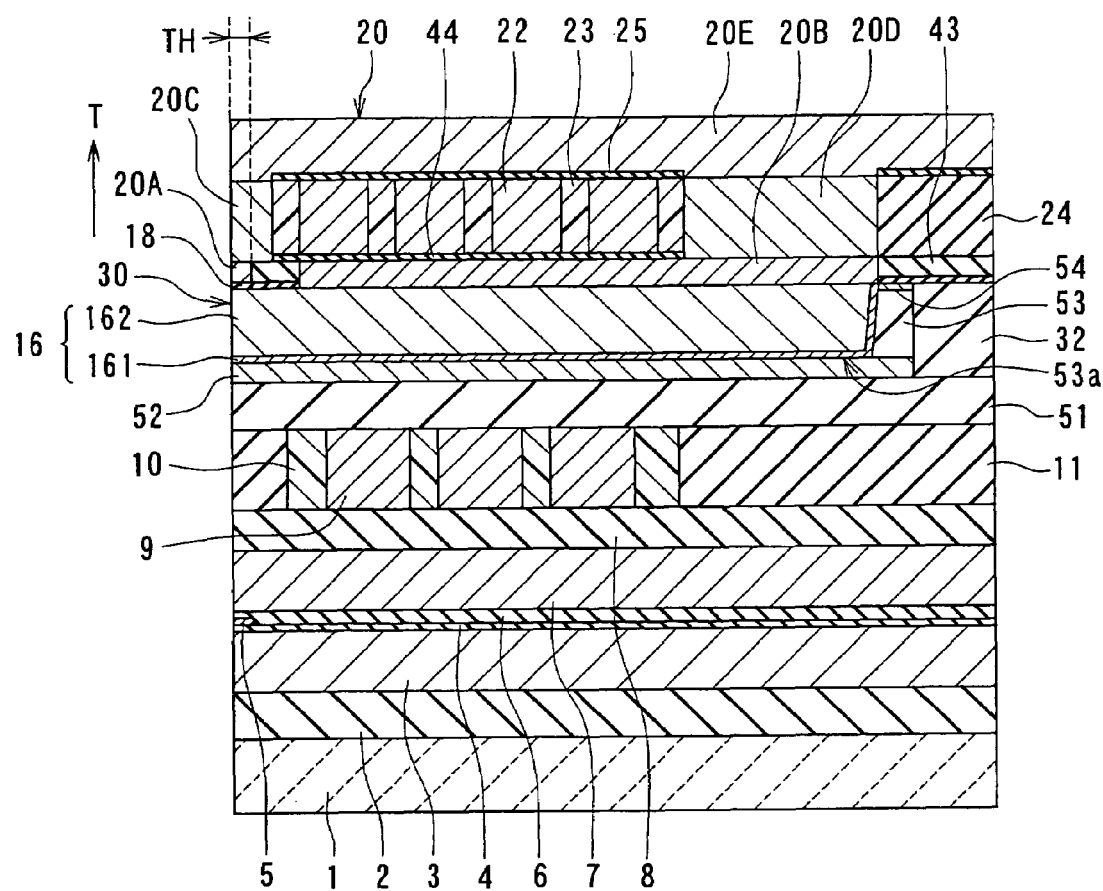
FIG. 2 is a cross-sectional view for illustrating the configuration of the magnetic head of the first embodiment of the invention.

Preferred embodiments of the invention will now be described in detail with reference to the accompanying drawings. Reference is now made to FIG. 1 and FIG. 2 to describe the configuration of a magnetic head for perpendicular magnetic recording of a first embodiment of the invention. FIG. 1 is a front view for illustrating the medium facing surface of the magnetic head of the embodiment. FIG. 2 is a cross-sectional view for illustrating the configuration of the magnetic head of the embodiment. FIG. 2 illustrates a cross section orthogonal to the medium facing surface and a surface of a substrate. The arrow indicated with T in FIG. 2 shows the direction of travel of a recording medium.

As shown in FIG. 1 and FIG. 2, the magnetic head for perpendicular magnetic recording (hereinafter simply called the magnetic head) of the embodiment comprises: a substrate 1 made of a ceramic such as aluminum oxide and titanium carbide ($Al_2O_3$—TiC); an insulating layer 2 made of an insulating material such as alumina ($Al_2O_3$) and disposed on the substrate 1; a bottom shield layer 3 made of a magnetic material and disposed on the insulating layer 2; a bottom shield gap film 4 that is an insulating film disposed on the bottom shield layer 3; a magnetoresistive (MR) element 5 as a read element disposed on the bottom shield gap film 4; a top shield gap film 6 that is an insulating film disposed on the MR element 5; and a top shield layer 7 made of a magnetic material and disposed on the top shield gap film 6. The portion from the bottom shield layer 3 to the top shield layer 7 make up the read head.

The MR element 5 has an end that is located in the medium facing surface 30 that faces toward a recording medium. The MR element 5 may be an element made of a magneto-sensitive film that exhibits a magnetoresistive effect, such as an anisotropic magnetoresistive (AMR) element, a giant magnetoresistive (GMR) element, or a tunnel magnetoresistive (TMR) element.

The magnetic head further comprises: an insulating layer 8 made of an insulating material and disposed on the top shield layer 7; a coil 9 formed on the insulating layer 8; an insulating layer 10 made of an insulating material and disposed around the coil 9 and in the space between adjacent ones of the turns of the coil 9; and an insulating layer 11 made of an insulating material and disposed around the insulating layer 10. The coil 9 is flat-whorl-shaped. The coil 9 and the insulating layers 10 and 11 have flattened top surfaces. The insulating layers 8 and 11 are made of alumina, for example. The insulating layer 10 is made of photoresist, for example. The coil 9 is made of a conductive material such as copper.

The magnetic head further comprises: an insulating layer 51 made of an insulating material and disposed on the flattened top surfaces of the coil 9 and the insulating layers 10 and 11; an underlying layer 52 made of a nonmagnetic conductive material and disposed on the insulating layer 51; and a pole-layer-encasing layer 53 made of a nonmagnetic material and disposed on the underlying layer 52.

The insulating layer 51 may be made of any of alumina, silicon oxide ($SiO_x$), and silicon oxynitride (SiON), for example.

The underlying layer 52 may be made of any of Ru, Ta, Mo, W, Ti, Au, Pt, NiCu, TiN and NiPd, for example. The material of the underlying layer 52 is preferably the one having a low resistivity and a relatively high hardness. The material of the underlying layer 52 is preferably Ru, in particular, since Ru has a resistivity and a hardness that are appropriate. The underlying layer 52 has a thickness of 0.1 µm, for example.

The pole-layer-encasing layer 53 has a groove 53a that opens in the top surface thereof and that accommodates the pole layer described later. The groove 53a penetrates the pole-layer-encasing layer 53. The encasing layer 53 may be made of any of alumina, silicon oxide ($SiO_x$), and silicon oxynitride (SiON), for example. The encasing layer 53 has a thickness that falls within a range of 0.20 to 0.35 μm inclusive, for example.

The underlying layer 52 is in contact with a surface (the bottom surface) of the pole-layer-encasing layer 53 closer to the substrate 1, and has an area wider than that of the groove 53a.

The magnetic head further comprises a polishing stopper layer 54 made of a nonmagnetic conductive material and disposed on the top surface of the pole-layer-encasing layer 53. The polishing stopper layer 54 corresponds to the nonmagnetic conductive layer of the invention. The polishing stopper layer 54 has an opening 54a that penetrates, and the edge of the opening 54a is located directly above the edge of the groove 53a in a surface (the top surface) of the pole-layer-encasing layer 53 further from the substrate 1. The polishing stopper layer 54 may be made of any of Ta, Mo, W, Ti, Ru, Rh, Re, Pt, Pd, Ir, TiN, TiW and NiCr, for example.

The magnetic head further comprises the pole layer 16 disposed in the groove 53a. The pole layer 16 incorporates: a first layer 161 located closer to the surface of the groove 53a; and a second layer 162 located farther from the surface of the groove 53a.

Each of the first layer 161 and the second layer 162 is made of a magnetic material. The first layer 161 may be made of any of CoFeN, CoNiFe and NiFe, for example. The second layer 162 may be made of any of NiFe, CoNiFe and CoFe, for example.

The magnetic head further comprises a coating layer 32 disposed on the insulating layer 51 around the layered structure made up of the underlying layer 52, the encasing layer 53, the polishing stopper layer 54 and the pole layer 16. The coating layer 32 is made of alumina, for example. The coating layer 32, the polishing stopper layer 54 and the pole layer 16 have flattened top surfaces.

The magnetic head further comprises a gap layer 18 disposed on the flattened top surfaces of the coating layer 32, the polishing stopper layer 54 and the pole layer 16. The gap layer 18 has an opening located at a distance from the medium facing surface 30. The gap layer 18 may be made of an insulating material such as alumina or a nonmagnetic metal material such as Ru, NiCu, Ta, W or NiB.

The magnetic head further comprises a shield layer 20. The shield layer 20 has: a first layer 20A disposed on the gap layer 18; a second layer 20C disposed on the first layer 20A; a yoke layer 20B disposed on a portion of the pole layer 16 where the opening of the gap layer 18 is formed; a coupling layer 20D disposed on the yoke layer 20B; and a third layer 20E disposed to couple the second layer 20C to the coupling layer 20D. The first layer 20A, the yoke layer 20B, the second layer 20C, the coupling layers 20D, and the third layer 20E are each made of a magnetic material. These layers 20A to 20E may be made of any of CoFeN, CoNiFe and NiFe, for example.

The magnetic head further comprises a nonmagnetic layer 43 made of a nonmagnetic material and disposed around the yoke layer 20B. A portion of the nonmagnetic layer 43 is disposed on a side of the first layer 20A. The nonmagnetic layer 43 is made of an inorganic insulating material such as alumina or coating glass. Alternatively, the nonmagnetic layer 43 may be made up of a layer of a nonmagnetic metal material and a layer of an insulating material disposed thereon. In this case, the nonmagnetic metal material may be a refractory metal such as Ta, Mo, Nb, W, Cr, Ru, Cu or Ni.

The magnetic head further comprises: an insulating layer 44 disposed on regions of the top surfaces of the yoke layer 20B and the nonmagnetic layer 43 in which a coil described later is disposed; the coil 22 disposed on the insulating layer 44; an insulating layer 23 disposed around the coil 22 and in the space between adjacent ones of the turns of the coil 22; an insulating layer 24 disposed around the insulating layer 23; and an insulating layer 25 disposed on the coil 22 and the insulating layers 23 and 24. The coil 22 is flat-whorl-shaped. A portion of the coil 22 passes between the second layer 20C and the coupling layer 20D. The coil 22 is made of a conductive material such as copper. The second layer 20C, the coupling layer 20D, the coil 22, and the insulating layers 23 and 24 have flattened top surfaces. The insulating layer 23 is made of photoresist, for example. The insulating layers 44, 24 and 25 are made of alumina, for example.

The portion from the coil 9 to the third layer 20E of the shield layer 20 make up the write head. Although not shown, the magnetic head further comprises a protection layer for covering the shield layer 20.

As described so far, the magnetic head of the embodiment comprises the medium facing surface 30 that faces toward a recording medium, the read head, and the write head. The read head and the write head are stacked on the substrate 1. The read head is disposed backward in the direction T of travel of the recording medium (that is, on the air-inflow-end side of the slider). The write head is disposed forward in the direction T of travel of the recording medium (that is, on the air-outflow-end side of the slider).

The read head comprises the MR element 5 as the read element, and the bottom shield layer 3 and the top shield layer 7 for shielding the MR element 5. Portions of the bottom shield layer 3 and the top shield layer 7 that are located on a side of the medium facing surface 30 are opposed to each other, the MR element 5 being placed between these portions. The read head further comprises: the bottom shield gap film 4 disposed between the MR element 5 and the bottom shield layer 3; and the top shield gap film 6 disposed between the MR element 5 and the top shield layer 7.

The write head comprises the coil 9, the insulating layer 51, the underlying layer 52, the pole-layer-encasing layer 53, the polishing stopper layer 54, the pole layer 16, the gap layer 18, the shield layer 20, and the coil 22. The coils 9 and 22 generate a magnetic field corresponding to data to be written on the recording medium. The coil 9 is not a component requisite for the write head and may be omitted.

The pole layer 16 has an end face located in the medium facing surface 30. The pole layer 16 allows the magnetic flux corresponding to the field generated by the coil 22 to pass therethrough and generates a write magnetic field for writing the data on the medium by using the perpendicular magnetic recording system.

The shield layer 20 has an end located in the medium facing surface 30, and has a portion located away from the medium facing surface 30 and coupled to the pole layer 16. The gap layer 18 is made of a nonmagnetic material and provided between the pole layer 16 and the shield layer 20.

In the medium facing surface 30, the end face of the shield layer 20 is disposed forward of the end face of the pole layer 16 along the direction T of travel of the recording medium with a specific space created by the thickness of the gap layer 18. At least part of the coil 22 is disposed between the pole layer 16 and the shield layer 20 and insulated from the pole layer 16 and the shield layer 20.

The shield layer 20 has: the first layer 20A disposed adjacent to the gap layer 18; the second layer 20C disposed on a side of the first layer 20A farther from the gap layer 18; the yoke layer 20B disposed on the portion of the pole layer 16 where the opening of the gap layer 18 is formed; the coupling layer 20D disposed on the yoke layer 20B; and the third layer 20E disposed to couple the second layer 20C to the coupling layer 20D. The second layer 20C is disposed between the medium facing surface 30 and the at least part of the coil 22.

Figure 3:
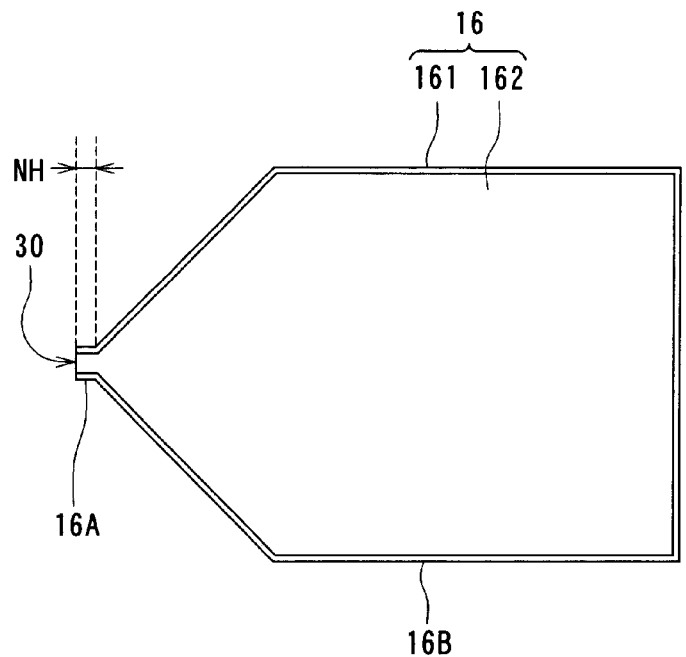
FIG. 3 is a top view of the pole layer of the magnetic head of the first embodiment of the invention.

FIG. 3 is a top view of the pole layer 16. As shown in FIG. 3, the pole layer 16 incorporates a track width defining portion 16A and a wide portion 16B. The track width defining portion 16A has an end located in the medium facing surface 30 and has a uniform width. The wide portion 16B is coupled to the other end of the track width defining portion 16A and has a width greater than the width of the track width defining portion 16A. The wide portion 16B is equal in width to the track width defining portion 16A at the interface with the track width defining portion 16A, and gradually increases in width as the distance from the medium facing surface 30 increases and then maintains a specific width to the end of the wide portion 16B. Here, the length of the track width defining portion 16A orthogonal to the medium facing surface 30 is called a neck height NH. The neck height NH falls within a range of 0.1 to 0.3 µm inclusive, for example.

As shown in FIG. 1, the end face of the pole layer 16 located in the medium facing surface 30 has: a first side A1 close to the substrate 1; a second side A2 opposite to the first side A1; a third side A3 connecting an end of the first side A1 to an end of the second side A2; and a fourth side A4 connecting the other end of the first side A1 to the other end of the second side A2. The second side A2 defines the track width. The width of the end face of the pole layer 16 located in the medium facing surface 30 decreases as the distance from the first side A1 decreases.

The length of the second side A2, that is, the track width, falls within a range of 0.08 to 0.12 µm inclusive, for example. The thickness of the pole layer 16 falls within a range of 0.20 to 0.30 µm inclusive, for example. Each of the third side A3 and the fourth side A4 forms an angle that falls within a range of 5 to 12 degrees inclusive, for example, with respect to the direction orthogonal to the top surface of the substrate 1. The thickness of the gap layer 18 falls within a range of 40 to 80 nm inclusive, for example.

The polishing stopper layer 54 is disposed on the top surface of the pole-layer-encasing layer 53. The polishing stopper layer 54 has the opening 54a that penetrates, and the edge of the opening 54a is located directly above the edge of the groove 53a in the top surface of the pole-layer-encasing layer 53. The polishing stopper layer 54 has a thickness that falls within a range of 20 to 60 nm inclusive, for example.

The pole layer 16 incorporates: the first layer 161 located closer to the surface of the groove 53a; and the second layer 162 located farther from the surface of the groove 53a. The first layer 161 has a thickness that falls within a range of 40 to 100 nm inclusive, for example.

The first layer 20A of the shield layer 20 has: a first end located in the medium facing surface 30; and a second end opposite to the first end. The second layer 20C of the shield layer 20 also has: a first end located in the medium facing surface 30; and a second end opposite to the first end. The second end of the first layer 20A defines the throat height TH. That is, as shown in FIG. 2, the throat height TH is the minimum distance between the first end and the second end of the portion of the first layer 20A facing toward the pole layer 16 with the gap layer 18 disposed in between. The throat height TH falls within a range of 0.1 to 0.3 µm inclusive, for example. The minimum distance between the first end and the second end of the portion of the second layer 20C facing toward the pole layer 16 with the gap layer 18 and the first layer 20A disposed in between falls within a range of 0.5 to 0.8 µm inclusive, for example. The first layer 20A and the yoke layer 20B have a thickness that falls within a range of 0.3 to 0.8 µm inclusive, for example. The second layer 20C and the coupling layer 20D have a thickness that falls within a range of 2.0 to 2.5 µm inclusive, for example. The third layer 20E has a thickness that falls within a range of 2.0 to 3.0 µm inclusive, for example.

In the drawings of the present patent application such as FIG. 2, the pole layer 16 is shown greater in thickness than the yoke layer 20B to illustrate details of the structure around the pole layer 16. However, the pole layer 16 actually has a thickness that is nearly equal to or smaller than the thickness of the yoke layer 20B, for example.

Figures 4A, 4B:
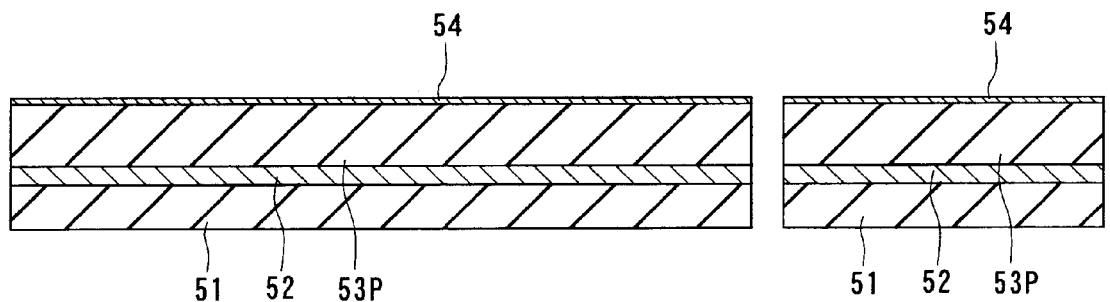
FIG. 4A and FIG. 4B are views for illustrating a step of a method of manufacturing the magnetic head of the first embodiment of the invention.

Reference is now made to FIG. 4A to FIG. 10A, FIG. 4B to FIG. 10B, and FIG. 5C to FIG. 8C to describe a method of manufacturing the magnetic head of the embodiment. FIG. 4A, FIG. 9A and FIG. 10A each illustrate a cross section of the layered structure in the course of the manufacturing process, the cross section being orthogonal to the medium facing surface and the substrate. FIG. 4B, FIG. 9B and FIG. 10B each illustrate a cross section of a portion of the layered structure near the medium facing surface, the cross section being parallel to the medium facing surface. FIG. 5A to FIG. 8A each illustrate the top surface of the layered structure. FIG. 5B to FIG. 8B each illustrate a cross section of the layered structure orthogonal to the medium facing surface and the substrate. FIG. 5C to FIG. 8C each illustrate a cross section of a portion of the layered structure near the medium facing surface, the cross section being parallel to the medium facing surface. Portions closer to the substrate 1 than the insulating layer 51 are omitted in FIG. 4A to FIG. 10A, FIG. 4B to FIG. 10B, and FIG. 5C to FIG. 8C.

According to the method of manufacturing the magnetic head of the embodiment, as shown in FIG. 2, the insulating layer 2, the bottom shield layer 3 and the bottom shield gap film 4 are first formed on the substrate 1 one by one. Next, the MR element 5 and a lead not shown that is connected to the MR element 5 are formed on the bottom shield gap film 4. Next, the MR element 5 and the lead are covered with the top shield gap film 6. Next, the top shield layer 7 and the insulating layer 8 are formed one by one on the top shield gap film 6. Next, the coil 9 and the insulating layers 10 and 11 are formed on the insulating layer 8. Next, the top surfaces of the coil 9 and the insulating layers 10 and 11 are flattened by CMP, for example.

FIG. 4A and FIG. 4B illustrate the following step. In the step, first, the insulating layer 51 and the underlying layer 52 are formed one by one on the flattened top surfaces of the coil 9 and the insulating layers 10 and 11. Next, a nonmagnetic layer 53P is formed on the underlying layer 52. The groove 53a will be formed in the nonmagnetic layer 53P and the nonmagnetic layer 53P will be thereby formed into the pole-layer-encasing layer 53 later. Next, the polishing stopper layer 54 is formed by sputtering, for example, on the nonmagnetic layer 53P.

FIG. 5A to FIG. 5C illustrate the following step. In the step, first, a photoresist layer having a thickness of 1.0 µm, for example, is formed on the polishing stopper layer 54. The photoresist layer is then patterned to form a mask 55 for making the groove 53a of the encasing layer 53. The mask 55 has an opening having a shape corresponding to the groove 53a.

Next, the polishing stopper layer 54 is selectively etched, using the mask 55. The opening 54a that penetrates is thereby formed in the polishing stopper layer 54. The opening 54a has a shape corresponding to the plane geometry of the pole layer 16 to be formed later. Furthermore, a portion of the nonmagnetic layer 53P exposed from the opening 54a of the polishing stopper layer 54 is selectively etched so as to form the groove 53a of the nonmagnetic layer 53P. The mask 55 is then removed. The nonmagnetic layer 53P is formed into the pole-layer-encasing layer 53 by forming the groove 53a therein. The polishing stopper layer 54 indicates the level at which polishing is to be performed later is stopped. The edge of the opening 54a of the polishing stopper layer 54 is located directly above the edge of the groove 53a located in the top surface of the pole-layer-encasing layer 53.

The etching of each of the polishing stopper layer 54 and the nonmagnetic layer 53P is performed by reactive ion etching or ion beam etching, for example. The etching for forming the groove 53a of the nonmagnetic layer 53P is performed such that the walls of the groove 53a corresponding to both sides of the track width defining portion 16A of the pole layer 16 each form an angle that falls within a range of 5 to 12 degrees inclusive, for example, with respect to the direction orthogonal to the top surface of the substrate 1. The conditions for etching the nonmagnetic layer 53P by reactive ion etching will be described in detail later.

Next, the width of the opening 54a of the polishing stopper layer 54 is measured, using an electron microscope. It is preferred to use a critical dimension measurement scanning electron microscope as the electron microscope. Since the edge of the opening 54a of the polishing stopper layer 54 is located directly above the edge of the groove 53a located in the top surface of the pole-layer-encasing layer 53, the width of the opening 54a is equal to the width of the groove 53a taken in the top surface of the pole-layer-encasing layer 53. Therefore, it is possible to measure the width of the groove 53a taken in the top surface of the pole-layer-encasing layer 53 by measuring the width of the opening 54a. As a result, the track width is obtained in the following manner. As shown in FIG. 1, the track width is equal to the length of the second side A2 of the end face of the pole layer 16 located in the medium facing surface 30. The track width is equal to the width of the groove 53a in the top surface of the pole-layer-encasing layer 53 in the medium facing surface 30. Therefore, it is possible to obtain the track width by measuring the width of the groove 53a in the top surface of the pole-layer-encasing layer 53 in the medium facing surface 30.

A case is now assumed wherein the polishing stopper layer 54 is not disposed on the top surface of the pole-layer-encasing layer 53 and the encasing layer 53 is made of an insulating material such as alumina. In this case, if an attempt is made to measure the width of the groove 53a in the top surface of the pole-layer-encasing layer 53 by an electron microscope, electric charges accumulate on the top surface of the encasing layer 53 and it is impossible to obtain a correct image. According to the embodiment, in contrast, the polishing stopper layer 54 made of a conductive material is disposed on the top surface of the encasing layer 53. In addition, the edge of the opening 54a of the polishing stopper layer 54 is located directly above the edge of the groove 53a located in the top surface of the encasing layer 53. As a result, a correct image is obtained when the polishing stopper layer 54 is observed by an electron microscope, and it is thereby possible to measure the width of the opening 54a of the polishing stopper layer 54 with accuracy. It is thereby possible to measure the width of the groove 53a in the top surface of the encasing layer 53 with accuracy.

When the width of the groove 53a in the top surface of the encasing layer 53 is measured by an electron microscope as described above, the width of the bottom of the groove 53a of the encasing layer 53 may be measured at the same time. It is thereby possible to obtain the angle formed by each of the walls of the groove 53a with respect to the direction orthogonal to the top surface of the substrate 1. This will be described in detail later.

Figure 6A:
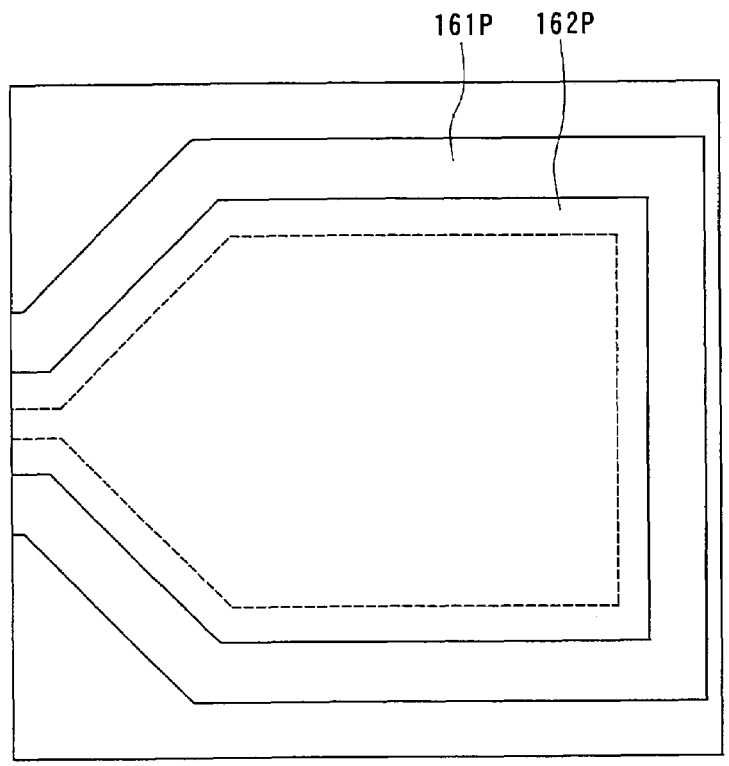
FIG. 6A to FIG. 6C are views for illustrating a step that follows the step shown in FIG. 5A to FIG. 5C.
Figure 6B:
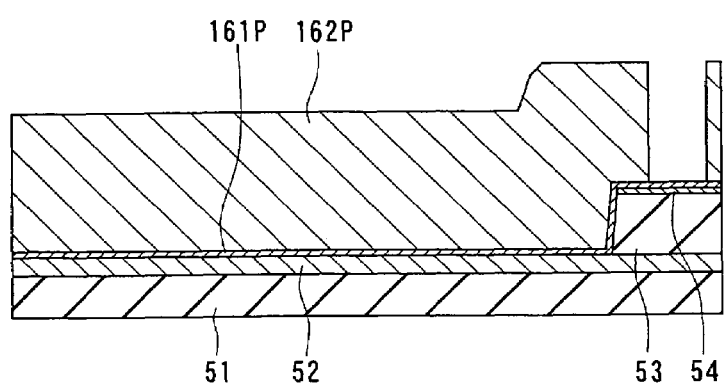
Figure 6C:
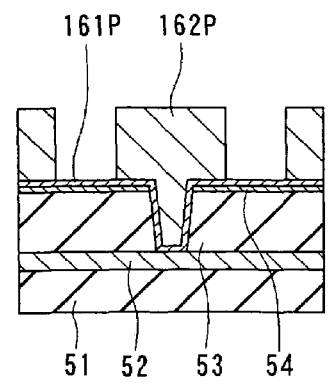

FIG. 6A to FIG. 6C illustrate the following step. In the step, first, a first magnetic layer 161P to be the first layer 161 of the pole layer 16 is formed in the groove 53a of the encasing layer 53 and on the polishing stopper layer 54. The first magnetic layer 161P is formed by sputtering or ion beam deposition (hereinafter referred to as IBD), for example. If the first magnetic layer 161P is formed by sputtering, it is preferred to employ collimation sputtering or long throw sputtering. Next, a second magnetic layer 162P to be the second layer 162 of the pole layer 16 is formed on the magnetic layer 161P. The second magnetic layer 162P is formed by frame plating, for example. In this case, the underlying layer 52 and the first magnetic layer 161P are used as electrodes for plating.

Figure 7A:
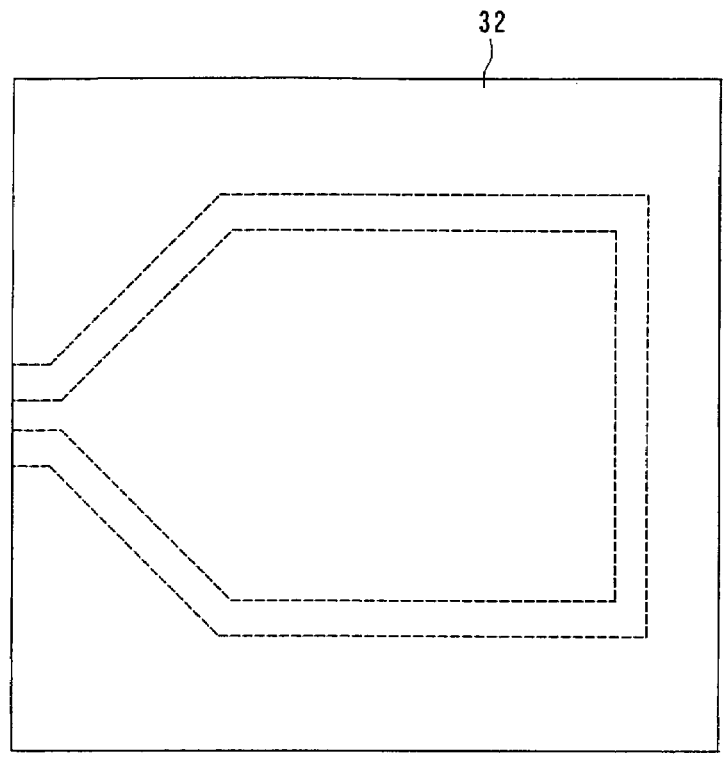
FIG. 7A to FIG. 7C are views for illustrating a step that follows the step shown in FIG. 6A to FIG. 6C.
Figure 7B:
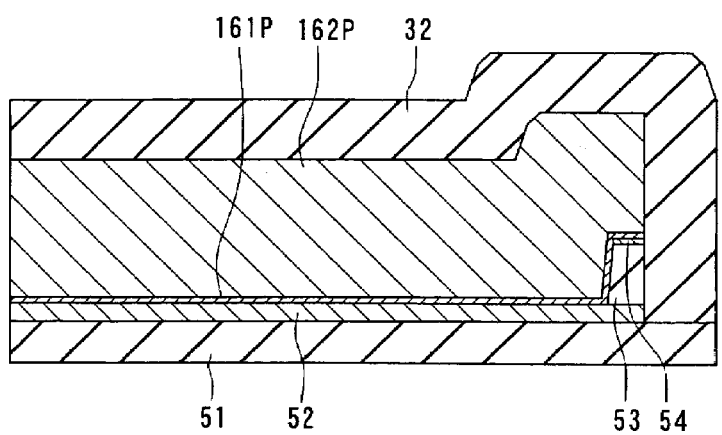
Figure 7C:
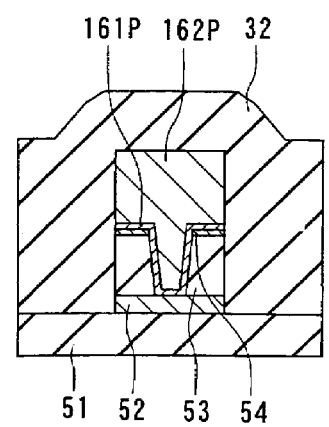

FIG. 7A to FIG. 7C illustrate the following step. In the step, first, the first magnetic layer 161P, the polishing stopper layer 54, the encasing layer 53 and the underlying layer 52 except portions of these layers below the second magnetic layer 162P are selectively removed by reactive ion etching or ion beam etching, for example, using the second magnetic layer 162P as a mask. Next, the coating layer 32 made of alumina, for example, and having a thickness of 0.8 to 1.5 µm, for example, is formed on the entire top surface of the layered structure.

Figure 8A:
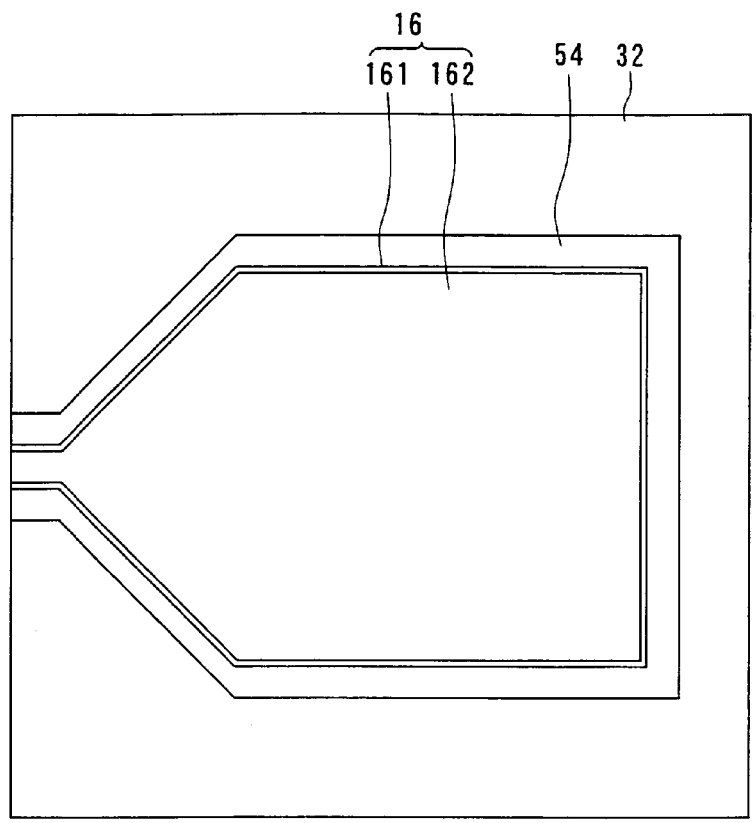
FIG. 8A to FIG. 8C are views for illustrating a step that follows the step shown in FIG. 7A to FIG. 7C.
Figure 8B:
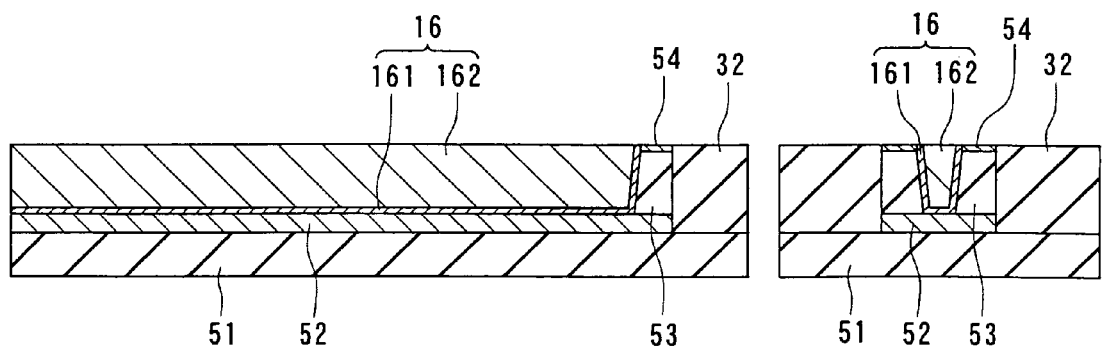
Figure 8C:
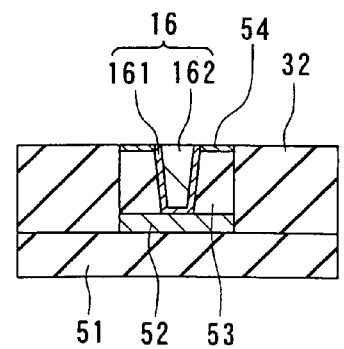

Next, as shown in FIG. 8A to FIG. 8C, the coating layer 32, the second magnetic layer 162P and the first magnetic layer 161P are polished by CMP, for example, until the polishing stopper layer 54 is exposed, and the top surfaces of the coating layer 32, the polishing stopper layer 54, the first magnetic layer 161P and the second magnetic layer 162P are thereby flattened. If the coating layer 32, the second magnetic layer 162P and the first magnetic layer 161P are polished by CMP, such a slurry is used that polishing is stopped when the polishing stopper layer 54 is exposed, such as an alumina-base slurry. It is possible to control the thickness of the pole layer 16 made up of the first layer 161 and the second layer 162 with accuracy by stopping the polishing when the polishing stopper layer 54 is exposed as thus described.

FIG. 9A and FIG. 9B illustrate the following step. In the step, first, the gap layer 18 is formed on the entire top surface of the layered structure. Next, a portion of the gap layer 18 away from the medium facing surface 30 is selectively etched to form an opening in the gap layer 18. Next, the first layer 20A is formed on the gap layer 18, and the yoke layer 20B is formed on a portion of the pole layer 16 where the opening of the gap layer 18 is formed. The first layer 20A and the yoke layer 20B may be formed by frame plating or by making a magnetic layer through sputtering and then selectively etching the magnetic layer. The first layer 20A and the yoke layer 20B have a thickness of 1.0 µm, for example, at this time.

Next, the nonmagnetic layer 43 is formed on the entire top surface of the layered structure. Next, the nonmagnetic layer 43 is polished by CMP, for example, so that the first layer 20A and the yoke layer 20B are exposed, and the top surfaces of the first layer 20A, the yoke layer 20B and the nonmagnetic layer 43 are flattened. This polishing is performed such that the first layer 20A and the yoke layer 20B have a thickness of 0.8 µm, for example.

FIG. 10A and FIG. 10B illustrate the following step. In the step, first, the insulating layer 44 made of alumina, for example, and having a thickness that falls within a range of 0.2 to 0.3 µm inclusive, for example, is formed by a method such as sputtering on the entire top surface of the layered structure. Next, the insulating layer 44 except a portion on which the coil 22 and the insulating layer 23 will be disposed later is removed by etching.

Next, the coil 22 is formed by frame plating, for example, on the insulating layer 44. Next, the second layer 20C and the coupling layer 20D are formed by frame plating, for example. Alternatively, the coil 22 may be formed after the second layer 20C and the coupling layer 20D are formed.

Next, the insulating layer 23 made of photoresist, for example, is selectively formed in the space between adjacent ones of the turns of the coil 22 and around the coil 22. Next, the insulating layer 24 having a thickness of 4 to 4.5 μm, for example, is formed on the entire top surface of the layered structure. Next, the insulating layer 24 is polished by CMP, for example, so that the second layer 20C, the coupling layer 20D and the coil 22 are exposed, and the top surfaces of the second layer 20C, the coupling layer 20D, the coil 22 and the insulating layers 23 and 24 are thereby flattened. Next, the insulating layer 25 is formed on the coil 22 and the insulating layers 23 and 24. Next, the third layer 20E is formed by frame plating, for example, to complete the shield layer 20.

Next, although not shown, a protection layer is formed to cover the entire top surface of the layered structure. Wiring and terminals are then formed on the protection layer, the substrate is cut into sliders, and the steps including polishing of the medium facing surface 30 and fabrication of flying rails are performed. The magnetic head is thus completed.

The operation and effects of the magnetic head of the embodiment will now be described. The magnetic head writes data on a recording medium by using the write head and reads data written on the recording medium by using the read head. In the write head, the coil 22 generates a magnetic field that corresponds to the data to be written on the medium. The pole layer 16 and the shield layer 20 form a magnetic path through which a magnetic flux corresponding to the magnetic field generated by the coil 22 passes. The pole layer 16 allows the flux corresponding to the field generated by the coil 22 to pass and generates a write magnetic field used for writing the data on the medium through the use of the perpendicular magnetic recording system. The shield layer 20 takes in a disturbance magnetic field applied from outside the magnetic head to the magnetic head. It is thereby possible to prevent erroneous writing on the recording medium caused by the disturbance magnetic field intensively taken in into the pole layer 16.

According to the embodiment, in the medium facing surface 30, the end face of the shield layer 20 is disposed forward of the end face of the pole layer 16 along the direction T of travel of the recording medium (that is, on the air-outflow-end side of the slider) with a specific small space created by the gap layer 18. The location of an end of the bit pattern written on the recording medium is determined by the location of the end of the pole layer 16 that is closer to the gap layer 18 and located in the medium facing surface 30. The shield layer 20 takes in a magnetic flux generated from the end face of the pole layer 16 located in the medium facing surface 30 and extending in directions except the direction orthogonal to the surface of the recording medium so as to prevent the flux from reaching the recording medium. It is thereby possible to prevent the direction of magnetization of the bit pattern already written on the medium from being changed due to the effect of the above-mentioned flux. According to the embodiment, an improvement in linear recording density is thus achieved.

According to the embodiment, as shown in FIG. 1, the end face of the pole layer 16 located in the medium facing surface 30 has a width that decreases as the distance from the first side A1 decreases. It is thereby possible to prevent the problems resulting from the skew.

In the method of manufacturing the magnetic head of the embodiment, the step of forming the pole-layer-encasing layer 53 comprises the following first to third steps. The first step is the step of forming the nonmagnetic layer 53P that will be formed into the pole-layer-encasing layer 53 by forming the groove 53a therein. The second step is the step of forming the polishing stopper layer 54 on the top surface of the nonmagnetic layer 53P, wherein the polishing stopper layer 54 is made of a nonmagnetic conductive material, has the penetrating opening 54a having a shape corresponding to the plane geometry of the pole layer 16, and indicates the level at which polishing performed later is stopped. The third step is the step of forming the groove 53a in the nonmagnetic layer 53P by selectively etching the portion of the nonmagnetic layer 53P exposed from the opening 54a of the polishing stopper layer 54, so that the nonmagnetic layer 53P is formed into the pole-layer-encasing layer 53.

In the method of manufacturing the magnetic head of the embodiment, the step of forming the pole layer 16 comprises the following fourth to sixth steps. The fourth step is the step of forming the magnetic layers 161P and 162P to be the pole layer 16 such that the groove 53a is filled and the top surfaces of the magnetic layers 161P and 162P are located higher than the top surface of the polishing stopper layer 54. The fifth step is the step of forming the coating layer 32 to cover the magnetic layers 161P and 162P and the polishing stopper layer 54. The sixth step is the step of polishing the coating layer 32 and the magnetic layers 161P and 162P until the polishing stopper layer 54 is exposed, so that the magnetic layers 161P and 162P are formed into the first layer 161 and the second layer 162 of the pole layer 16, respectively.

According to the embodiment, the polishing of the magnetic layers 161P and 162P is stopped when the polishing stopper layer 54 is exposed. The edge of the opening 54a of the polishing stopper layer 54 is located directly above the edge of the groove 53a located in the top surface of the encasing layer 53. Therefore, a difference in level is hardly created between the top surface of the polishing stopper layer 54 and the top surface of the pole layer 16 when the polishing of the magnetic layers 161P and 162P is stopped. As a result, according to the embodiment, it is possible to control the thickness of the pole layer 16 with accuracy. Furthermore, it is thereby possible to control the width of the top surface of the pole layer 16 with accuracy. As a result, it is possible to control the track width with accuracy.

According to the embodiment, it is possible to measure the width of the groove 53a in the top surface of the pole-layer-encasing layer 53 by measuring the width of the opening 54a of the polishing stopper layer 54. As a result, it is possible to measure the track width in the course of the manufacturing process of the magnetic head. It is thereby possible to improve the efficiency in manufacturing the magnetic head.

According to the embodiment, the side portions of the pole layer 16 are not etched. As a result, it is impossible that the neck height NH is made greater than a desired value and/or the pole layer 16 goes out of a desired shape. It is therefore possible to improve the overwrite property.

Because of the foregoing features of the embodiment, it is possible to form the pole layer 16 with accuracy that has a small width and a shape capable of preventing the problems resulting from the skew.

Consideration will now be given to a case in which a groove that does not penetrate is formed in the pole-layer-encasing layer and the pole layer is formed in the groove by plating. In this case, if the track width is reduced, in particular, and the width of the groove is reduced, too, it is difficult to form an electrode film for plating at the bottom of the groove without defects. If the electrode film is not satisfactorily formed at the bottom of the groove, a plating film is not sufficiently grown near the bottom of the groove and defects such as keyholes may be caused when the pole layer is formed by plating.

In the embodiment, the underlying layer 52 made of a nonmagnetic conductive material and used as an electrode for plating is disposed below the pole-layer-encasing layer 53 having the penetrating groove 53a. Therefore, according to the embodiment, the underlying layer 52 that functions as the electrode for plating exists at the bottom of the groove 53a. As a result, when the second magnetic layer 162P is formed in the groove 53a by plating, a plating film is sufficiently grown near the bottom of the groove 53a, too, by feeding a current to the underlying layer 52. It is thereby possible to prevent defects such as keyholes. Therefore, according to the embodiment, the pole layer 16 having a desired shape is formed with accuracy even if the track width is reduced.

Figure 11:
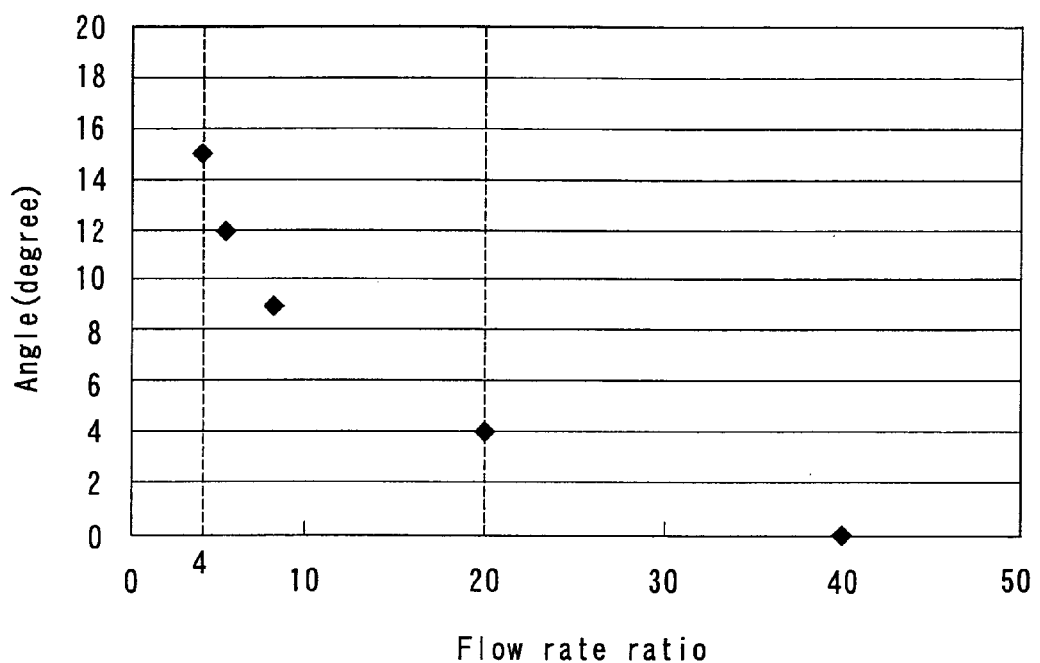
FIG. 11 is a plot for showing a result of a first experiment for finding out conditions for etching of the first embodiment of the invention.
Figure 12:
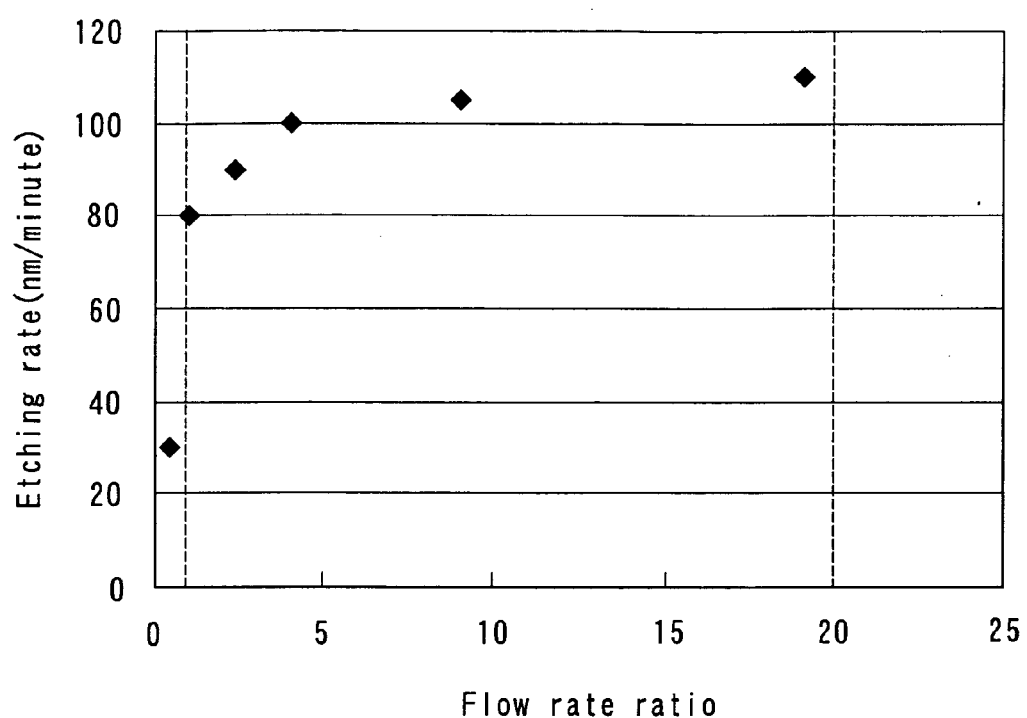
FIG. 12 is a plot for showing a result of a second experiment for finding out conditions for etching of the first embodiment of the invention.

Reference is now made to FIG. 11 and FIG. 12 to describe details of the conditions for etching the nonmagnetic layer 53P by reactive ion etching to form the groove 53a in the nonmagnetic layer 53P. The following is a description of an example in which the nonmagnetic layer 53P is made of $Al_2O_3$. In this case, an etching gas used for reactive ion etching preferably includes a first gas containing chlorine (Cl) or bromine (Br) and a second gas containing fluorine (F). The first gas contains any of $BCl_3$, $Cl_2$, $BBr_3$ and HCl, for example. The second gas contains any of $CF_4$, $C_2F_6$, $SF_6$ and $CHF_3$, for example.

The first gas is a main component that contributes to etching of the nonmagnetic layer 53P. The second gas is provided for forming a sidewall protection film on the sidewall of the groove 53a during etching. That is, when the nonmagnetic layer 53P made of $Al_2O_3$ is etched by reactive ion etching with the etching gas including the second gas, a reaction product made of AlF is formed during the etching reaction of $Al_2O_3$. Since this product is very hard to evaporate, it deposits on the sidewall of the groove 53a and forms the sidewall protection film. Because of formation of the sidewall protection film, the etching exhibits anisotropy, and an angle greater than 0 degree is formed by the wall of the groove 53a with respect to the direction orthogonal to the top surface of the substrate 1. This angle is controllable by controlling the components of the etching gas. The following is a description of first and second experiments performed for obtaining preferred conditions for the etching.

In the first experiment, the first gas is a mixed gas of a $BCl_3$ gas and a $Cl_2$ gas, and the second gas is a $CF_4$ gas. A value is obtained by dividing the flow rate of the first gas by the flow rate of the second gas. The relationship between this value and the angle formed by the wall of the groove 53a with respect to the direction orthogonal to the top surface of the substrate 1 is obtained. FIG. 11 shows the result of the first experiment. In FIG. 11, the horizontal axis indicates the value obtained by dividing the flow rate of the first gas by the flow rate of the second gas (indicated as flow rate ratio in FIG. 11). The vertical axis indicates the angle formed by the wall of the groove 53a with respect to the direction orthogonal to the top surface of the substrate 1 (indicated as degree in FIG. 11). According to the first experiment, as the value obtained by dividing the flow rate of the first gas by the flow rate of the second gas increases in a range of 4 to 20, the angle formed by the wall of the groove 53a with respect to the direction orthogonal to the top surface of the substrate 1 decreases in a range of 4 to 15 degrees. If the value obtained by dividing the flow rate of the first gas by the flow rate of the second gas is greater than 20, the angle is smaller than 4 degrees, so that the wall of the groove 53a is nearly orthogonal to the top surface of the substrate 1. If the value obtained by dividing the flow rate of the first gas by the flow rate of the second gas is smaller than 4, a phenomenon may occur in which etching of the nonmagnetic layer 53P stops and accumulation of a reaction product starts, when the width of the groove 53a is small, in particular. From these findings, it is preferred that the flow rate of the first gas falls within a range of four times to twenty times the flow rate of the second gas when the nonmagnetic layer 53P is made of $Al_2O_3$, the first gas is a mixed gas of a $BCl_3$ gas and a $Cl_2$ gas, and the second gas is a $CF_4$ gas.

In the second experiment, a mixed gas of a $BCl_3$ gas and a $Cl_2$ gas is used as an etching gas. A value is obtained by dividing the flow rate of the $BCl_3$ as by the flow rate of the $Cl_2$ gas. The relationship between this value and the etching rate of the nonmagnetic layer 53P is obtained. FIG. 12 shows the result. In FIG. 12, the horizontal axis indicates the value obtained by dividing the flow rate of the $BCl_3$ gas by the flow rate of the $Cl_2$ gas (indicated as flow rate ratio in FIG. 12). The vertical axis indicates the etching rate of the nonmagnetic layer 53P (wherein the unit is nm/minute). The $BCl_3$ gas has a greater contribution to etching of $Al_2O_3$ than the $Cl_2$ gas does. Consequently, as the result of the experiment of FIG. 12 shows, the etching rate increases as the value obtained by dividing the flow rate of the $BCl_3$ gas by the flow rate of the $Cl_2$ gas increases. According to the second experiment, it is noted that the etching rate abruptly decreases if the value obtained by dividing the flow rate of the $BCl_3$ gas by the flow rate of the $Cl_2$ gas is smaller than 1. According to the second experiment, it is noted that, if the value obtained by dividing the flow rate of the $BCl_3$ gas by the flow rate of the $Cl_2$ gas is greater than 20, a boron (B)-base reaction product may deposit on the mask 55 or the polishing stopper layer 54. If this product deposits, there arises a problem that it is difficult to remove the mask 55 and/or a problem that particles develop. From the above findings, it is preferred that the flow rate of the $BCl_3$ gas falls within a range of one time to twenty times the flow rate of the $Cl_2$ gas inclusive when the nonmagnetic layer 53P is made of $Al_2O_3$ and the first gas is a mixed gas of a $BCl_3$ gas and a $Cl_2$ gas.

Figure 13:
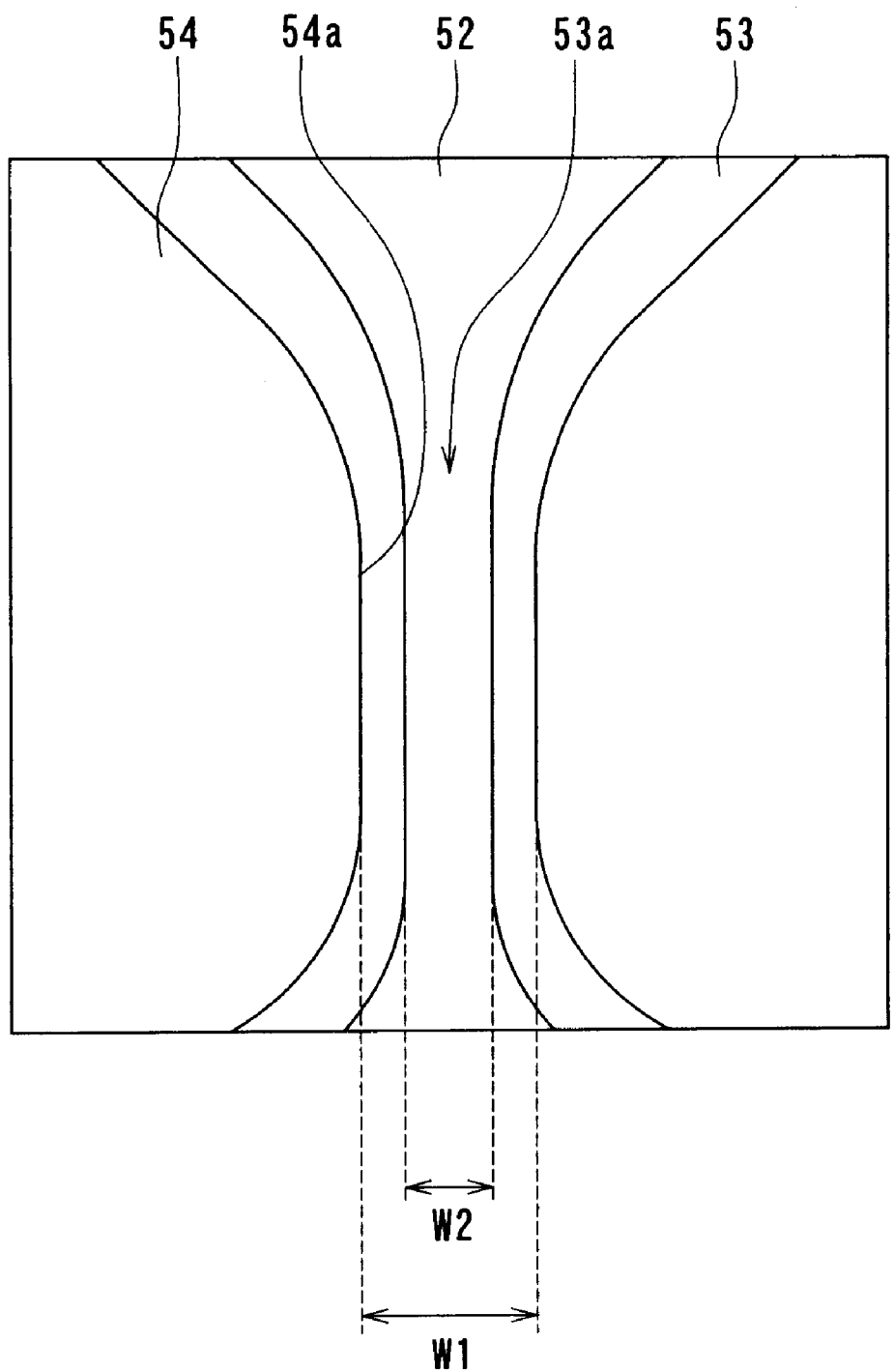
FIG. 13 is a view for illustrating a method of obtaining an angle formed by the wall of the groove with respect to the direction orthogonal to the top surface of the substrate in the first embodiment of the invention.

Reference is now made to FIG. 13 to describe details of the method of obtaining the angle formed by the wall of the groove 53a with respect to the direction orthogonal to the top surface of the substrate 1 by measuring the width of the groove 53a in the top surface of the pole-layer-encasing layer 53 and the width of the bottom of the groove 53a. FIG. 13 schematically illustrates an image obtained by observing through a scanning electron microscope the top surface of the layered structure obtained by removing the mask 55 from the layered structure illustrated in FIG. 5A to FIG. 5C. FIG. 13 illustrates a neighborhood of the portion of the layered structure corresponding to the track width defining portion 16A of the pole layer 16.

As described above, the edge of the opening 54a of the polishing stopper layer 54 is located directly above the edge of the groove 53a located in the top surface of the pole-layer-encasing layer 53. Therefore, the width W1 of the opening 54a is equal to the width of the groove 53a taken in the top surface of the encasing layer 53. As a result, it is possible to measure the width of the groove 53a in the top surface of the encasing layer 53 by measuring the width W1 of the opening 54a in the image obtained by the scanning electron microscope. Since the polishing stopper layer 54 is made of a conductive material, the location of the edge of the opening 54a of the polishing stopper layer 54 is clearly shown in the image obtained by the scanning electron microscope.

The pole-layer-encasing layer 53 is made of $Al_2O_3$, for example. In this case, electric charges accumulate on the surface of the encasing layer 53 when observation by the scanning electron microscope is performed. However, charges are hard to accumulate on the wall of the groove 53a since the wall is tilted with a great angle with respect to the top surface of the substrate 1. In addition, since the groove 53a penetrates, the underlying layer 52 made of a conductive material appears at the bottom of the groove 53a. Therefore, the location of the boundary between the wall of the groove 53a and the bottom thereof is clearly shown in the image obtained by the scanning electron microscope. As a result, it is possible to measure the width W2 of the bottom of the groove 53a in the image obtained by the scanning electron microscope.

It is possible to obtain the angle formed by the wall of the groove 53a with respect to the direction orthogonal to the top surface of the substrate 1 by calculation if the depth of the groove 53a is known, in addition to the widths W1 and W2 measured as described above. The depth of the groove 53a is equal to the thickness of the pole-layer-encasing layer 53. It is possible to control the thickness of the encasing layer 53 to be nearly uniform by controlling the conditions for forming the nonmagnetic layer 53P. Therefore, the depth of the groove 53a is obtained in advance without measuring in the course of the manufacturing process of the magnetic head.

As thus described, if the width of the groove 53a in the top surface of the pole-layer-encasing layer 53 and the width of the bottom of the groove 53a are measured in the course of the manufacturing process of the magnetic head, it is possible to obtain the angle formed by the wall of the groove 53a with respect to the direction orthogonal to the top surface of the substrate 1 by calculation using the above-mentioned widths and the known depth of the groove 53a. As a result, it is possible to confirm whether the groove 53a having a desired shape is formed in the course of the manufacturing process of the magnetic head, and the efficiency in manufacturing the magnetic head is thereby improved.

Figures 14A, 14B:
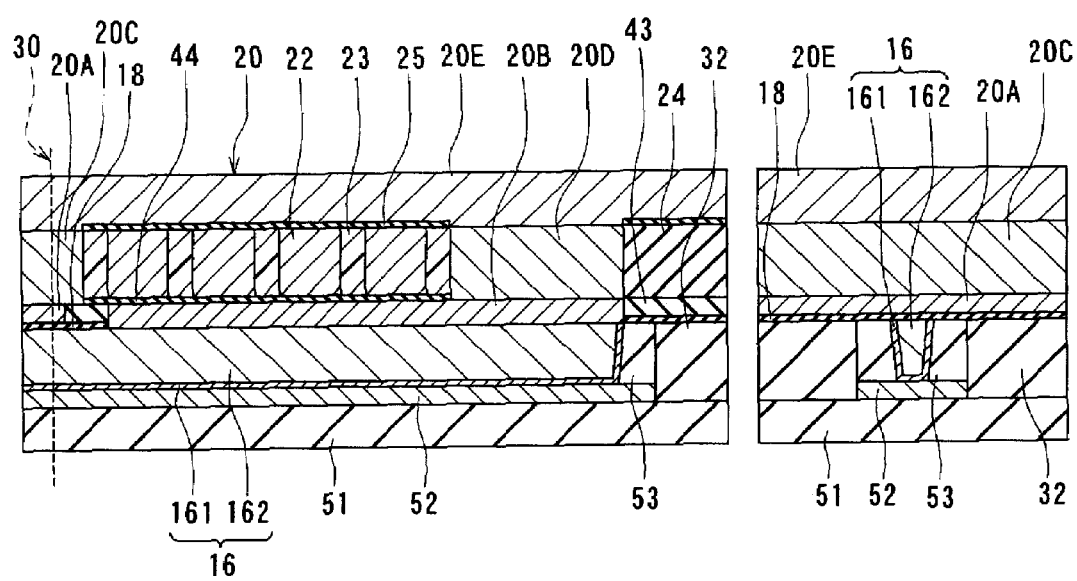
FIG. 14A and FIG. 14B are views for illustrating a first modification example of the magnetic head of the first embodiment of the invention.

FIG. 14A and FIG. 14B illustrate a first modification example of the magnetic head of the embodiment. FIG. 14A illustrates a cross section of the main part of the magnetic head orthogonal to the medium facing surface and the substrate. FIG. 14B illustrates a cross section of the main part of the magnetic head near the medium facing surface, the cross section being parallel to the medium facing surface. In FIG. 14A and FIG. 14B, the portion closer to the substrate 1 than the insulating layer 51 is omitted.

In the first modification example, the polishing stopper layer 54 is removed. In addition, the top surfaces of the pole-layer-encasing layer 53, the first layer 161, the second layer 162 and the coating layer 32 are flattened, and the gap layer 18 is disposed on these top surfaces. The remainder of configuration of the magnetic head of the first modification example is the same as that of the magnetic head shown in FIG. 1 and FIG. 2.

In the method of manufacturing the magnetic head of the first modification example, as shown in FIG. 8A to FIG. 8C, the coating layer 32, the second magnetic layer 162P and the first magnetic layer 161P are polished until the polishing stopper layer 54 is exposed, and then the polishing stopper layer 54 is selectively removed by reactive ion etching or ion beam etching, for example. Next, the first magnetic layer 161P, the second magnetic layer 162P and the coating layer 32 are slightly polished by CMP, for example, and the top surfaces of the pole-layer-encasing layer 53, the first magnetic layer 161P, the second magnetic layer 162P and the coating layer 32 are thereby flattened.

Alternatively, after the coating layer 32, the second magnetic layer 162P and the first magnetic layer 161P are polished until the polishing stopper layer 54 is exposed, ion beam etching may be performed to remove the polishing stopper layer 54 and to etch portions of the first magnetic layer 161P and the second magnetic layer 162P, so that the top surfaces of the pole-layer-encasing layer 53, the first magnetic layer 161P and the second magnetic layer 162P are flattened. Preferably, this etching is performed such that the direction in which ion beams move forms an angle that falls within a range of 40 to 75 degrees inclusive with respect to the direction orthogonal to the top surface of the substrate 1. More preferably, this angle falls within a range of 40 to 55 degrees inclusive. If the pole-layer-encasing layer 53 is made of alumina, the etching rate E2 of the magnetic layers 161P and 162P for ion beam etching is higher than the etching rate E1 of the encasing layer 53, and the etching rate E3 of the polishing stopper layer 54 is higher than the etching rate E2 of the magnetic layers 161P and 162P. Here, if ion beam etching is performed such that the direction in which ion beams move forms an angle that falls within the above-mentioned range with respect to the direction orthogonal the top surface of the substrate 1, it is possible to increase the etching selectivities E2/E1 and E3/E1. It is thereby possible that the top surfaces of the encasing layer 53 and the magnetic layers 161P and 162P are located at nearly the same levels. As a result, the track width is easily controlled.

As thus described, the first magnetic layer 161P and the second magnetic layer 162P are formed into the first layer 161 and the second layer 162, respectively, and the structure is obtained wherein the top surfaces of the pole-layer-encasing layer 53, the first layer 161 and the second layer 162 are flattened. Next, the gap layer 18 is formed on the entire top surface of the layered structure. The following steps of the method of manufacturing the magnetic head of the first modification example are the same as those of the method of manufacturing the magnetic head shown in FIG. 1 and FIG. 2.

Figures 15A, 15B:
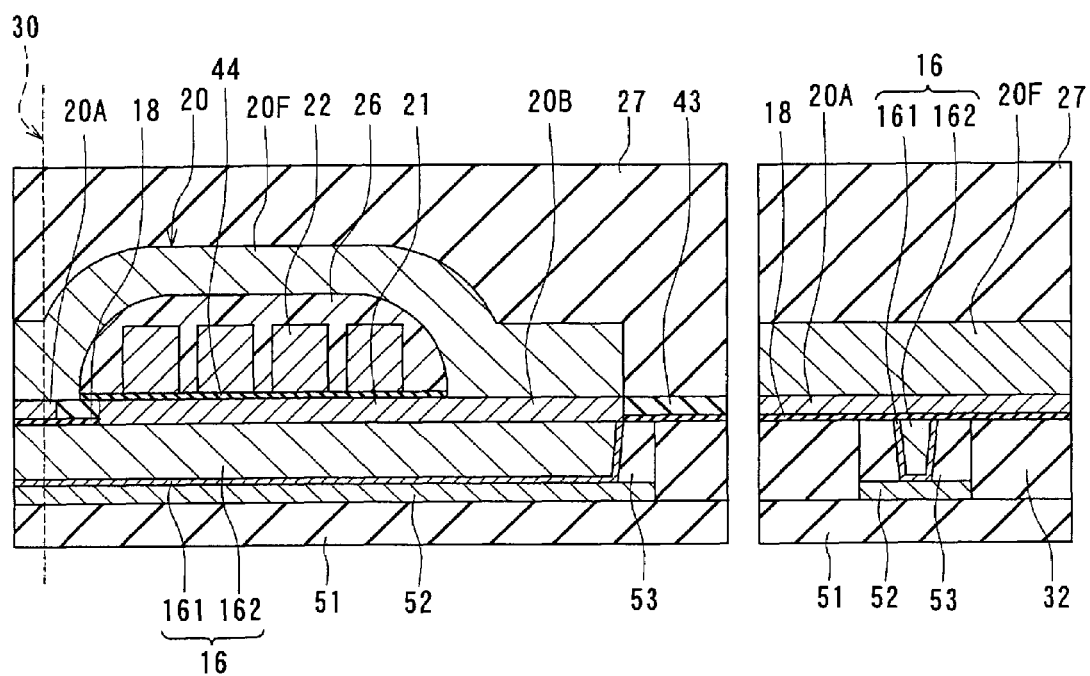
FIG. 15A and FIG. 15B are views for illustrating a second modification example of the magnetic head of the first embodiment of the invention.

FIG. 15A and FIG. 15B illustrate a second modification example of the magnetic head of the embodiment. FIG. 15A illustrates a cross section of the main part of the magnetic head orthogonal to the medium facing surface and the substrate. FIG. 15B illustrates a cross section of the main part of the magnetic head near the medium facing surface, the cross section being parallel to the medium facing surface. In FIG. 15A and FIG. 15B, the portion closer to the substrate 1 than the insulating layer 51 is omitted.

The second modification example comprises an insulating layer 26 covering at least part of the coil 22 in place of the insulating layers 23 and 25 of FIG. 2. The shield layer 20 of the second modification example comprises a second layer 20F in place of the second layer 20C, the coupling layer 20D and the third layer 20E of FIG. 2. The second layer 20F has an end located in the medium facing surface 30, and is disposed to couple the first layer 20A to the yoke layer 20B. The second layer 20F includes a portion located on a side of the at least part of the coil 22 covered with the insulating layer 26, the side being opposite to the pole layer 16. The second layer 20F includes a portion located between the medium facing surface 30 and the coil 22. In this portion the distance between the end located in the medium facing surface 30 and the other end increases as the distance from the first layer 20A increases. The second layer 20F is made of CoNiFe or NiFe, for example.

The second modification example comprises an insulating layer 27 in place of the insulating layer 24 of FIG. 2. The insulating layer 27 is disposed around the second layer 20F, and is made of alumina, for example. The remainder of configuration of the magnetic head of the second modification example is the same as that of the first modification example.

A method of manufacturing the magnetic head of the second modification example includes the steps up to the step of forming the coil 22 that are the same as those of the first modification example. In the second modification example, after the coil 22 is formed, the insulating layer 26, the second layer 20F, and the insulating layer 27 are formed one by one. The following steps of the method of manufacturing the magnetic head of the second modification example are the same as those of the method of manufacturing the magnetic head shown in FIG. 1 and FIG. 2.

Second Embodiment

A magnetic head and a method of manufacturing the same of a second embodiment of the invention will now be described. Reference is now made to FIG. 16A to FIG. 25A, and FIG. 16B to FIG. 25B to describe the method of manufacturing the magnetic head of the second embodiment. FIG. 16A to FIG. 25A each illustrate a cross section of the layered structure in the course of the manufacturing process of the magnetic head, the cross section being orthogonal to the medium facing surface and the substrate. FIG. 16B to FIG. 25B each illustrate a cross section of a portion of the layered structure near the medium facing surface, the cross section being parallel to the medium facing surface. Portions closer to the substrate 1 than the insulating layer 51 are omitted in FIG. 16A to FIG. 25A and FIG. 16B to FIG. 25B.

The method of manufacturing the magnetic head of the second embodiment includes the steps up to the step of forming the nonmagnetic layer 53P that are the same as those of the first embodiment. FIG. 16A and FIG. 16B illustrate the following step. In the step, first, a lower polishing stopper layer 61 made of a nonmagnetic material is formed by sputtering, for example, on the nonmagnetic layer 53P. The lower polishing stopper layer 61 is made of a nonmagnetic conductive material, for example. The material of the lower polishing stopper layer 61 may be the same as the material of the polishing stopper layer 54 of the first embodiment. The lower polishing stopper layer 61 has a thickness that falls within a range of 20 to 60 nm inclusive, for example.

Next, a spacer layer 62 made of a nonmagnetic material and having a specific thickness is formed on the lower polishing stopper layer 61. The spacer layer 62 may be made of an insulating material or a semiconductor material, for example. The insulating material as the material of the spacer layer 62 may be any of alumina, silicon oxide ($SiO_x$), and silicon oxynitride (SiON). The semiconductor material as the material of the spacer layer 62 may be polycrystalline silicon or amorphous silicon. The thickness of the spacer layer 62 falls within a range of 20 to 50 nm inclusive, for example. The spacer layer 62 may be formed by sputtering or CVD, for example.

FIG. 17A and FIG. 17B illustrate the following step. In the step, first, a photoresist layer having a thickness of 1.0 μm, for example, is formed on the spacer layer 62. The photoresist layer is then patterned to form the mask 63 for making the groove 53a of the encasing layer 53. The mask 63 has an opening having a shape corresponding to the groove 53a.

Next, the spacer layer 62 and the lower polishing stopper layer 61 are selectively etched, using the mask 63. Openings 62a and 61a that penetrate are thereby formed in the spacer layer 62 and the lower polishing stopper layer 61, respectively. The opening 61a has a shape corresponding to the plane geometry of the pole layer 16 to be formed later. Furthermore, a portion of the nonmagnetic layer 53P exposed from the opening 61a of the lower polishing stopper layer 61 is selectively etched so as to form the groove 53a in the nonmagnetic layer 53P. The mask 63 is then removed. The nonmagnetic layer 53P is formed into the pole-layer-encasing layer 53 by forming the groove 53a therein. The lower polishing stopper layer 61 indicates the level at which polishing of a second polishing step to be performed later is stopped. The edge of the opening 61a of the lower polishing stopper layer 61 is located directly above the edge of the groove 53a located in the top surface of the pole-layer-encasing layer 53. The conditions for etching of the lower polishing stopper layer 61 and the nonmagnetic layer 53P are the same as the conditions for etching of the polishing stopper layer 54 and the nonmagnetic layer 53P, respectively, of the first embodiment.

Alternatively, before the photoresist layer to be the mask 63 is formed on the spacer layer 62, a nonmagnetic layer made of a material the same as that of the lower polishing stopper layer 61 and having a thickness the same as that of the stopper layer 61 may be formed on the spacer layer 62, and the photoresist layer may be formed on this nonmagnetic layer. In this case, it is possible to form the edges of the openings 62a and 61a with higher precision.

Next, the width of the groove 53a in the top surface of the pole-layer-encasing layer 53 is measured through the use of an electron microscope in a manner the same as that of the first embodiment. At the same time, the width of the bottom of the groove 53a of the encasing layer 53 may be measured. It is thereby possible to obtain the angle formed by the wall of the groove 53a with respect to the direction orthogonal to the top surface of the substrate 1.

Figures 18A, 18B:
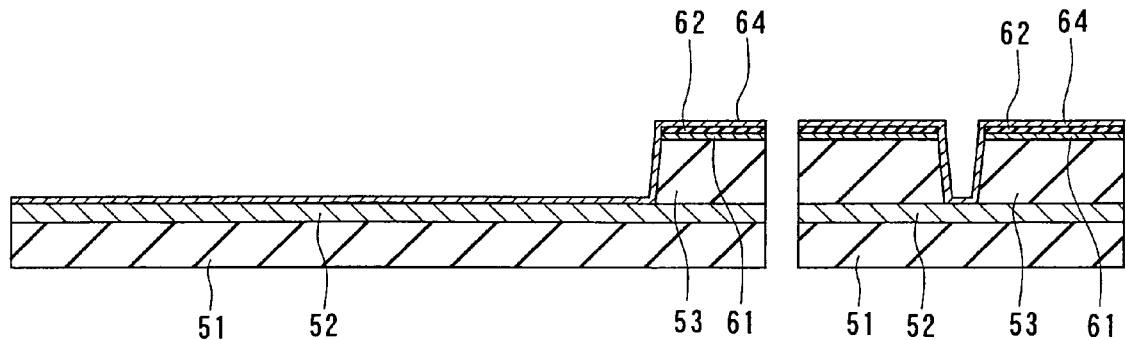
FIG. 18A and FIG. 18B are views for illustrating a step that follows the step shown in FIG. 17A and FIG. 17B.

Next, as shown in FIG. 18A and FIG. 18B, an upper polishing stopper layer 64 made of a nonmagnetic conductive material is formed in the groove 53a of the encasing layer 53 and on the spacer layer 62. The upper polishing stopper layer 64 may be formed by any of sputtering, CVD and IBD, for example. The upper polishing stopper layer 64 may be made of a material the same as the material of the polishing stopper layer 54 of the first embodiment. The upper polishing stopper layer 64 has a thickness that falls within a range of 20 to 30 nm inclusive, for example. The polishing stopper layer 64 is in contact with the underlying layer 52 at the bottom of the groove 53a and electrically connected to the underlying layer 52.

Figures 19A, 19B:
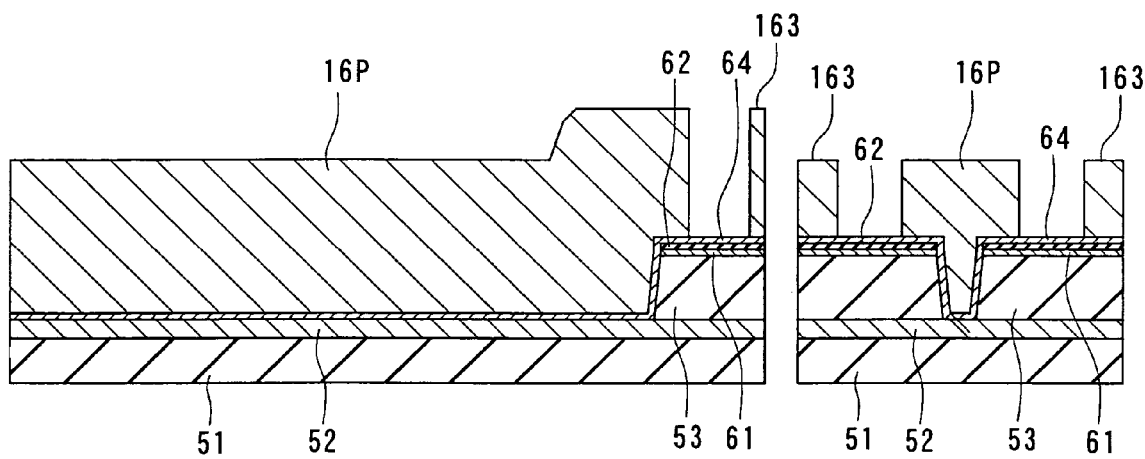
FIG. 19A and FIG. 19B are views for illustrating a step that follows the step shown in FIG. 18A and FIG. 18B.

Next, as shown in FIG. 19A and FIG. 19B, a magnetic layer 16P to be the pole layer 16 is formed on the upper polishing stopper layer 64. The magnetic layer 16P is made of a magnetic material. To be specific, the material of the magnetic layer 16P may be any of NiFe, CoNiFe and CoFe. The magnetic layer 16P is formed such that the groove 53a is filled and the top surface of the magnetic layer 16P is located higher than the top surface of the stopper layer 64. The magnetic layer 16P is formed by frame plating, for example. In this case, the underlying layer 52 and the stopper layer 64 are used as electrodes for plating. In FIG. 19A and FIG. 19B, numeral 163 indicates an unwanted plating layer formed outside the frame.

Figures 20A, 20B:
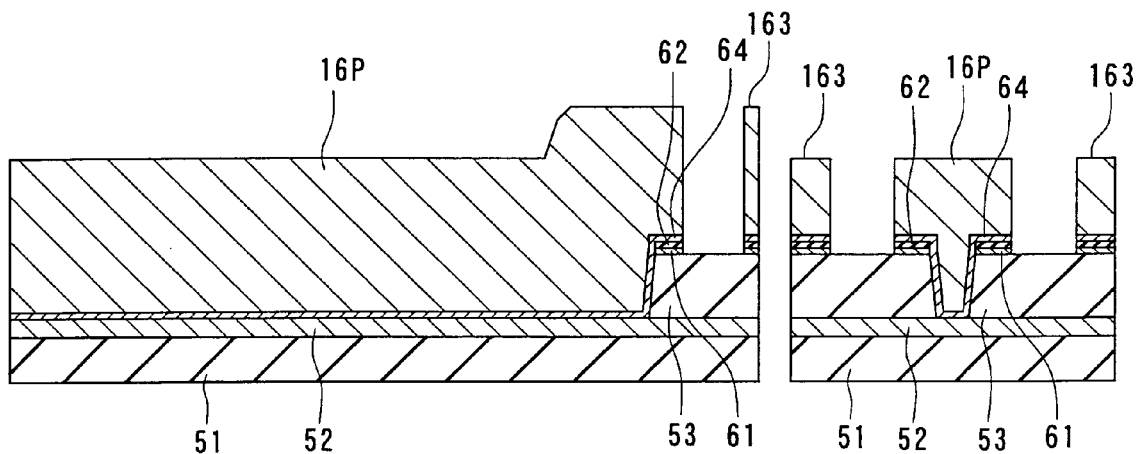
FIG. 20A and FIG. 20B are views for illustrating a step that follows the step shown in FIG. 19A and FIG. 19B.

Next, as shown in FIG. 20A and FIG. 20B, the upper polishing stopper layer 64, the spacer layer 62 and the lower polishing stopper layer 61 except portions of these layers located below the magnetic layer 16P and the plating layer 163 are selectively removed by reactive ion etching or ion beam etching, for example, using the magnetic layer 16P and the plating layer 163 as masks.

Figures 21A, 21B:
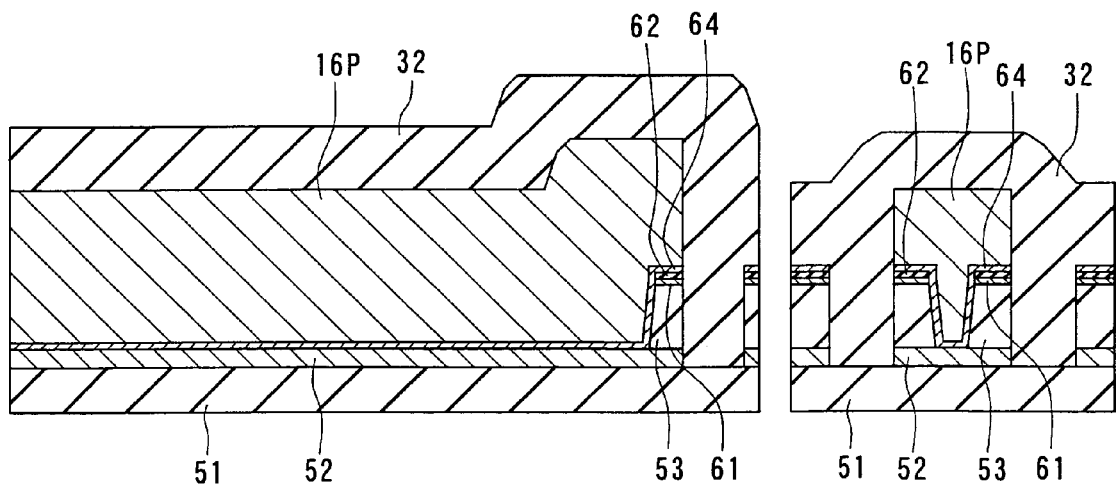
FIG. 21A and FIG. 21B are views for illustrating a step that follows the step shown in FIG. 20A and FIG. 20B.

FIG. 21A and FIG. 21B illustrate the following step. In the step, first, the pole-layer-encasing layer 53 except a portion located below the magnetic layer 16P and the plating layer 163 is selectively removed by reactive ion etching or ion beam etching, for example, using the magnetic layer 16P and the plating layer 163 as masks. Next, the underlying layer 52 except a portion located below the encasing layer 53 is selectively removed by ion beam etching, for example. Next, the plating layer 163 is selectively removed. Next, the coating layer 32 made of alumina, for example, and having a thickness of 0.8 to 1.5 µm, for example, is formed on the entire top surface of the layered structure.

Next, as shown in FIG. 22A and FIG. 22B, the coating layer 32 and the magnetic layer 16P are polished by CMP, for example, until the upper polishing stopper layer 64 is exposed, and the top surfaces of the coating layer 32, the polishing stopper layer 64 and the magnetic layer 16P are thereby flattened. This step corresponds to the first polishing step of the invention. If the coating layer 32 and the magnetic layer 16P are polished by CMP, such a slurry is used that polishing is stopped when the polishing stopper layer 64 is exposed, such as an alumina-base slurry.

Next, as shown in FIG. 23A and FIG. 23B, a portion of the upper polishing stopper layer 64 exposed from the top surface of the layered structure is selectively removed by reactive ion etching using an etching gas containing a $CF_4$ gas, for example.

FIG. 24A and FIG. 24B illustrate the following step. In the step, first, the spacer layer 62, the upper polishing stopper layer 64 and the magnetic layer 16P are polished by CMP, for example, until the lower polishing stopper layer 61 is exposed, and the top surfaces of the lower polishing stopper layer 61, the spacer layer 62, the upper polishing stopper layer 64 and the magnetic layer 16P are thereby flattened. As a result, the remaining magnetic layer 16P is formed into the pole layer 16. This step of polishing corresponds to the second polishing step of the invention. If the spacer layer 62, the upper polishing stopper layer 64 and the magnetic layer 16P are polished by CMP, such a slurry is used that polishing is stopped when the lower polishing stopper layer 61 is exposed, such as an alumina-base slurry. It is possible to control the thickness of the pole layer 16 with accuracy by stopping the polishing when the lower polishing stopper layer 61 is exposed as thus described. Next, the gap layer 18 is formed on the entire top surface of the layered structure.

FIG. 25A and FIG. 25B illustrate the following step. The steps that follow are the same as those of the first embodiment. That is, in the step illustrated in FIG. 25A and FIG. 25B, first, a portion of the gap layer 18 away from the medium facing surface 30 is selectively etched to form an opening in the gap layer 18. Next, the first layer 20A is formed on the gap layer 18, and the yoke layer 20B is formed on a portion of the pole layer 16 where the opening of the gap layer 18 is formed. Next, the nonmagnetic layer 43 is formed on the entire top surface of the layered structure. Next, the nonmagnetic layer 43 is polished by CMP, for example, so that the first layer 20A and the yoke layer 20B are exposed, and the top surfaces of the first layer 20A, the yoke layer 20B and the nonmagnetic layer 43 are thereby flattened. Next, the insulating layer 44 made of alumina, for example, and having a thickness that falls within a range of 0.2 to 0.3 µm inclusive, for example, is formed by a method such as sputtering on the entire top surface of the layered structure. Next, the insulating layer 44 except a portion on which the coil 22 and the insulating layer 23 will be disposed later is removed by etching.

Next, the coil 22, the second layer 20C and the coupling layer 20D are formed as in the first embodiment. The coupling layer 20D is disposed on a region of the yoke layer 20B at a distance from the medium facing surface 30. Next, the insulating layers 23 and 24 are formed. Next, the insulating layer 24 is polished by CMP, for example, so that the second layer 20C, the coupling layer 20D and the coil 22 are exposed, and the top surfaces of the second layer 20C, the coupling layer 20D, the coil 22 and the insulating layers 23 and 24 are thereby flattened. Next, the insulating layer 25 is formed on the coil 22 and the insulating layers 23 and 24. Next, the third layer 20E is formed by frame plating, for example, to complete the shield layer 20.

Next, although not shown, a protection layer is formed to cover the entire top surface of the layered structure. Wiring and terminals are then formed on the protection layer, the substrate is cut into sliders, and the steps including polishing of the medium facing surface 30 and fabrication of flying rails are performed. The magnetic head is thus completed.

In the method of manufacturing the magnetic head of the second embodiment, the step of forming the pole-layer-encasing layer 53 comprises the following first to sixth steps. The first step is the step of forming the nonmagnetic layer 53P that will be formed into the pole-layer-encasing layer 53 by forming the groove 53a therein. The second step is the step of forming the lower polishing stopper layer 61 on the top surface of the nonmagnetic layer 53P, wherein the polishing stopper layer 61 is made of a nonmagnetic conductive material and indicates the level at which polishing of the second polishing step to be performed later is stopped. The third step is the step of forming the spacer layer 62 having a specific thickness on the lower polishing stopper layer 61. The fourth step is the step of forming the penetrating openings 62a and 61a each having a shape corresponding to the plane geometry of the pole layer 16 in the spacer layer 62 and the lower polishing stopper layer 61, respectively. The fifth step is the step of forming the groove 53a in the nonmagnetic layer 53P by selectively etching the portions of the nonmagnetic layer 53P exposed from the openings 62a and 61a of the spacer layer 62 and the polishing stopper layer 61, so that the nonmagnetic layer 53P is formed into the pole-layer-encasing layer 53. The sixth step is the step of forming the upper polishing stopper layer 64 on the spacer layer 62, the stopper layer 64 indicating the level at which polishing of the first polishing step to be performed later is stopped.

In the method of manufacturing the magnetic head of the second embodiment, the step of forming the pole layer 16 comprises the following seventh to eleventh steps. The seventh step is the step of forming the magnetic layer 16P to be the pole layer 16, such that the groove 53a is filled and the top surface of the magnetic layer 16P is located higher than the top surface of the upper polishing stopper layer 64. The eighth step is the step of forming the coating layer 32 to cover the magnetic layer 16P and the upper polishing stopper layer 64. The ninth step is the first polishing step of polishing the coating layer 32 and the magnetic layer 16P until the upper polishing stopper layer 64 is exposed. The tenth step is the step of removing the upper polishing stopper layer 64 after the first polishing step. The eleventh step is the second polishing step of polishing the spacer layer 62 and the magnetic layer 16P until the lower polishing stopper layer 61 is exposed, so that the magnetic layer 16P is formed into the pole layer 16.

According to the magnetic head of the second embodiment, the upper polishing stopper layer 64 made of a nonmagnetic conductive material is disposed between the pole-layer-encasing layer 53 and the pole layer 16 in the groove 53a of the encasing layer 53. As a result, according to the embodiment, it is possible to further reduce the width of the top surface of the track width defining portion 16A that defines the track width. It is thereby possible to easily implement a small track width and to control the track width with accuracy by the thickness of the upper polishing stopper layer 64.

According to the second embodiment, it is possible through the first polishing step that the top surface of the magnetic layer 16P is located at the level nearly the same as the level at which the top surface of the upper polishing stopper layer 64 is located even if there are great variations in the thickness of the magnetic layer 16P. However, since a great amount of polishing is performed in the first polishing step, a slight difference in level may be created between the top surface of the pole layer 16 and the top surface of the polishing stopper layer 64 when the first polishing step is completed. In the second embodiment, however, the second polishing step in which a small amount is polished is performed after the upper polishing stopper layer 64 is removed. As a result, the top surfaces of the lower polishing stopper layer 61 and the magnetic layer 16P are flattened, so that a difference in level is hardly created between the top surface of the magnetic layer 16P and the top surface of the lower polishing stopper layer 61. Therefore, according to the embodiment, it is possible to control the thickness of the pole layer 16 with high accuracy. As a result, it is possible to control the track width with high accuracy.

The remainder of configuration, operation and effects of the second embodiment are similar to those of the first embodiment.

Figures 26A, 26B:
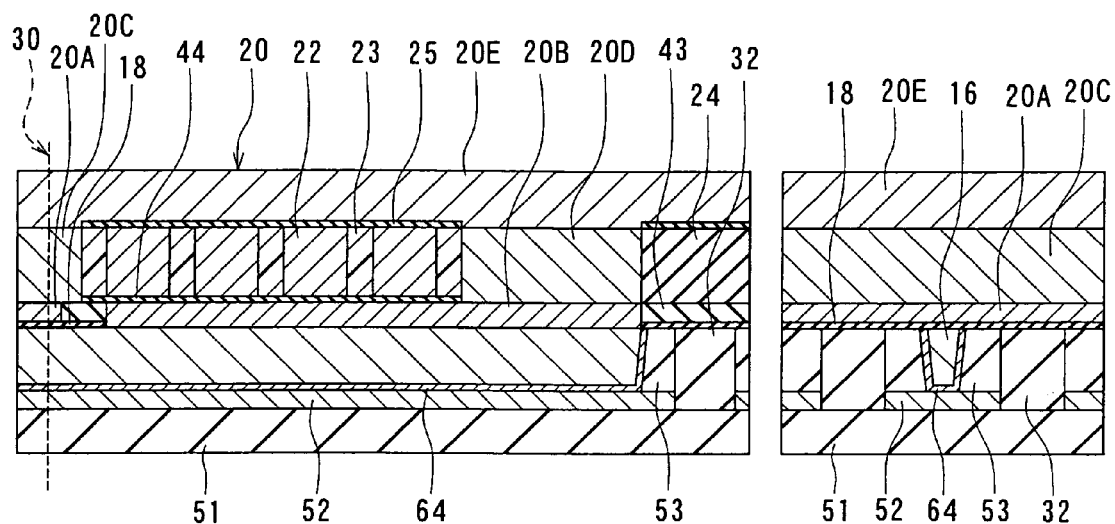
FIG. 26A and FIG. 26B are views for illustrating a modification example of the magnetic head of the second embodiment of the invention.

FIG. 26A and FIG. 26B illustrate a modification example of the magnetic head of the second embodiment. FIG. 26A illustrates a cross section of the main part of the magnetic head orthogonal to the medium facing surface and the substrate. FIG. 26B illustrates a cross section of the main part of the magnetic head near the medium facing surface, the cross section being parallel to the medium facing surface. In FIG. 26A and FIG. 26B, the portion closer to the substrate 1 than the insulating layer 51 is omitted.

In the modification example, the lower polishing stopper layer 61 is removed. In addition, the top surfaces of the pole-layer-encasing layer 53, the upper polishing stopper layer 64 and the pole layer 16 are flattened, and the gap layer 18 is disposed on these top surfaces. The remainder of configuration of the magnetic head of the modification example is the same as that of the magnetic head shown in FIG. 25A and FIG. 25B.

In the method of manufacturing the magnetic head of the modification example, the spacer layer 62, the upper polishing stopper layer 64 and the magnetic layer 16P are polished until the lower polishing stopper layer 61 is exposed, and then the polishing stopper layer 61 is selectively removed by reactive ion etching or ion beam etching, for example. Next, the upper polishing stopper layer 64 and the magnetic layer 16P are slightly polished by CMP, for example, and the top surfaces of the pole-layer-encasing layer 53, the upper polishing stopper layer 64 and the magnetic layer 16P are thereby flattened.

Alternatively, after the spacer layer 62, the upper polishing stopper layer 64 and the magnetic layer 16P are polished until the lower polishing stopper layer 61 is exposed, ion beam etching may be performed to remove the lower polishing stopper layer 61 and to etch portions of the upper polishing stopper layer 64 and the magnetic layer 16P, so that the top surfaces of the pole-layer-encasing layer 53, the upper polishing stopper layer 64 and the magnetic layer 16P are flattened. Preferably, this etching is performed such that the direction in which ion beams move forms an angle that falls within a range of 40 to 75 degrees inclusive with respect to the direction orthogonal to the top surface of the substrate 1. More preferably, this angle falls within a range of 40 to 55 degrees inclusive. It is thereby possible that the top surfaces of the encasing layer 53 and the magnetic layer 16P are located at nearly the same levels easily, as described in the first modification example of the first embodiment. As a result, the track width is easily controlled.

As thus described, the magnetic layer 16P is formed into the pole layer 16, and the structure is obtained wherein the top surfaces of the pole-layer-encasing layer 53, the upper polishing stopper layer 64 and the pole layer 16 are flattened. Next, the gap layer 18 is formed on the entire top surface of the layered structure. The following steps of the method of manufacturing the magnetic head of the modification example are the same as those of the method of manufacturing the magnetic head shown in FIG. 25A and FIG. 25B.

In the second embodiment, the shield layer 20 may have a structure the same as that of the second modification example of the first embodiment.

Third Embodiment

A magnetic head and a method of manufacturing the same of a third embodiment of the invention will now be described. Reference is now made to FIG. 27A to FIG. 33A, and FIG. 27B to FIG. 33B to describe the method of manufacturing the magnetic head of the third embodiment. FIG. 27A to FIG. 33A each illustrate a cross section of the layered structure in the course of the manufacturing process of the magnetic head, the cross section being orthogonal to the medium facing surface and the substrate. FIG. 27B to FIG. 33B each illustrate a cross section of a portion of the layered structure near the medium facing surface, the cross section being parallel to the medium facing surface. Portions closer to the substrate 1 than the insulating layer 51 are omitted in FIG. 27A to FIG. 33A and FIG. 27B to FIG. 33B.

The method of manufacturing the magnetic head of the third embodiment includes the steps up to the step of forming the groove 53a in the nonmagnetic layer 53P that are the same as those of the first embodiment. The nonmagnetic layer 53P is formed into the pole-layer-encasing layer 53 by forming the groove 53a therein.

Next, as in the first embodiment, the width of the groove 53a in the top surface of the pole-layer-encasing layer 53 is measured through the use of an electron microscope after the mask 55 is removed. At the same time, the width of the bottom of the groove 53a of the encasing layer 53 may be measured. It is thereby possible to obtain the angle formed by the wall of the groove 53a with respect to the direction orthogonal to the top surface of the substrate 1.

Figures 27A, 27B:
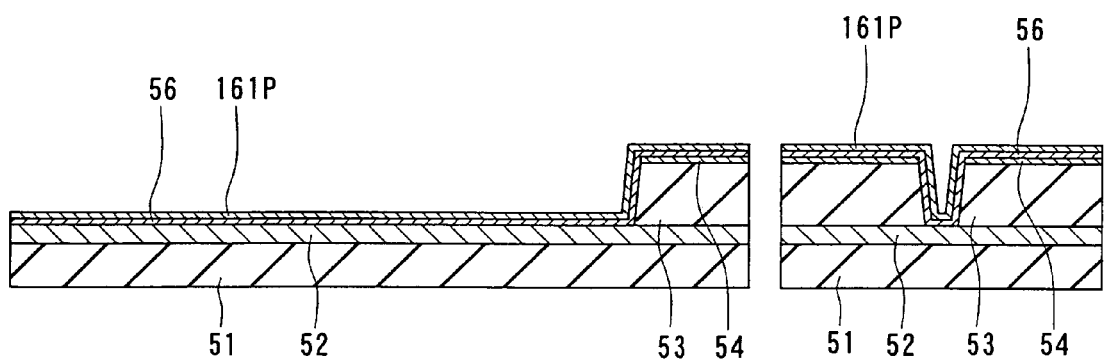
FIG. 27A and FIG. 27B are views for illustrating a step of a method of manufacturing a magnetic head of a third embodiment of the invention.

FIG. 27A and FIG. 27B illustrate the following step. In the step, first, a nonmagnetic conductive film 56 made of a nonmagnetic conductive material is formed in the groove 53a of the pole-layer-encasing layer 53 and on the polishing stopper layer 54. The nonmagnetic conductive film 56 is formed by sputtering, CVD or IBD, for example. The nonmagnetic conductive film 56 may be made of any of Ta, Mo, W, Ti, Ru, Rh, Re, Pt, Pd, Ir, TiN, TiW and NiCr, for example. The thickness of the nonmagnetic conductive film 56 falls within a range of 20 to 50 nm inclusive, for example. The nonmagnetic conductive film 56 is in contact with the underlying layer 52 at the bottom of the groove 53a and electrically connected to the underlying layer 52. Next, the first magnetic layer 161P to be the first layer 161 of the pole layer 16 is formed on the nonmagnetic conductive film 56. The method of forming the first magnetic layer 161P is the same as that of the first embodiment.

Figures 28A, 28B:
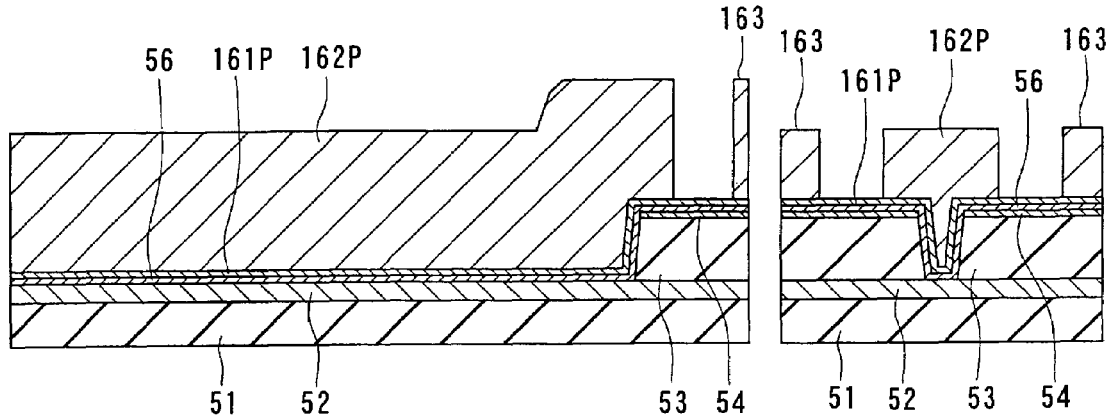
FIG. 28A and FIG. 28B are views for illustrating a step that follows the step shown in FIG. 27A and FIG. 27B.

Next, as shown in FIG. 28A and FIG. 28B, the second magnetic layer 162P to be the second layer 162 of the pole layer 16 is formed on the magnetic layer 161P. The second magnetic layer 162P is formed by frame plating, for example. In this case, the underlying layer 52, the nonmagnetic conductive film 56 and the first magnetic layer 161P are used as electrodes for plating. In FIG. 28A and FIG. 28B, numeral 163 indicates an unwanted plating layer formed outside the frame.

Figures 29A, 29B:
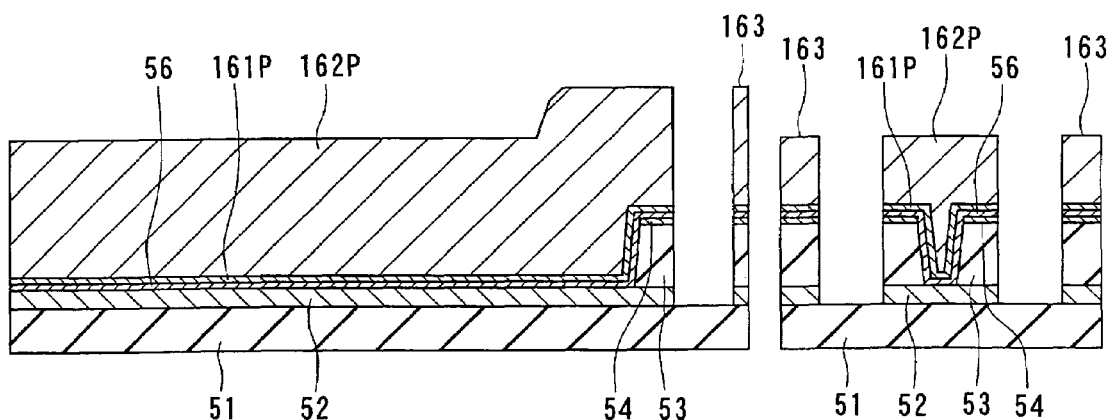
FIG. 29A and FIG. 29B are views for illustrating a step that follows the step shown in FIG. 28A and FIG. 28B.

Next, as shown in FIG. 29A and FIG. 29B, the first magnetic layer 161P, the nonmagnetic conductive film 56, the polishing stopper layer 54 and the encasing layer 53 except portions of these layers located below the magnetic layer 162P and the plating layer 163 are selectively removed by reactive ion etching or ion beam etching, for example, using the second magnetic layer 162P and the plating layer 163 as masks.

Figures 30A, 30B:
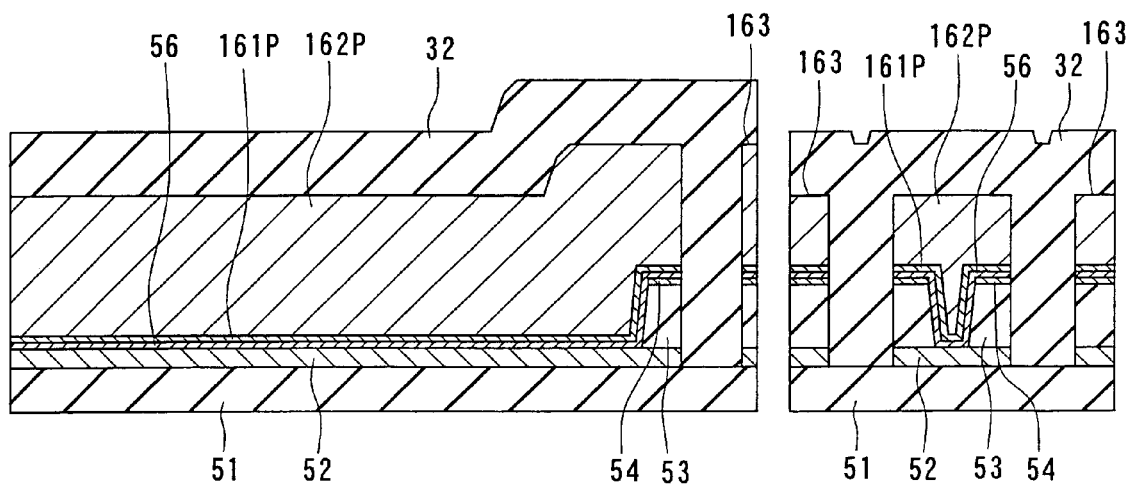
FIG. 30A and FIG. 30B are views for illustrating a step that follows the step shown in FIG. 29A and FIG. 29B.

Next, as shown in FIG. 30A and FIG. 30B, the coating layer 32 made of alumina, for example, and having a thickness of 1.0 to 1.5 µm, for example, is formed on the entire top surface of the layered structure.

Figures 31A, 31B:
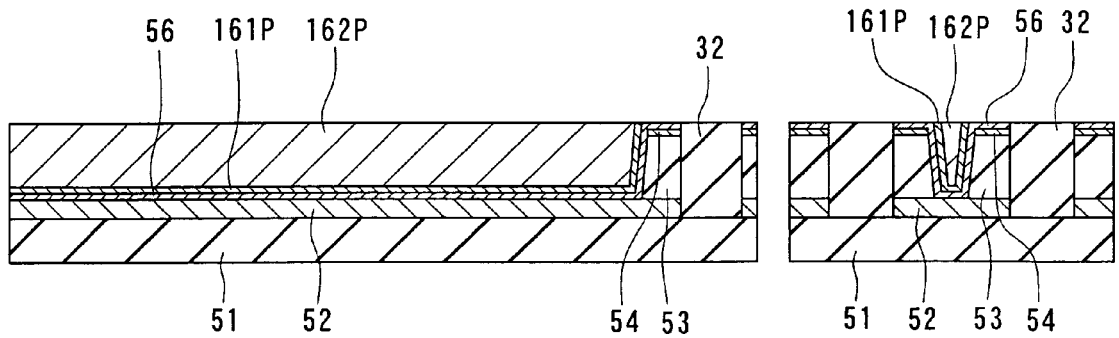
FIG. 31A and FIG. 31B are views for illustrating a step that follows the step shown in FIG. 30A and FIG. 30B.

Next, as shown in FIG. 31A and FIG. 31B, the coating layer 32, the second magnetic layer 162P and the first magnetic layer 161P are polished by CMP, for example. In this case, the level at which polishing is stopped varies, depending on whether the material making up the nonmagnetic conductive film 56 has the property of being polished at the same time when the coating layer 32, the second magnetic layer 162P and the first magnetic layer 161P are polished by CMP. First, if the material making up the nonmagnetic conductive film 56 has the property of being polished, the polishing is stopped when the polishing stopper layer 54 is exposed. The top surfaces of the polishing stopper layer 54, the first magnetic layer 161P and the second magnetic layer 162P are thereby flattened. On the other hand, if the material making up the nonmagnetic conductive film 56 does not have the property of being polished, the polishing is stopped when the nonmagnetic conductive film 56 is exposed, as shown in FIG. 31A and FIG. 31B. In this case, ion beam etching is performed, for example, to selectively remove a portion of the nonmagnetic conductive film 56 exposed from the top surface of the layered structure, and to etch portions of the first magnetic layer 161P and the second magnetic layer 162P, so that the top surfaces of the polishing stopper layer 54, the first magnetic layer 161P and the second magnetic layer 162P are flattened.

FIG. 32A and FIG. 32B illustrate the following step. In the step, first, ion beam etching is performed, for example, to remove the polishing stopper layer 54, and to etch portions of the first magnetic layer 161P and the second magnetic layer 162P, so that the top surfaces of the encasing layer 53, the first magnetic layer 161P and the second magnetic layer 162P are flattened. As a result, the magnetic layers 161P and 162P are formed into the first layer 161 and the second layer 162 of the pole layer 16, respectively. Next, the gap layer 18 is formed on the entire top surface of the layered structure. Alternatively, the gap layer 18 may be formed on the entire top surface of the layered structure without removing the polishing stopper layer 54.

FIG. 33A and FIG. 33B illustrate the following step. The steps that follow are the same as those of the first embodiment. That is, in the step illustrated in FIG. 33A and FIG. 33B, first, a portion of the gap layer 18 away from the medium facing surface 30 is selectively etched to form an opening in the gap layer 18. Next, the first layer 20A is formed on the gap layer 18, and the yoke layer 20B is formed on a portion of the pole layer 16 where the opening of the gap layer 18 is formed. Next, the nonmagnetic layer 43 is formed on the entire top surface of the layered structure. Next, the nonmagnetic layer 43 is polished by CMP, for example, so that the first layer 20A and the yoke layer 20B are exposed, and the top surfaces of the first layer 20A, the yoke layer 20B and the nonmagnetic layer 43 are thereby flattened. Next, the insulating layer 44 made of alumina, for example, and having a thickness that falls within a range of 0.2 to 0.3 µm inclusive, for example, is formed by a method such as sputtering on the entire top surface of the layered structure. Next, the insulating layer 44 except a portion on which the coil 22 and the insulating layer 23 will be disposed later is removed by etching.

Next, the coil 22, the second layer 20C and the coupling layer 20D are formed as in the first embodiment. The coupling layer 20D is disposed on a region of the yoke layer 20B at a distance from the medium facing surface 30. Next, the insulating layers 23 and 24 are formed. Next, the insulating layer 24 is polished by CMP, for example, so that the second layer 20C, the coupling layer 20D and the coil 22 are exposed, and the top surfaces of the second layer 20C, the coupling layer 20D, the coil 22 and the insulating layers 23 and 24 are thereby flattened. Next, the insulating layer 25 is formed on the coil 22 and the insulating layers 23 and 24. Next, the third layer 20E is formed by frame plating, for example, to complete the shield layer 20.

Next, although not shown, a protection layer is formed to cover the entire top surface of the layered structure. Wiring and terminals are then formed on the protection layer, the substrate is cut into sliders, and the steps including polishing of the medium facing surface 30 and fabrication of flying rails are performed. The magnetic head is thus completed.

According to the magnetic head of the third embodiment, the nonmagnetic conductive film 56 made of a nonmagnetic conductive material is disposed between the pole-layer-encasing layer 53 and the pole layer 16 in the groove 53a of the encasing layer 53. As a result, according to the embodiment, it is possible to further reduce the width of the top surface of the track width defining portion 16A that defines the track width. It is thereby possible to easily implement a small track width and to control the track width with accuracy by the thickness of the nonmagnetic conductive film 56.

In the third embodiment, the first layer 161 of the pole layer 16 may be omitted. If the first layer 161 is omitted, a magnetic layer to be the pole layer 16 is formed by plating on the nonmagnetic conductive film 56.

The remainder of configuration, operation and effects of the third embodiment are similar to those of the first embodiment.

In the third embodiment, the shield layer 20 may have a structure the same as that of the second modification example of the first embodiment.

Fourth Embodiment

A magnetic head and a method of manufacturing the same of a fourth embodiment of the invention will now be described. Reference is now made to FIG. 34A to FIG. 44A, and FIG. 34B to FIG. 44B to describe the method of manufacturing the magnetic head of the fourth embodiment. FIG. 34A to FIG. 44A each illustrate a cross section of the layered structure in the course of the manufacturing process of the magnetic head, the cross section being orthogonal to the medium facing surface and the substrate. FIG. 34B to FIG. 44B each illustrate a cross section of a portion of the layered structure near the medium facing surface, the cross section being parallel to the medium facing surface. Portions closer to the substrate 1 than the insulating layer 51 are omitted in FIG. 34A to FIG. 44A and FIG. 34B to FIG. 44B.

The method of manufacturing the magnetic head of the fourth embodiment includes the steps up to the step of forming the insulating layer 51 that are the same as those of the first embodiment. FIG. 34A and FIG. 34B illustrate the following step. In the step, first, a mask 71 made of a photoresist layer, for example, is formed on a region of the top surface of the insulating layer 51 including a region where the pole layer 16 will be disposed later. Next, an insulating layer 72 made of alumina, for example, is formed by a method such as sputtering on the entire top surface of the layered structure. The mask 71 is then lifted off. At this time, a portion of the insulating layer 72 formed on the mask 71 is removed. The structure thereby obtained is such a structure that the insulating layer 72 is disposed in a region of the top surface of the insulating layer 51 outside the region in which the mask 71 was disposed. The layered structure made up of the insulating layer 51 and the insulating layer 72 is hereinafter called an insulating layer 80. The insulating layer 80 corresponds to the insulating layer disposed below the underlying layer of the invention.

The top surface of the insulating layer 80 includes a first region (a region in which the insulating layer 72 is not disposed) 81 and a second region (the top surface of the insulating layer 72) 82. The first region 81 includes a region in which the pole layer 16 will be disposed later. The second region 82 is disposed outside the first region 81. A difference in level is created between the first region 81 and the second region 82 such that the second region 82 is located farther from the substrate 1 than the first region 81.

Alternatively, an insulating layer having a shape the same as that of the insulating layer 80 may be formed by making a concave portion through etching a portion of the insulating layer.

Next, as shown in FIG. 35A and FIG. 35B, the underlying layer 52, the nonmagnetic layer 53P and the polishing stopper layer 54 are formed one by one on the insulating layer 80. The thickness of the insulating layer 72, that is, the difference in level between the first region 81 and the second region 82, is made nearly equal to the total thickness of the nonmagnetic layer 53P and the stopper layer 54.

Next, as shown in FIG. 36A and FIG. 36B, the mask 55 for making the groove 53a of the pole-layer-encasing layer 53 is formed on the polishing stopper layer 54. The mask 55 has an opening having a shape corresponding to the groove 53a. The perimeter of the mask 55 is located slightly outside the first region 81.

FIG. 37A and FIG. 37B illustrate the following step. In the step, the polishing stopper layer 54 is selectively etched, using the mask 55. The penetrating opening 54a is thereby formed in the stopper layer 54. Furthermore, a portion of the nonmagnetic layer 53P exposed from the opening 54a of the stopper layer 54 is selectively etched to form the groove 53a in the nonmagnetic layer 53P. Through these etchings, portions of the stopper layer 54 and the nonmagnetic layer 53P located outside the perimeter of the mask 55 are removed. A portion of the underlying layer 52 disposed on the second region 82 is thereby exposed. The nonmagnetic layer 53P is thus formed into the pole-layer-encasing layer 53 by forming the groove 53a therein. The mask 55 is then removed.

Next, as in the first embodiment, the width of the groove 53a in the top surface of the pole-layer-encasing layer 53 is measured through the use of an electron microscope. At the same time, the width of the bottom of the groove 53a of the encasing layer 53 may be measured. It is thereby possible to obtain the angle formed by the wall of the groove 53a with respect to the direction orthogonal to the top surface of the substrate 1.

FIG. 38A and FIG. 38B illustrate the following step. In the step, first, the magnetic layer 16P to be the pole layer 16 is formed in the groove 53a of the encasing layer 53 and on the polishing stopper layer 54. The magnetic layer 16P is formed by frame plating, for example. In this case, the underlying layer 52 and the polishing stopper layer 54 are used as electrodes for plating. In FIG. 38B, numeral 163 indicates an unwanted plating layer formed outside the frame.

Next, as shown in FIG. 39A and FIG. 39B, the coating layer 32 made of alumina, for example, and having a thickness of 0.8 to 1.5 µm, for example, is formed on the entire top surface of the layered structure.

Next, as shown in FIG. 40A and FIG. 40B, the coating layer 32 and the magnetic layer 16P are polished by CMP, for example, so that a portion of the stopper layer 54 disposed above the first region 81 and a portion of the underlying layer 52 disposed on the second region 82 are exposed. In this step, as shown in FIG. 40A and FIG. 40B, there may be a case in which a small portion of the magnetic layer 16P remains on the stopper layer 54 when the portion of the underlying layer 52 disposed on the second region 82 is exposed. In this case, as shown in FIG. 41A and FIG. 41B, polishing (overpolish) is further performed after the portion of the underlying layer 52 disposed on the second region 82 is exposed, such that no portion of the magnetic layer 16P remains on the stopper layer 54. The top surfaces of the stopper layer 54 and the magnetic layer 16P are thereby flattened, and the magnetic layer 16P is formed into the pole layer 16.

FIG. 42A and FIG. 42B illustrate the following step. In the step, first, a mask 73 made of a photoresist layer, for example, is formed to cover the stopper layer 54 and the pole layer 16. Next, the portion of the underlying layer 52 disposed on the second region 82 is selectively removed by reactive ion etching or ion beam etching, for example, using the mask 73. The mask 73 is then removed.

FIG. 43A and FIG. 43B illustrate the following step. The steps that follow are the same as those of the first embodiment. That is, in the step illustrated in FIG. 43A and FIG. 43B, first, the gap layer 18 is formed on the entire top surface of the layered structure. Alternatively, the gap layer 18 may be formed after the polishing stopper layer 54 is removed by ion beam etching, for example.

Next, a portion of the gap layer 18 away from the medium facing surface 30 is selectively etched to form an opening in the gap layer 18. Next, the first layer 20A is formed on the gap layer 18, and the yoke layer 20B is formed on a portion of the pole layer 16 where the opening of the gap layer 18 is formed. Next, the nonmagnetic layer 43 is formed on the entire top surface of the layered structure. Next, the nonmagnetic layer 43 is polished by CMP, for example, so that the first layer 20A and the yoke layer 20B are exposed, and the top surfaces of the first layer 20A, the yoke layer 20B and the nonmagnetic layer 43 are thereby flattened.

FIG. 44A and FIG. 44B illustrate the following step. In the step, first, the insulating layer 44 made of alumina, for example, and having a thickness that falls within a range of 0.2 to 0.3 µm inclusive, for example, is formed by a method such as sputtering on the entire top surface of the layered structure. Next, the insulating layer 44 except a portion on which the coil 22 and the insulating layer 23 will be disposed later is removed by etching.

Next, the coil 22, the second layer 20C and the coupling layer 20D are formed as in the first embodiment. The coupling layer 20D is disposed on a region of the yoke layer 20B at a distance from the medium facing surface 30. Next, the insulating layers 23 and 24 are formed. Next, the insulating layer 24 is polished by CMP, for example, so that the second layer 20C, the coupling layer 20D and the coil 22 are exposed, and the top surfaces of the second layer 20C, the coupling layer 20D, the coil 22 and the insulating layers 23 and 24 are thereby flattened. Next, the insulating layer 25 is formed on the coil 22 and the insulating layers 23 and 24. Next, the third layer 20E is formed by frame plating, for example, to complete the shield layer 20.

Next, although not shown, a protection layer is formed to cover the entire top surface of the layered structure. Wiring and terminals are then formed on the protection layer, the substrate is cut into sliders, and the steps including polishing of the medium facing surface 30 and fabrication of flying rails are performed. The magnetic head is thus completed.

The method of manufacturing the magnetic head of the fourth embodiment comprises the step of forming the insulating layer 80 to be disposed below the underlying layer 52 before the step of forming the underlying layer 52. The top surface of the insulating layer 80 includes the first region 81 including the region in which the pole layer 16 will be disposed later, and the second region 82 disposed outside the first region 81. A difference in level is created between the first region 81 and the second region 82 such that the second region 82 is located farther from the substrate 1 than the first region 81. The underlying layer 52 is formed on the top surface of the insulating layer 80.

In the method of manufacturing the magnetic head of the fourth embodiment, the step of forming the pole-layer-encasing layer 53 comprises the following first to third steps. The first step is the step of forming the nonmagnetic layer 53P on the underlying layer 52, wherein the nonmagentic layer 53P will be formed into the pole-layer-encasing layer 53 by forming the groove 53a therein. The second step is the step of forming the polishing stopper layer 54 on the top surface of the nonmagnetic layer 53P, wherein the polishing stopper layer 54 is made of a nonmagnetic conductive material, has the penetrating opening 54a having a shape corresponding to the plane geometry of the pole layer 16, and indicates the level at which polishing to be performed later is stopped. The third step is the step of forming the groove 53a in the nonmagnetic layer 53P by selectively etching the portion of the nonmagnetic layer 53P exposed from the opening 54a of the polishing stopper layer 54, so that the nonmagnetic layer 53P is formed into the pole-layer-encasing layer 53.

In the method of manufacturing the magnetic head of the embodiment, the step of forming the pole layer 16 comprises the following fourth to sixth steps. The fourth step is the step of forming the magnetic layer 16P to be the pole layer 16 such that the groove 53a is filled and the top surface of the magnetic layer 16P is located higher than the top surface of the polishing stopper layer 54. The fifth step is the step of forming the coating layer 32 to cover the magnetic layer 53P and the polishing stopper layer 54. The sixth step is the step of polishing the coating layer 32 and the magnetic layer 16P until the portion of the polishing stopper layer 54 disposed above the first region 81 of the top surface of the insulating layer 80 and the portion of the underlying layer 52 disposed on the second region 82 of the top surface of the insulating layer 80 are exposed, so that the magnetic layer 16P is formed into the pole layer 16.

In the fourth embodiment, the portion of the underlying layer 52 disposed on the second region 82 of the top surface of the insulating layer 80 has a function of indicating the level at which polishing is stopped, as the polishing stopper layer 54.

The remainder of configuration, operation and effects of the fourth embodiment are similar to those of the first embodiment.

In the fourth embodiment, the shield layer 20 may have a structure the same as that of the second modification example of the first embodiment.

Fifth Embodiment

A magnetic head and a method of manufacturing the same of a fifth embodiment of the invention will now be described. Reference is now made to FIG. 45A to FIG. 49A, and FIG. 45B to FIG. 49B to describe the method of manufacturing the magnetic head of the fifth embodiment. FIG. 45A to FIG. 49A each illustrate a cross section of the layered structure in the course of the manufacturing process of the magnetic head, the cross section being orthogonal to the medium facing surface and the substrate. FIG. 45B to FIG. 49B each illustrate a cross section of a portion of the layered structure near the medium facing surface, the cross section being parallel to the medium facing surface. Portions closer to the substrate 1 than the insulating layer 51 are omitted in FIG. 45A to FIG. 49A and FIG. 45B to FIG. 49B.

The method of manufacturing the magnetic head of the fifth embodiment includes the steps up to the step of forming the groove 53a in the nonmagnetic layer 53P, as shown in FIG. 45A and FIG. 45B, that are the same as those of the first embodiment. The nonmagnetic layer 53P is formed into the pole-layer-encasing layer 53 by forming the groove 53a therein.

Next, as in the first embodiment, the width of the groove 53a in the top surface of the pole-layer-encasing layer 53 is measured through the use of an electron microscope after the mask 55 is removed. At the same time, the width of the bottom of the groove 53a of the encasing layer 53 may be measured. It is thereby possible to obtain the angle formed by the wall of the groove 53a with respect to the direction orthogonal to the top surface of the substrate 1.

In the following step of the fifth embodiment, as shown in FIG. 46A and FIG. 46B, plating is performed by feeding a current to the underlying layer 52 to form the magnetic layer 16P to be the pole layer 16. The magnetic layer 16P is formed such that the groove 53a is filled and the top surface of the magnetic layer 16P is located higher than the top surface of the polishing stopper layer 54. In the fifth embodiment, the plating film to be the magnetic layer 16P grows at the bottom of the groove 53a upward, and the top surface of the plating film then reaches a level higher than the top surface of the polishing stopper layer 54. In the fifth embodiment, plating is completed when a portion of the plating film located higher than the top surface of the stopper layer 54 occupies an area slightly greater than the area of the opening 54a of the stopper layer 54.

Next, as shown in FIG. 47A and FIG. 47B, the coating layer 32 made of alumina, for example, and having a thickness of 0.5 to 1.0 µm, for example, is formed on the entire top surface of the layered structure.

Next, as shown in FIG. 48A and FIG. 48B, the coating layer 32 and the magnetic layer 16P are polished by CMP, for example, until the polishing stopper layer 54 is exposed, and the top surfaces of the polishing stopper layer 54 and the magnetic layer 16P are thereby flattened. If the coating layer 32 and the magnetic layer 16P are polished by CMP, such a slurry is used that polishing is stopped when the polishing stopper layer 54 is exposed, such as an alumina-base slurry. It is possible to control the thickness of the pole layer 16 with accuracy by stopping the polishing when the stopper layer 54 is exposed as thus described.

Figures 49A, 49B:
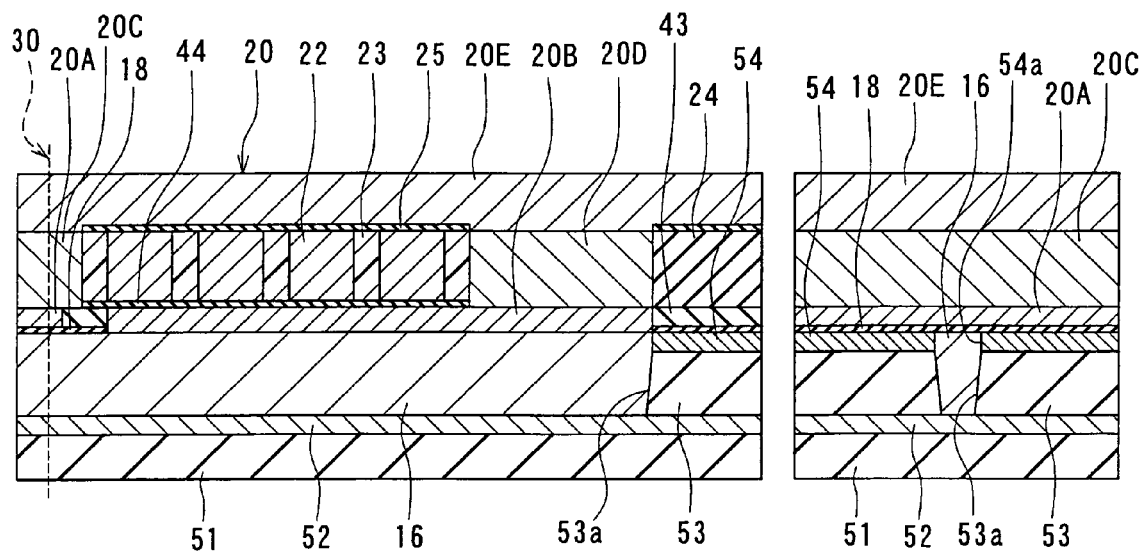
FIG. 49A and FIG. 49B are views for illustrating a step that follows the step shown in FIG. 48A and FIG. 48B.

FIG. 49A and FIG. 49B illustrate the following step. The steps that follow are the same as those of the first embodiment. That is, in the step illustrated in FIG. 49A and FIG. 49B, first, the gap layer 18 is formed on the entire top surface of the layered structure. Next, a portion of the gap layer 18 away from the medium facing surface 30 is selectively etched to form an opening in the gap layer 18. Next, the first layer 20A is formed on the gap layer 18, and the yoke layer 20B is formed on a portion of the pole layer 16 where the opening of the gap layer 18 is formed. Next, the nonmagnetic layer 43 is formed on the entire top surface of the layered structure. Next, the nonmagnetic layer 43 is polished by CMP, for example, so that the first layer 20A and the yoke layer 20B are exposed, and the top surfaces of the first layer 20A, the yoke layer 20B and the nonmagnetic layer 43 are thereby flattened. Next, the insulating layer 44 made of alumina, for example, and having a thickness that falls within a range of 0.2 to 0.3 µm inclusive, for example, is formed by a method such as sputtering on the entire top surface of the layered structure. Next, the insulating layer 44 except a portion on which the coil 22 and the insulating layer 23 will be disposed later is removed by etching.

Next, the coil 22, the second layer 20C and the coupling layer 20D are formed as in the first embodiment. The coupling layer 20D is disposed on a region of the yoke layer 20B at a distance from the medium facing surface 30. Next, the insulating layers 23 and 24 are formed. Next, the insulating layer 24 is polished by CMP, for example, so that the second layer 20C, the coupling layer 20D and the coil 22 are exposed, and the top surfaces of the second layer 20C, the coupling layer 20D, the coil 22 and the insulating layers 23 and 24 are thereby flattened. Next, the insulating layer 25 is formed on the coil 22 and the insulating layers 23 and 24. Next, the third layer 20E is formed by frame plating, for example, to complete the shield layer 20.

Next, although not shown, a protection layer is formed to cover the entire top surface of the layered structure. Wiring and terminals are then formed on the protection layer, the substrate is cut into sliders, and the steps including polishing of the medium facing surface 30 and fabrication of flying rails are performed. The magnetic head is thus completed.

According to the fifth embodiment, it is possible that the portion of the magnetic layer 16P located higher than the top surface of the polishing stopper layer 54 is formed to occupy only an area slightly greater than the area of the opening 54a of the stopper layer 54. It is thereby possible to reduce the amount of polishing of the magnetic layer 16P and to improve the efficiency in manufacturing the magnetic head.

In the manufacturing process of the magnetic heads, a plurality of magnetic head elements to be the magnetic heads are formed in a single wafer. Therefore, the above-mentioned step of polishing the magnetic layer 16P is performed at the same time on the magnetic head elements in the single wafer. When this step is performed, there may arise a case in which the amounts of polishing of the magnetic layers 16P vary, depending on the locations of the head elements in the wafer. Therefore, for each of the head elements, overpolish may be required so that the portion of the magnetic layer 16P located higher than the top surface of the polishing stopper layer 54 will not remain. If overpolish is performed, the polishing stopper layers 54 of at least some of the head elements are polished to some extent. Even in such a case, variations in track width are prevented, according to the fifth embodiment. This feature will now be described, referring to FIG. 50.

Figure 50:
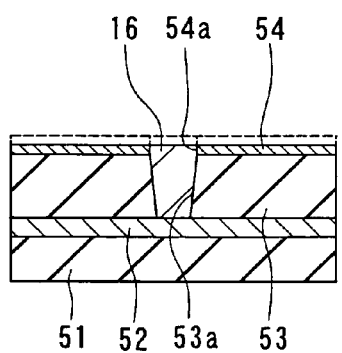
FIG. 50 is a view for illustrating an effect of the method of manufacturing the magnetic head of the fifth embodiment of the invention.

FIG. 50 illustrates a cross section of the pole layer 16 and the neighborhood thereof. The track width is determined by the width of the top surface of the pole layer 16 taken in the medium facing surface 30. In addition, the track width is equal to the width of the opening 54a of the polishing stopper layer 54 taken in the medium facing surface 30. As shown in FIG. 50, the width of the opening 54a is nearly uniform, regardless of the thickness of the polishing stopper layer 54. Consequently, as shown in FIG. 50, the track width is nearly uniform until the level at which polishing is stopped reaches the top surface of the pole-layer-encasing layer 53 even if the stopper layer 54 is polished to some extent. As a result, according to the embodiment, it is possible to prevent variations in track width among a plurality of magnetic head elements formed in a single wafer even if there are differences in amount of polishing of the pole layers 16P and the stopper layers 54, depending on the locations of the head elements in the wafer. To prevent variations in track width in such a manner, it is preferred that the initial thickness of the stopper layers 54 is about 50 to 100 nm.

The remainder of configuration, operation and effects of the fifth embodiment are similar to those of the first embodiment.

In the fifth embodiment, the gap layer 18 may be formed after the polishing stopper layer 54 is removed as in the first modification example of the first embodiment. In the fifth embodiment, the shield layer 20 may have a structure the same as that of the second modification example of the first embodiment.

The present invention is not limited to the foregoing embodiments but may be practiced in still other ways. For example, a coil wound around the pole layer 16 in a helical manner may be provided in any of the embodiments in place of the flat-whorl-shaped coils 9 and 22.

In the foregoing embodiments, the magnetic head is disclosed, having such a configuration that the read head is formed on the base body and the write head is stacked on the read head. Alternatively, the read head may be stacked on the write head.

Obviously many modifications and variations of the present invention are possible in the light of the above teachings. It is therefore to be understood that within the scope of the appended claims the invention may be practiced otherwise than as specifically described.

What is claimed is:

1. A magnetic head for perpendicular magnetic recording comprising:

a medium facing surface that faces toward a recording medium;

a coil for generating a magnetic field corresponding to data to be written on the recording medium;

a pole layer having an end face located in the medium facing surface, allowing a magnetic flux corresponding to the field generated by the coil to pass therethrough, and generating a write magnetic field for writing the data on the recording medium through the use of a perpendicular magnetic recording system;

a pole-layer-encasing layer made of a nonmagnetic material and having a penetrating groove that accommodates the pole layer; and a substrate on which the encasing layer, the pole layer and the coil are stacked, wherein:

the end face of the pole layer located in the medium facing surface has: a first side close to the substrate; a second side located opposite to the first side; a third side connecting an end of the first side to an end of the second side; and a fourth side connecting the other end of the first side to the other end of the second side;

the second side defines a track width; and the end face of the pole layer located in the medium facing surface has a width that decreases as a distance from the first side decreases, the magnetic head further comprising an underlying layer that is made of a nonmagnetic conductive material, touches one of surfaces of the encasing layer closer to the substrate, and has an area greater than an area of the groove.

2. The magnetic head according to claim 1, further comprising a nonmagnetic conductive layer made of a nonmagnetic conductive material and disposed on the other of the surfaces of the encasing layer farther from the substrate, wherein the nonmagnetic conductive layer has a penetrating opening, and an edge of the opening is located directly above an edge of the groove in the other of the surfaces of the encasing layer farther from the substrate.

3. The magnetic head according to claim 1, further comprising a nonmagnetic conductive film made of a nonmagnetic conductive material and disposed between the encasing layer and the pole layer in the groove.

4. The magnetic head according to claim 3, wherein the nonmagnetic conductive film touches the underlying layer and is electrically connected to the underlying layer.

5. A method of manufacturing a magnetic head for perpendicular magnetic recording, the magnetic head comprising:

a medium facing surface that faces toward a recording medium;

a coil for generating a magnetic field corresponding to data to be written on the recording medium;

a pole layer having an end face located in the medium facing surface, allowing a magnetic flux corresponding to the field generated by the coil to pass therethrough, and generating a write magnetic field for writing the data on the recording medium through the use of a perpendicular magnetic recording system;

a pole-layer-encasing layer made of a nonmagnetic material and having a penetrating groove that accommodates the pole layer; and a substrate on which the encasing layer, the pole layer and the coil are stacked, wherein:

the end face of the pole layer located in the medium facing surface has: a first side close to the substrate; a second side located opposite to the first side; a third side connecting an end of the first side to an end of the second side; and a fourth side connecting the other end of the first side to the other end of the second side;

the second side defines a track width; and the end face of the pole layer located in the medium facing surface has a width that decreases as a distance from the first side decreases, the magnetic head further comprising an underlying layer that is made of a nonmagnetic conductive material, touches one of surfaces of the encasing layer closer to the substrate, and has an area greater than an area of the groove, the method comprising the steps of:

forming the underlying layer;

forming the encasing layer on the underlying layer;

forming the pole layer in the groove of the encasing layer by plating through feeding a current to the underlying layer; and forming the coil.

6. The method according to claim 5, wherein the step of forming the encasing layer includes the steps of:

forming a nonmagnetic layer on the underlying layer, wherein the nonmagnetic layer will be formed into the encasing layer by forming the groove therein later;

forming a polishing stopper layer on a top surface of the nonmagnetic layer, wherein the polishing stopper layer is made of a nonmagnetic conductive material, has a penetrating opening having a shape corresponding to a plane geometry of the pole layer, and indicates a level at which polishing to be performed later is stopped; and forming the groove in the nonmagnetic layer by selectively etching a portion of the nonmagnetic layer exposed from the opening of the polishing stopper layer, so that the nonmagnetic layer is formed into the encasing layer, and the step of forming the pole layer includes the steps of:

forming a magnetic layer to be the pole layer, such that the groove is filled and a top surface of the magnetic layer is located higher than a top surface of the polishing stopper layer;

forming a coating layer to cover the magnetic layer and the polishing stopper layer; and polishing the coating layer and the magnetic layer until the polishing stopper layer is exposed, so that the magnetic layer is formed into the pole layer.

7. The method according to claim 6, further comprising the step of forming a nonmagnetic conductive film made of a nonmagnetic conductive material and disposed between the encasing layer and the pole layer in the groove, the step being performed after the step of forming the groove in the nonmagnetic layer and before the step of forming the magnetic layer.

8. The method according to claim 7, wherein the nonmagnetic conductive film touches the underlying layer and is electrically connected to the underlying layer.

9. The method according to claim 6, further comprising the step of removing the polishing stopper layer after the step of polishing the coating layer and the magnetic layer.

10. The method according to claim 9, wherein ion beam etching is performed to remove the polishing stopper layer and to etch a portion of the magnetic layer in the step of removing the polishing stopper layer.

11. The method according to claim 5, further comprising the step of forming an insulating layer to be disposed below the underlying layer before the step of forming the underlying layer, wherein:

a top surface of the insulating layer includes a first region including a region in which the pole layer will be disposed later and a second region disposed outside the first region, and a difference in level is created between the first and second regions such that the second region is located farther from the substrate than the first region;

the underlying layer is formed on the top surface of the insulating layer in the step of forming the underlying layer;

the step of forming the encasing layer includes the steps of:

forming a nonmagnetic layer on the underlying layer, wherein the nonmagnetic layer will be formed into the encasing layer by forming the groove therein later;

forming a polishing stopper layer on a top surface of the nonmagnetic layer, wherein the polishing stopper layer is made of a nonmagnetic conductive material, has a penetrating opening having a shape corresponding to a plane geometry of the pole layer, and indicates a level at which polishing to be performed later is stopped; and forming the groove in the nonmagnetic layer by selectively etching a portion of the nonmagnetic layer exposed from the opening of the polishing stopper layer, so that the nonmagnetic layer is formed into the encasing layer, and the step of forming the pole layer includes the steps of:

forming a magnetic layer to be the pole layer, such that the groove is filled and a top surface of the magnetic layer is located higher than a top surface of the polishing stopper layer;

forming a coating layer to cover the magnetic layer and the polishing stopper layer; and polishing the coating layer and the magnetic layer until a portion of the polishing stopper layer disposed above the first region of the top surface of the insulating layer and a portion of the underlying layer disposed on the second region of the top surface of the insulating layer are exposed, so that the magnetic layer is formed into the pole layer.

12. The method according to claim 5, wherein:

the step of forming the encasing layer includes:

the step of forming a nonmagnetic layer on the underlying layer, wherein the nonmagnetic layer will be formed into the encasing layer by forming the groove therein later;

the step of forming a lower polishing stopper layer made of a nonmagnetic conductive material on a top surface of the nonmagnetic layer, the lower polishing stopper layer indicating a level at which polishing of a second polishing step to be performed later is stopped;

the step of forming a spacer layer having a specific thickness on the lower polishing stopper layer;

the step of forming a penetrating opening in each of the spacer layer and the lower polishing stopper layer, the opening having a shape corresponding to a plane geometry of the pole layer;

the step of forming the groove in the nonmagnetic layer by selectively etching a portion of the nonmagnetic layer exposed from the openings of the spacer layer and the lower polishing stopper layer, so that the nonmagnetic layer is formed into the encasing layer; and the step of forming an upper polishing stopper layer on the spacer layer, the upper polishing stopper layer indicating a level at which polishing of a first polishing step to be performed later is stopped, and the step of forming the pole layer includes:

the step of forming a magnetic layer to be the pole layer, such that the groove is filled and a top surface of the magnetic layer is located higher than a top surface of the upper polishing stopper layer;

the step of forming a coating layer to cover the magnetic layer and the upper polishing stopper layer;

the first polishing step of polishing the coating layer and the magnetic layer until the upper polishing stopper layer is exposed;

the step of removing the upper polishing stopper layer after the first polishing step; and the second polishing step of polishing the spacer layer and the magnetic layer until the lower polishing stopper layer is exposed, so that the magnetic layer is formed into the pole layer.

13. The method according to claim 12, wherein the lower polishing stopper layer is made of a nonmagnetic conductive material.

14. The method according to claim 12, wherein the spacer layer is made of an insulating material or a semiconductor material.

15. The method according to claim 12, wherein the upper polishing stopper layer is made of a nonmagnetic conductive material.

16. The method according to claim 15, wherein the upper polishing stopper layer is formed in the groove, too.

17. The method according to claim 16, wherein the upper polishing stopper layer touches the underlying layer and is electrically connected to the underlying layer.

18. The method according to claim 12, further comprising the step of removing the lower polishing stopper layer after the second polishing step.

19. The method according to claim 18, wherein ion beam etching is performed to remove the lower polishing stopper layer and to etch a portion of the magnetic layer in the step of removing the lower polishing stopper layer.

* * * * *